(12) United States Patent
Kono et al.

(10) Patent No.: US 11,652,983 B2
(45) Date of Patent: *May 16, 2023

(54) SOLID-STATE IMAGING DEVICE, IMAGING SYSTEM, AND MOVABLE OBJECT

(71) Applicant: CANON KABUSHIKI KAISHA, Tokyo (JP)

(72) Inventors: Shoji Kono, Hachioji (JP); Tetsuya Itano, Sagamihara (JP); Yasushi Iwakura, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,902

(22) Filed: Feb. 24, 2022

(65) Prior Publication Data

US 2022/0279160 A1  Sep. 1, 2022

Related U.S. Application Data

(63) Continuation of application No. 16/838,389, filed on Apr. 2, 2020, now abandoned, which is a continuation of application No. 15/839,518, filed on Dec. 12, 2017, now Pat. No. 10,652,531.

(30) Foreign Application Priority Data

Jan. 25, 2017  (JP) .............................. JP2017-011252
Oct. 18, 2017  (JP) .............................. JP2017-202000

(51) Int. Cl.
*H04N 17/00* (2006.01)
*H04N 25/59* (2023.01)
*H04N 25/771* (2023.01)
*H04N 25/75* (2023.01)

(52) U.S. Cl.
CPC ........... *H04N 17/002* (2013.01); *H04N 25/59* (2023.01); *H04N 25/771* (2023.01); *H04N 25/75* (2023.01)

(58) Field of Classification Search
CPC .............. H04N 17/002; H04N 5/3559; H04N 5/37452; H04N 5/378
See application file for complete search history.

(56) References Cited

U.S. PATENT DOCUMENTS

| | | | |
|---|---|---|---|
| 6,787,749 B1* | 9/2004 | Zhou | H04N 5/3658 348/E3.02 |
| 7,126,102 B2 | 10/2006 | Inoue et al. | 250/214 R |
| 7,321,110 B2 | 1/2008 | Okita et al. | 250/208.1 |

(Continued)

FOREIGN PATENT DOCUMENTS

| | | |
|---|---|---|
| JP | H10-339921 | 12/1998 |
| JP | 2015-201879 | 11/2015 |

*Primary Examiner* — Nhan T Tran
(74) *Attorney, Agent, or Firm* — Venable LLP

(57) ABSTRACT

A solid-state imaging device includes a pixel that outputs a pixel signal of an analog signal, a readout unit that converts the pixel signal into a digital signal to generate a digital pixel signal, a memory unit that stores the digital pixel signal, and a first inspection signal output unit that outputs a first inspection signal to the memory unit such that the memory unit stores the first inspection signal. The first inspection signal stored in the memory unit is output from the memory unit in a period after output of the digital pixel signal of a frame ends and before output of the digital pixel signal of a next frame starts.

37 Claims, 35 Drawing Sheets

(56) References Cited

U.S. PATENT DOCUMENTS

| | | | | |
|---|---|---|---|---|
| 7,385,172 | B2 | 6/2008 | Inoue et al. | 250/214 R |
| 7,408,210 | B2 | 8/2008 | Ogura et al. | 257/233 |
| 7,460,162 | B2 | 12/2008 | Koizumi et al. | 348/294 |
| 7,462,810 | B2 | 12/2008 | Kobayashi et al. | 250/208.1 |
| 7,550,793 | B2 | 6/2009 | Itano et al. | 257/239 |
| 7,592,579 | B2 | 9/2009 | Tamura et al. | 250/208.1 |
| 7,709,780 | B2 | 5/2010 | Inoue et al. | 250/214.1 |
| 7,719,587 | B2 | 5/2010 | Ogura et al. | 348/302 |
| 7,741,593 | B2 | 6/2010 | Iwata et al. | 250/214 R |
| 7,825,974 | B2 | 11/2010 | Itano et al. | 348/308 |
| 7,920,192 | B2 | 4/2011 | Watanabe et al. | 348/308 |
| 7,978,241 | B2 | 7/2011 | Koizumi et al. | 348/294 |
| 7,982,789 | B2 | 7/2011 | Watanabe et al. | 348/308 |
| 8,023,025 | B2 | 9/2011 | Itano et al. | 348/308 |
| 8,063,351 | B2 | 11/2011 | Kobayashi et al. | 250/208.1 |
| 8,063,958 | B2 | 11/2011 | Okita et al. | 348/241 |
| 8,063,967 | B2 | 11/2011 | Itano et al. | 348/308 |
| 8,081,245 | B2 | 12/2011 | Itano et al. | 348/301 |
| 8,085,319 | B2 | 12/2011 | Ono et al. | 348/241 |
| 8,159,577 | B2 | 4/2012 | Iwata et al. | 348/296 |
| 8,289,431 | B2 | 10/2012 | Itano | 348/308 |
| 8,355,066 | B2 | 1/2013 | Iwata et al. | 348/308 |
| 8,363,137 | B2 | 1/2013 | Sonoda et al. | 348/302 |
| 8,368,790 | B2 | 2/2013 | Itano et al. | 348/301 |
| 8,390,708 | B2 | 3/2013 | Koizumi et al. | 348/294 |
| 8,400,546 | B2 | 3/2013 | Itano et al. | 348/308 |
| 8,411,187 | B2 | 4/2013 | Watanabe et al. | 348/308 |
| 8,441,558 | B2 | 5/2013 | Okita et al. | 348/241 |
| 8,507,870 | B2 | 8/2013 | Arishima et al. | 250/370.08 |
| 8,530,989 | B2 | 9/2013 | Kikuchi et al. | 257/429 |
| 8,582,009 | B2 | 11/2013 | Kono et al. | 348/302 |
| 8,598,901 | B2* | 12/2013 | Hiyama | H04N 5/378 348/297 |
| 8,659,692 | B2 | 2/2014 | Matsuda et al. | 348/302 |
| 8,670,049 | B2 | 3/2014 | Ono et al. | 348/241 |
| 8,670,056 | B2 | 3/2014 | Kono et al. | 348/294 |
| 8,687,246 | B2 | 4/2014 | Fujimura et al. | 358/482 |
| 8,698,935 | B2 | 4/2014 | Okita et al. | 348/314 |
| 8,710,610 | B2 | 4/2014 | Kono et al. | 257/435 |
| 8,711,259 | B2 | 4/2014 | Maehashi et al. | 348/294 |
| 8,742,359 | B2 | 6/2014 | Arishima et al. | 250/370.08 |
| 8,749,675 | B2 | 6/2014 | Koizumi et al. | 348/294 |
| 8,836,833 | B2 | 9/2014 | Yamashita et al. | 348/301 |
| 8,836,838 | B2 | 9/2014 | Nakamura et al. | 348/308 |
| 8,896,029 | B2 | 11/2014 | Koizumi et al. | 257/202 |
| 8,913,168 | B2 | 12/2014 | Matsuda et al. | 348/302 |
| 8,928,786 | B2 | 1/2015 | Iwata et al. | 348/294 |
| 9,029,752 | B2 | 5/2015 | Saito et al. | 250/208.1 |
| 9,083,906 | B2 | 7/2015 | Nakamura et al. | H04N 5/37455 |
| 9,232,165 | B2 | 1/2016 | Saito et al. | H04N 5/3575 |
| 9,288,415 | B2 | 3/2016 | Yamazaki et al. | H04N 5/37455 |
| 9,432,607 | B2 | 8/2016 | Morita et al. | H04N 5/378 |
| 9,438,828 | B2 | 9/2016 | Itano et al. | H04N 5/3458 |
| 9,438,841 | B2 | 9/2016 | Yamazaki et al. | H04N 5/37455 |
| 9,602,752 | B2 | 3/2017 | Kobayashi et al. | H04N 5/378 |
| 9,716,823 | B2 | 7/2017 | Iwata et al. | H04N 5/23212 |
| 9,825,077 | B2 | 11/2017 | Watanabe et al. | H01L 27/14616 |
| 10,321,075 | B2 | 6/2019 | Kaneda | |
| 10,531,033 | B2 | 1/2020 | Morita | |
| 10,609,243 | B2 | 3/2020 | Ochiai | |
| 10,652,531 | B2* | 5/2020 | Kono | H04N 5/37452 |
| 2011/0003426 | A1 | 1/2011 | Watanabe et al. | 438/73 |
| 2011/0019030 | A1* | 1/2011 | Shoyama | G11C 29/08 348/E9.002 |
| 2012/0008030 | A1 | 1/2012 | Kono et al. | 348/301 |
| 2012/0262613 | A1 | 10/2012 | Kono et al. | 348/300 |
| 2013/0002916 | A1 | 1/2013 | Itano | 348/302 |
| 2013/0027565 | A1 | 1/2013 | Solhusvik | |
| 2014/0156133 | A1* | 6/2014 | Cullinane | B60K 37/06 701/23 |
| 2015/0122975 | A1 | 5/2015 | Saito et al. | 250/208.1 |
| 2016/0156865 | A1* | 6/2016 | Hayashi | H04N 5/3698 348/302 |
| 2016/0227141 | A1 | 8/2016 | Kobayashi et al. | H04N 5/3698 |
| 2017/0155862 | A1 | 6/2017 | Kobayashi et al. | H01L 27/14609 |
| 2017/0257605 | A1 | 9/2017 | Iwakura et al. | H01L 27/14607 |
| 2017/0262731 | A1* | 9/2017 | Uetani | G06T 1/60 |
| 2017/0310913 | A1 | 10/2017 | Takada et al. | H04N 5/3696 |
| 2018/0098012 | A1 | 4/2018 | Takado | |
| 2018/0197907 | A1 | 7/2018 | Wada | |

* cited by examiner

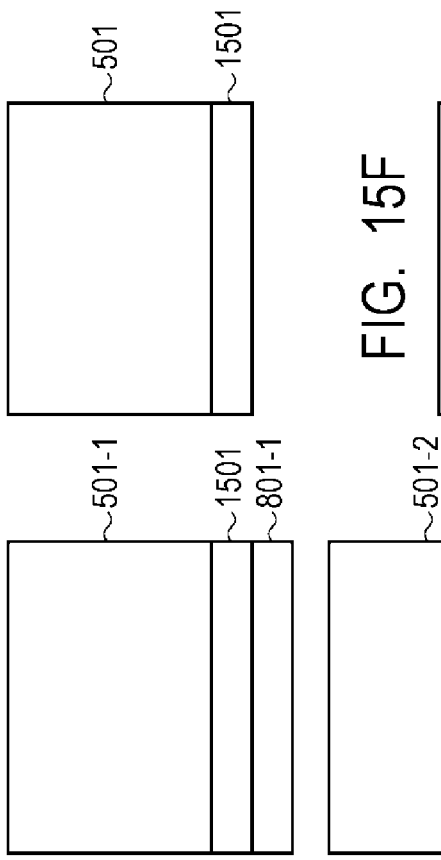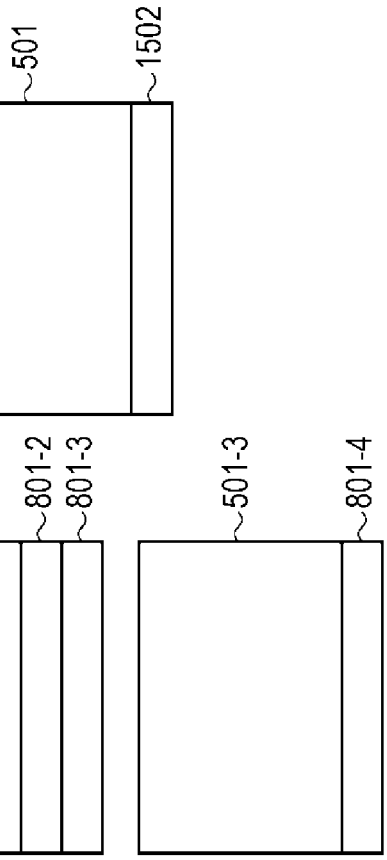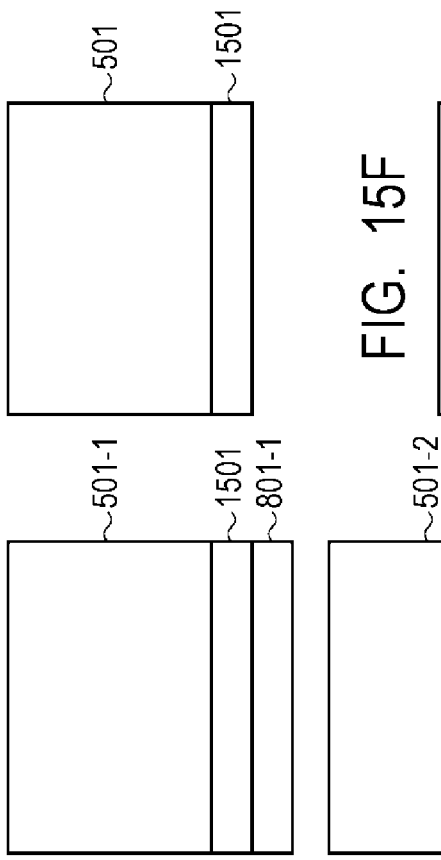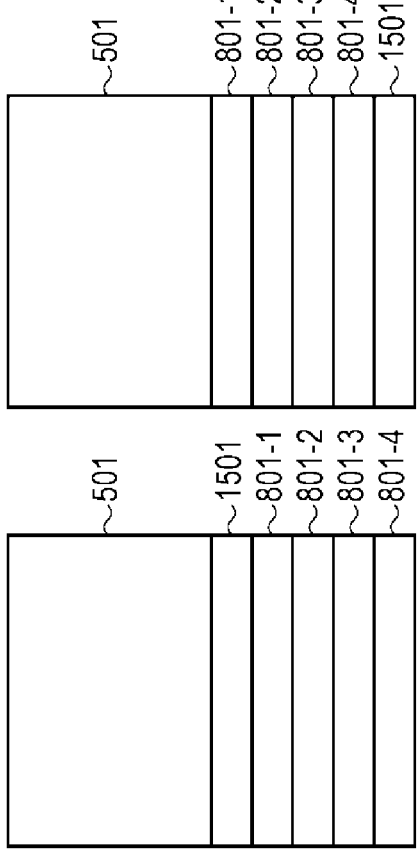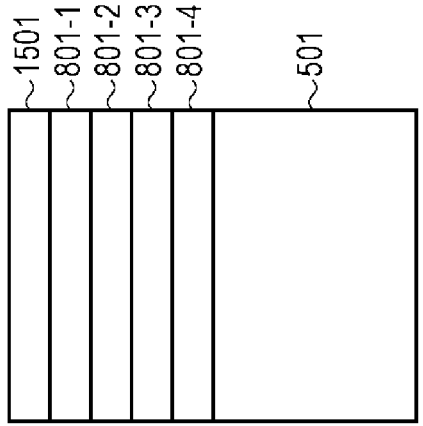

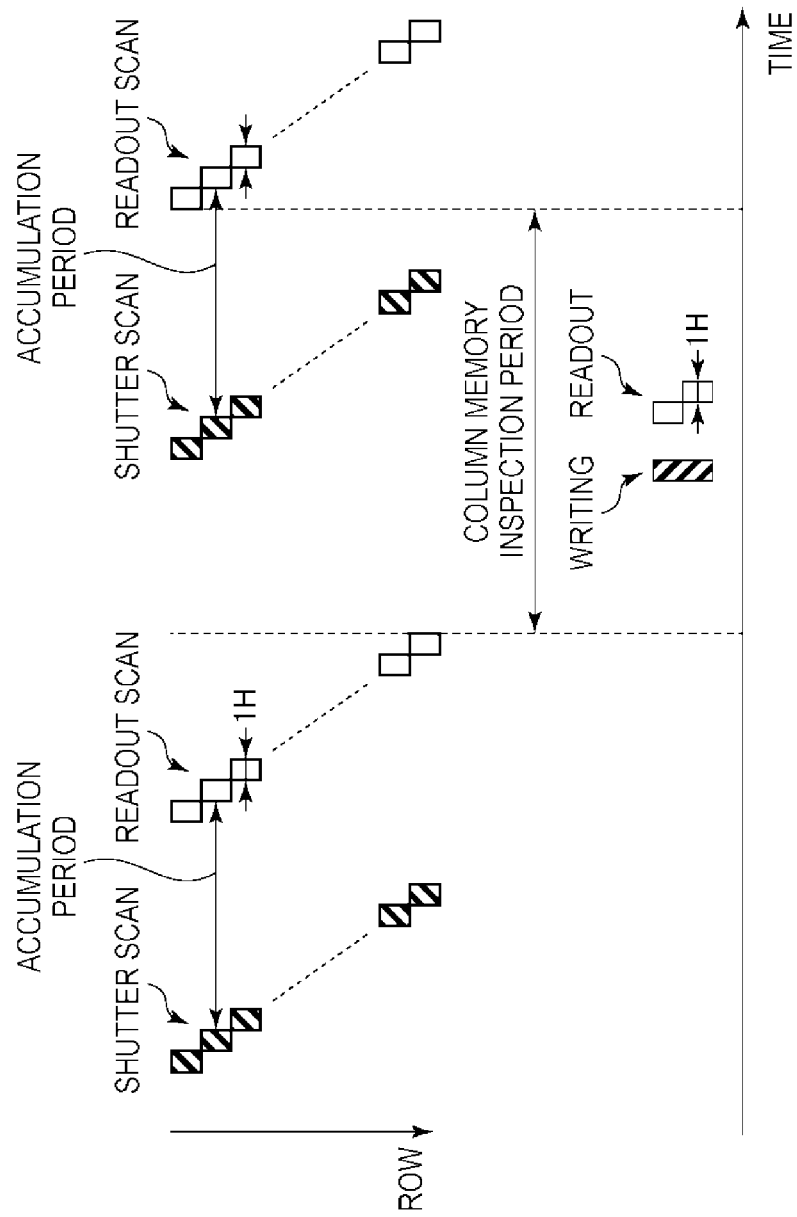

FIG. 29A
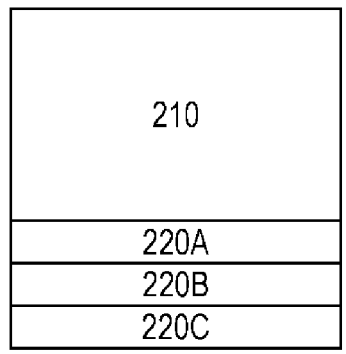
FIG. 29C
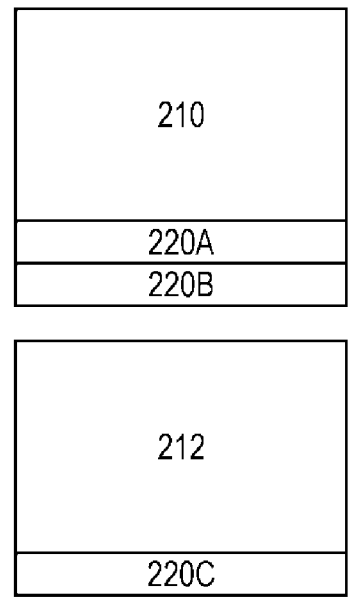
FIG. 29B
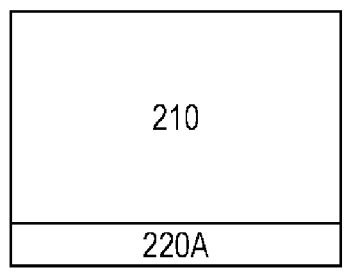
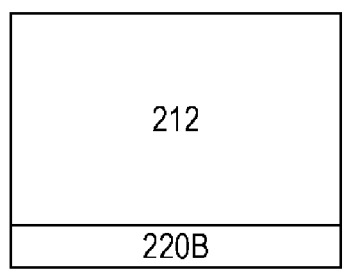
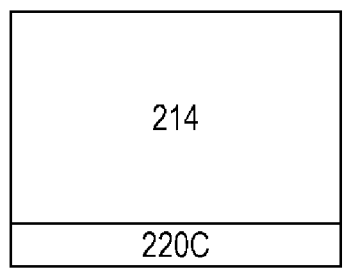

SOLID-STATE IMAGING DEVICE, IMAGING SYSTEM, AND MOVABLE OBJECT

This application is a continuation of U.S. application Ser. No. 16/838,389, filed on Apr. 2, 2020, which is a continuation of U.S. application Ser. No. 15/839,518, filed on Dec. 12, 2017, now U.S. Pat. No. 10,652,531, issued on May 12, 2020.

BACKGROUND OF THE INVENTION

Field of the Invention

The present invention relates to a solid-state imaging device, an imaging system, and a movable object.

Description of the Related Art

In recent years, there has been a demand for higher performance and improved reliability of solid-state imaging devices. In particular, in vehicle applications or the like, the operating environment is severe and safety measures are very important, and therefore an imaging system having a failure detection function is demanded for supporting functional safety. This also requires to embed a failure detection mechanism into a solid-state imaging device.

U. S. Patent Application Publication No. 2013/0027565 discloses an image sensor having a dark pixel within a pixel array. It is disclosed that the image sensor of U. S. Patent Application Publication No. 2013/0027565 can perform anomaly detection by collating an output obtained when a predetermined inspecting voltage is applied to a dark pixel with an output expected in a case where there is no anomaly.

Japanese Patent Application Laid-Open No. 2015-201879 discloses an art that, in a solid-state imaging device having a function of converting a pixel signal from an analog signal to a digital signal, a column memory is inspected by performing writing and readout of a test signal to and from the column memory that holds the digitally converted pixel signal.

Since an output signal from a dark pixel is an analog signal, a noise of a readout circuit may be included in the signal when readout is performed. Thus, when analog-to-digital conversion is performed on an output signal from the readout circuit and the converted digital value is held in the memory, in particular, a lower-digit value of the values held in the memory is likely to be different from an expected value due to a noise. That is, an error due to a noise may occur in an anomaly detection signal. Therefore, when a lower-digit value held in the memory is different from the expected value, it may be difficult to determine whether it is due to an anomaly of the readout circuit or due to a noise. For the above reason, it may be difficult to determine whether or not there is an anomaly in performing anomaly detection using an output from a dark pixel.

SUMMARY OF THE INVENTION

An object of the present invention is to provide a solid-state imaging device that can output a more accurate signal used for anomaly detection.

According to an aspect of the present invention, there is provided a solid-state imaging device including a pixel that outputs a pixel signal of an analog signal, a readout unit that converts the pixel signal into a digital signal to generate a digital pixel signal, a memory unit that stores the digital pixel signal, and a first inspection signal output unit that outputs a first inspection signal to the memory unit such that the memory unit stores the first inspection signal, wherein the first inspection signal stored in the memory unit is output from the memory unit in a period after output of the digital pixel signal of a frame ends and before output of the digital pixel signal of a next frame starts.

Further, according to another aspect of the present invention, there is provided an imaging system including a solid-state imaging device including a pixel that outputs a pixel signal of an analog signal, a readout unit that converts the pixel signal into a digital signal to generate a digital pixel signal, a memory unit that stores the digital pixel signal, and a first inspection signal output unit that outputs a first inspection signal to the memory unit such that the memory unit stores the first inspection signal, wherein the first inspection signal stored in the memory unit is output from the memory unit in a period after output of the digital pixel signal of a frame ends and before output of the digital pixel signal of a next frame starts, and a signal processing unit that processes a signal output from the solid-state imaging device.

Further, according to further another aspect of the present invention, there is provided is a movable object including a solid-state imaging device including a pixel that outputs a pixel signal of an analog signal, a readout unit that converts the pixel signal into a digital signal to generate a digital pixel signal, a memory unit that stores the digital pixel signal, and a first inspection signal output unit that outputs a first inspection signal to the memory unit such that the memory unit stores the first inspection signal, wherein the first inspection signal stored in the memory unit is output from the memory unit in a period after output of the digital pixel signal of a frame ends and before output of the digital pixel signal of a next frame starts, a distance information acquisition unit adapted to acquire distance information on a distance to an object, from a parallax image based on the pixel signal output from the pixel of the solid-state imaging device, and a control unit adapted to control the movable object based on the distance information.

Further, according to further another aspect of the present invention, there is provided a solid-state imaging device including a plurality of pixels arranged to form a matrix including a plurality of columns and a plurality of rows, a plurality of memories provided correspondingly to the plurality of columns, wherein each of the plurality of memories holds, as a digital value, information based on a signal output from the pixel arranged on a corresponding column, an inspection information supply unit that supplies inspection information for failure inspection to the plurality of memories, and an output circuit that outputs information held by the plurality of memories, wherein the output circuit outputs information that is based on signals output from the plurality of pixels on a row-by-row basis, wherein the output circuit outputs the inspection information held in a part of the plurality of memories in a first period corresponding to an output period for one row and outputs the inspection information held in another part of the plurality of memories in a second period, which is different from the first period, corresponding to an output period for one row, and wherein each of the first period and the second period is a period between an output operation of pixel information for one row performed by the output circuit and an output operation of pixel information for another row performed by the output circuit.

Further features of the present invention will become apparent from the following description of exemplary embodiments with reference to the attached drawings.

BRIEF DESCRIPTION OF THE DRAWINGS

FIG. 15A, FIG. 15B, FIG. 15C, FIG. 15D, FIG. 15E and FIG. 15F are schematic diagrams of image data output from the solid-state imaging device according to the fourth embodiment.

FIG. 23 is a schematic diagram illustrating a method of driving the solid-state imaging device according to the fifth embodiment.

FIG. 29A, FIG. 29B and FIG. 29C are schematic diagrams of example configurations of data in a signal processing device outside the solid-state imaging device.

DESCRIPTION OF THE EMBODIMENTS

Preferred embodiments of the present invention will now be described in detail in accordance with the accompanying drawings. In respective drawings, the same reference symbol is provided to the same components or components corresponding to each other. Further, in each embodiment below, the description of duplicated components may be omitted or simplified.

First Embodiment

Figure 1:
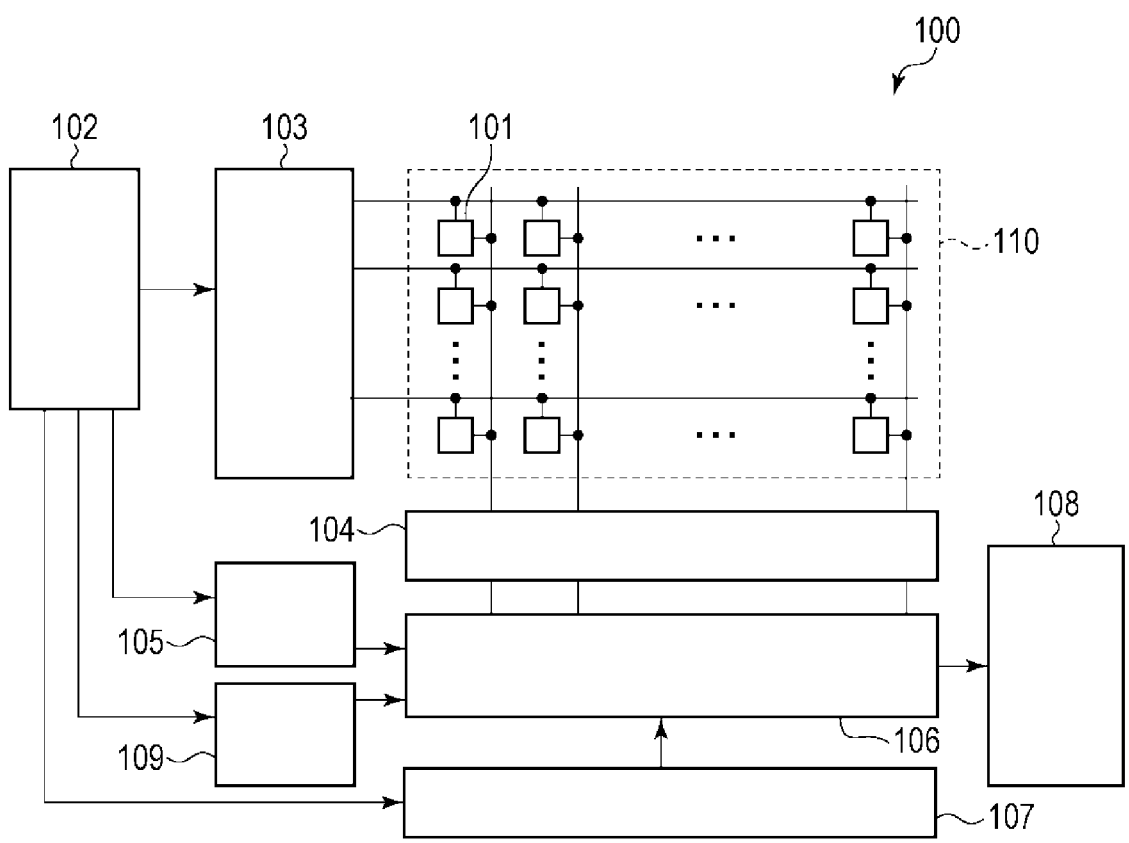
FIG. 1 is a block diagram of a solid-state imaging device according to a first embodiment.

FIG. 1 is a block diagram illustrating a general configuration of a solid-state imaging device 100 according to a first embodiment of the present invention. The solid-state imaging device 100 includes a timing generator 102, a vertical scanning circuit 103, a comparator circuit unit 104, a counter 105, a column memory 106, a horizontal scanning circuit 107, an imaging output circuit 108, a voltage supply unit 109, and a pixel array 110.

The pixel array 110 includes a plurality of pixels 101 arranged in a two-dimensional manner over a plurality of rows and a plurality of columns. The vertical scanning circuit 103 supplies a plurality of control signals for driving the plurality of pixels 101 on a row basis. The vertical scanning circuit 103 may include logic circuits such as a shift resistor, an address decoder, and the like. Note that, while only a control signal line is depicted for each row for simplified illustration, multiple control signal lines are included in the actual implementation. The pixels 101 on a row selected by the vertical scanning circuit 103 output pixel signals, which are analog signals, to the comparator circuit unit 104 via vertical output lines provided to the corresponding columns of the pixel array 110.

The comparator circuit unit 104 includes a plurality of sample-and-hold circuits, a plurality of comparators, a reference signal generation unit, and the like. The sample-and-hold circuits and the comparators are provided to the corresponding columns of the pixel array. The counter 105 outputs a count value by performing a counting operation. The column memory 106 has memory areas corresponding to respective columns of the pixel array, and a count value from the counter 105 is input to each of the memory area.

Pixel signals input to the comparator circuit unit 104 are held in the sample-and-hold circuits on the corresponding columns. The reference signal generation unit generates a reference signal whose voltage varies in accordance with time elapsing. For example, a ramp signal may be used for the waveform of the reference signal. Each comparator compares the relationship of the voltages of a pixel signal held in the sample-and-hold circuit and a reference signal output from the reference signal generation unit and, in response to inversion of the relationship, outputs a latch signal. The counter 105 stores, in the column memory 106, a count value in accordance with the time from the start of the change of the reference signal to the output of a latch signal. This count value corresponds to a digitally converted pixel signal. That is, the comparator circuit unit 104, the counter 105, and the column memory 106 have a function as a readout unit and a memory unit that perform analog-to-digital conversion (hereafter, referred to as AD conversion) on a pixel signal and store the converted signal. In the present specification, a digitally converted pixel signal (a digital pixel signal) is referred to as image data. A plurality of image data form one image. The column memory 106 has a function as a memory unit that stores image data obtained by performing AD conversion on a pixel signal. Typically, the column memory 106 holds a digital signal with multiple bits. Note that, in the readout unit described above, the reference signal may be input from the outside of the comparator circuit unit 104.

The horizontal scanning circuit 107 outputs, to the column memory 106, control signals for transferring image data stored in the column memory 106 to the image output circuit 108 sequentially on a column basis. The image output circuit 108 outputs image data transferred from the column memory 106 to a signal processing unit (not illustrated) outside the solid-state imaging device 100. The voltage supply unit 109 can set a stored digital value to a desired value by supplying a voltage of a desired level to a memory area corresponding to each bit on each column of the column memory 106. Thereby, the voltage supply unit 109 functions as a first inspection signal output unit adapted to initialize the column memory 106 and then supply a first inspection signal that is a digital signal to the column memory 106. The voltage supply unit 109 can perform initialization by supplying a voltage which causes the value of each bit on each column of the column memory 106 to be "0" (for example, a fixed voltage such as 0 V). Supply of the first inspection signal will be described later.

The timing generator 102 supplies a timing signal to the vertical scanning circuit 103, the counter 105, the horizontal scanning circuit 107, and the voltage supply unit 109 to control the operation timing of each unit.

Figure 2:
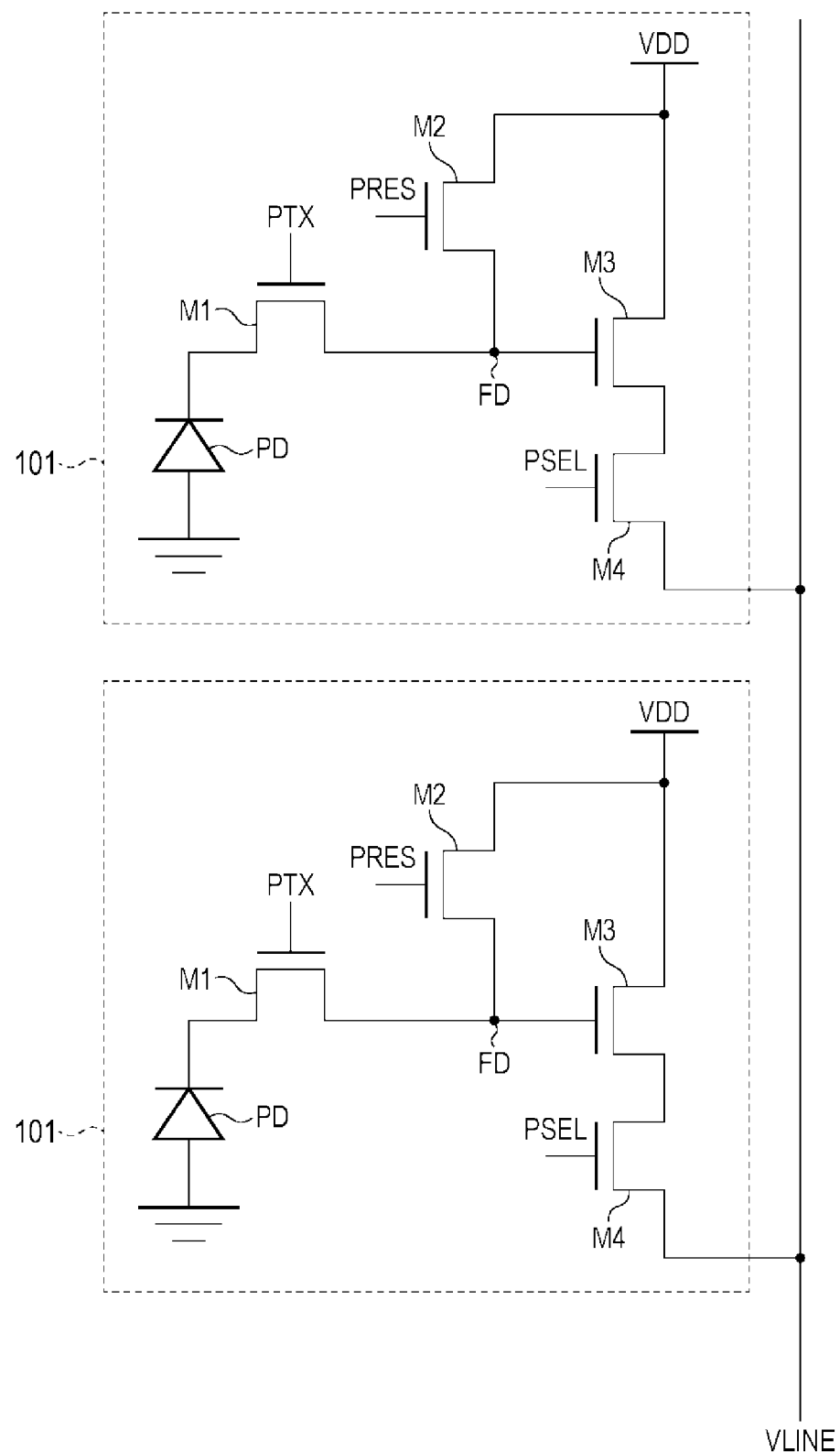
FIG. 2 is an equivalent circuit diagram of pixels according to the first embodiment.

FIG. 2 is an equivalent circuit diagram of the pixels 101 according to the first embodiment. In FIG. 2, two pixels 101 on the same column within the pixel array 110 are picked out and depicted. Each of the pixels 101 includes a photoelectric converter PD, a transfer transistor M1, a reset transistor M2, an amplifier transistor M3, and a select transistor M4. The photoelectric converter PD is a photoelectric conversion element, such as photodiode, for example. In the photodiode of the photoelectric converter PD, the anode is connected to the ground, and the cathode is connected to the source of the transfer transistor M1. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 forms a floating diffusion FD. The drain of the reset transistor M2 and the drain of the amplifier transistor M3 are connected to a power source voltage terminal VDD. The source of the amplifier transistor M3 is connected to the drain of the select transistor M4. The source of the select transistor M4 is connected to the vertical output line.

The vertical scanning circuit 103 supplies control signals PTX, PRES, and PSEL to the gate of the transfer transistor M1, the gate of the reset transistor M2, and the gate of the select transistor M4, respectively. When each transistor is formed of an n-channel transistor, the corresponding transistor is turned on when a high level control signal is supplied from the vertical scanning circuit 103, and the corresponding transistor is turned off when a low level control signal is supplied from the vertical scanning circuit 103.

The photoelectric converter PD converts an incidence light into the amount of charges in accordance with the light amount of the incident light (photoelectric conversion) and accumulates the generated charges. When turned on, the transfer transistor M1 transfers charges of the photoelectric converter PD to the floating diffusion FD. The voltage of the floating diffusion FD becomes a voltage in accordance with the amount of charges transferred from the photoelectric converter PD according to charge-to-voltage conversion caused by the capacitance component of the floating diffusion FD. The amplifier transistor M3 is configured such that the drain is supplied with the power source voltage and the source is supplied with a bias current from a current source (not illustrated) via the select transistor M4 and forms a source follower circuit in which the gate is the input node. This causes the amplifier transistor M3 to output a voltage VLINE based on the voltage of the floating diffusion FD to the vertical output line as a pixel signal via the select transistor M4. When turned on, the reset transistor M2 resets the floating diffusion FD to a voltage in accordance with the power source voltage.

Note that the names of the source and the drain may be different in accordance with the conductivity type, a function in interest, or the like of a transistor and thus the source and the drain described above may be referred by the opposite names.

Figure 3:
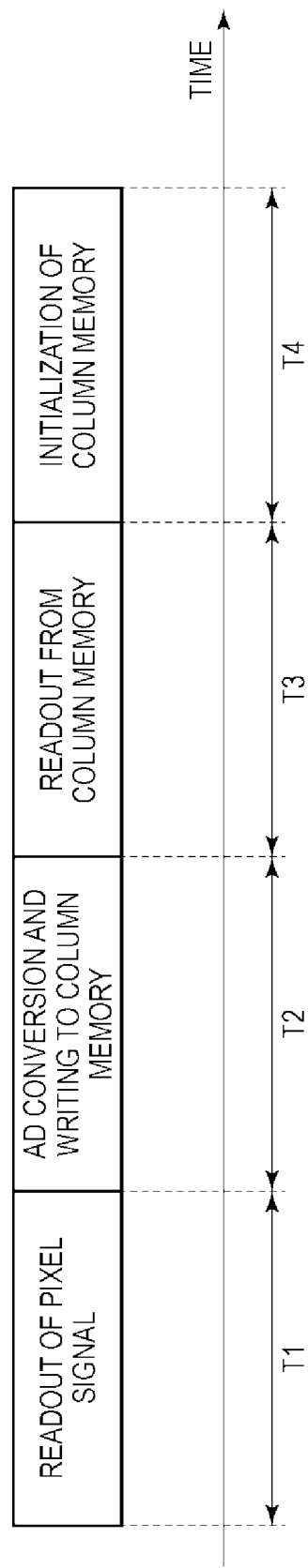
FIG. 3 is a schematic diagram illustrating a readout operation for one row of the solid-state imaging device according to the first embodiment.

FIG. 3 is a schematic diagram illustrating a readout operation for one row of the solid-state imaging device 100 according to the first embodiment. With reference to FIG. 3, the readout operation for a particular row of the solid-state imaging device 100 will be described. First, in a period T1, readout of pixel signals is performed. The pixels 101 on the row in interest output a pixel signals to the vertical output lines. The pixel signals are input to the comparator circuit unit 104 and held in the sample-and-hold circuit. Next, in a period T2, AD conversion is performed according to the above-described scheme in the comparator circuit unit 104, the counter 105, and the column memory 106, and image data of the obtained digital signals are stored in the column memory 106. Next, in a period T3, in response to a scan by the horizontal scanning circuit 107, readout of image data from the column memory 106 to the image output circuit 108 is performed. Then, in a period T4, the voltage supply unit 109 performs initialization by supplying a voltage which causes the value of each bit on each column of the column memory 106 to be "0" (for example, a fixed voltage such as 0 V).

Figure 4:
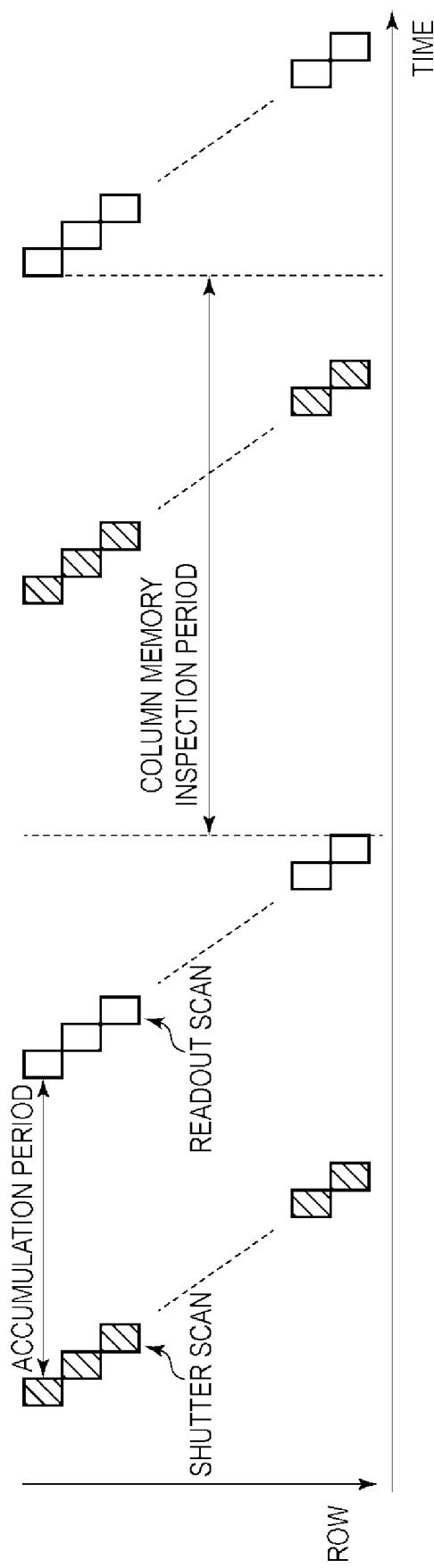
FIG. 4 is a schematic diagram illustrating a vertical scanning method of the solid-state imaging device according to the first embodiment.

FIG. 4 is a schematic diagram illustrating a vertical scanning method of the solid-state imaging device 100 according to the first embodiment. In the vertical scanning method illustrated in FIG. 4, general description of scans for image acquisition when a motion image is captured is provided with respect to two picked-out frames. In FIG. 4, it is assumed that a light enters the pixels 101 over the entire periods, and light-shielding by a mechanical shutter is not considered. Each hatched block in FIG. 4 illustrates a shutter scan. A shutter scan is a scan that performs electronic shutter operations for resetting the photoelectric converters PD of the pixels 101 sequentially for each row. More specifically, in a period illustrated with the hatched block, the transfer transistor M1 and the reset transistor M2 within the pixel 101 on the corresponding row are both in an on-state. Thereby, charges accumulated in the photoelectric converter PD are drained from the power source voltage terminal VDD, and the photoelectric converter PD is reset. After this electronic shutter operation, the photoelectric converter PD accumulates charges generated by photoelectric conversion of an incident light. After a predetermined period has elapsed after the electronic shutter operation, a readout scan that performs the readout operations illustrated in FIG. 3 sequentially for each row is performed. The period from a shutter scan to a readout scan is an accumulation period, and the timings of scans are set such that the lengths of the accumulation periods are the same for respective rows.

In a period from the end of a readout scan to the start of the next readout scan, no writing of image data to the column memory 106 is performed. Thus, this period is used as a column memory inspection period for inspecting an anomaly of the column memory 106. While the voltage supply unit 109 inputs a voltage which provides "0" to each bit in initialization of the column memory 106, it may input a voltage which provides "1" to at least a part of bits (for example, the same voltage as the power source voltage of the column memory 106) in a column memory inspection period. This allows the voltage supply unit 109 to store a bit sequence having a predetermined memory inspection pattern in the column memory 106. The memory inspection pattern for the column memory 106 may include an example in which "0" is input to each bit of the column memory 106 on all the columns or an example in which "1" is input to each bit of the column memory 106 on all the columns. Further, in order to inspect a short-circuit between neighboring columns, there is an example in which "0101 . . . " is input from a higher bit in the column memory 106 on one column and "1010 . . . " is input from a higher bit in the column memory 106 on the neighboring columns. Further, in order to inspect a short-circuit within one column, there is an example in which "0101 . . . " is input to a memory area of one column and then a value different from "1010 . . . " is input to compare them. In such a way, the voltage supply unit 109 is able to supply voltages with a plurality of memory inspection patterns having patterns of bit sequences that are different from each other.

As described above, the voltage supply unit 109 of the present embodiment can store a first inspection signal including one or more of the plurality of memory inspection patterns for each bit of the column memory 106. When the first inspection signal includes a plurality of memory inspection patterns having different values from each other, the voltage supply unit 109 sequentially outputs these plurality of memory inspection patterns to the column memory 106 and stores them in the column memory 106. Since this signal is supplied as a digital signal without routing the readout unit, the signal is stored in the column memory 106 without being affected by an external noise with respect to the bits of all the digits. Therefore, according to the present embodiment, it is possible to store a more accurate inspection signal in the column memory 106, compared to a case where AD conversion is performed on an analog signal such as a signal output from a dark pixel to obtain an inspection signal. This allows more accurate anomaly detection to be performed by collating a memory inspection pattern which is input to the column memory 106 with a memory inspection pattern which is output from the column memory 106.

Figure 5:
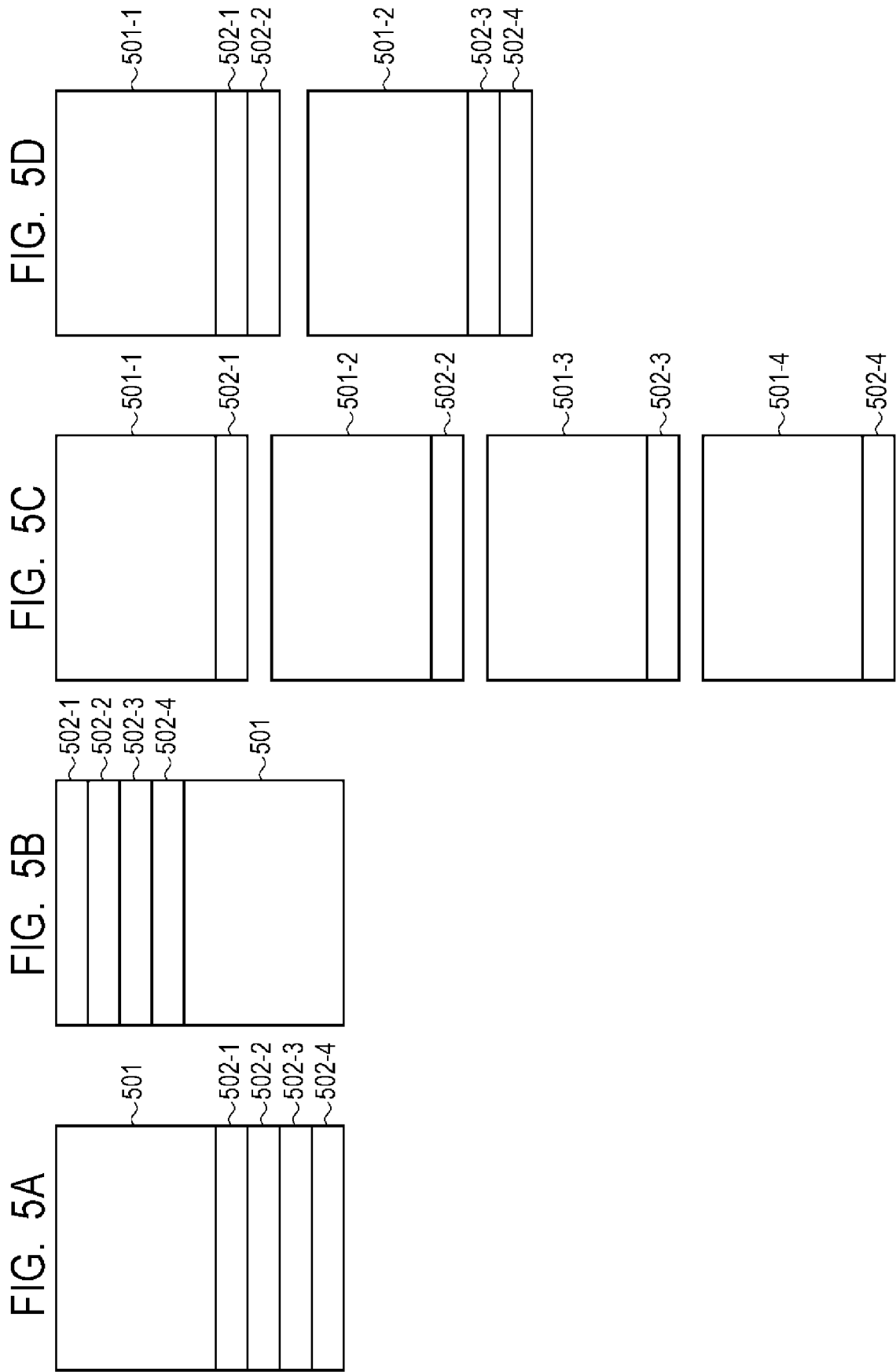
FIG. 5A, FIG. 5B, FIG. 5C and FIG. 5D are schematic diagrams of image data output from the solid-state imaging device according to the first embodiment.

FIG. 5A to FIG. 5D are schematic diagrams illustrating configurations of image data of one or a plurality of frames out of multiple frames output from the image output circuit 108 of the solid-state imaging device 100 according to the first embodiment. A region 501 illustrated in FIG. 5A represents image data acquired by the solid-state imaging device 100. Regions 502-1 to 502-4 represent data of four types of memory inspection patterns. In such a way, as illustrated in FIG. 5A, data of the memory inspection patterns can be attached to one frame of image data and then output. Further, in the example of FIG. 5A, the data of the memory inspection patterns are attached under the image data, that is, output after the image data is output. However, this order may be opposite, and the data of the memory inspection patterns may be attached above the image data, as illustrated in FIG. 5B. In other words, the data of the memory inspection patterns may be output before the image data is output. Note that, in schematic diagrams such as FIG. 5A to FIG. 5D illustrating the frame configurations in the present specification, signals depicted with rectangular regions are sequentially output from the upper side in the drawing. That is, each of these schematic diagrams indicates the order of data output. More specifically, FIG. 5A illustrates that the memory inspection patterns are output from the column memory 106 after the end of output of image data of a particular frame. FIG. 5B illustrates that the memory inspection patterns are output from the column memory 106 before the start of output of image data of a particular frame. Further, image data of another frame is output before and after the output of the signals illustrated in FIG. 5A and FIG. 5B. In other words, in FIG. 5A and FIG. 5B, the memory inspection patterns are output from the column memory 106 in a period after the output of one frame of image data ends and before the output of image data of the next frame starts.

When the column memory inspection period is longer than the required time necessary for input and output of the column memory inspection patterns to the column memory 106, all the column memory inspection patterns can be attached to an image of one frame, as illustrated in FIG. 5A or FIG. 5B. When the column memory inspection period is shorter than the above-described required time, the time required to attach data of all the memory inspection patterns to an image of one frame cannot be ensured. Also in this case, however, inspection of the column memory 106 can be performed in a similar manner by dividing and attaching the plurality of memory inspection patterns for a plurality of image data, as illustrated in FIG. 5C or FIG. 5D. In the example illustrated in FIG. 5C, regions 501-1 to 501-4 represent image data from the first frame to the fourth frame. In FIG. 5C, the data of the memory inspection patterns are attached to the image data from the first frame to the fourth frame one by one. Further, as seen in the example illustrated in FIG. 5D, two memory inspection patterns may be attached to each image data of the first frame and the second frame, and the optimum configuration can be selected as appropriate in accordance with the relationship between the length of the column memory inspection period and the above-described required time.

Figure 6:
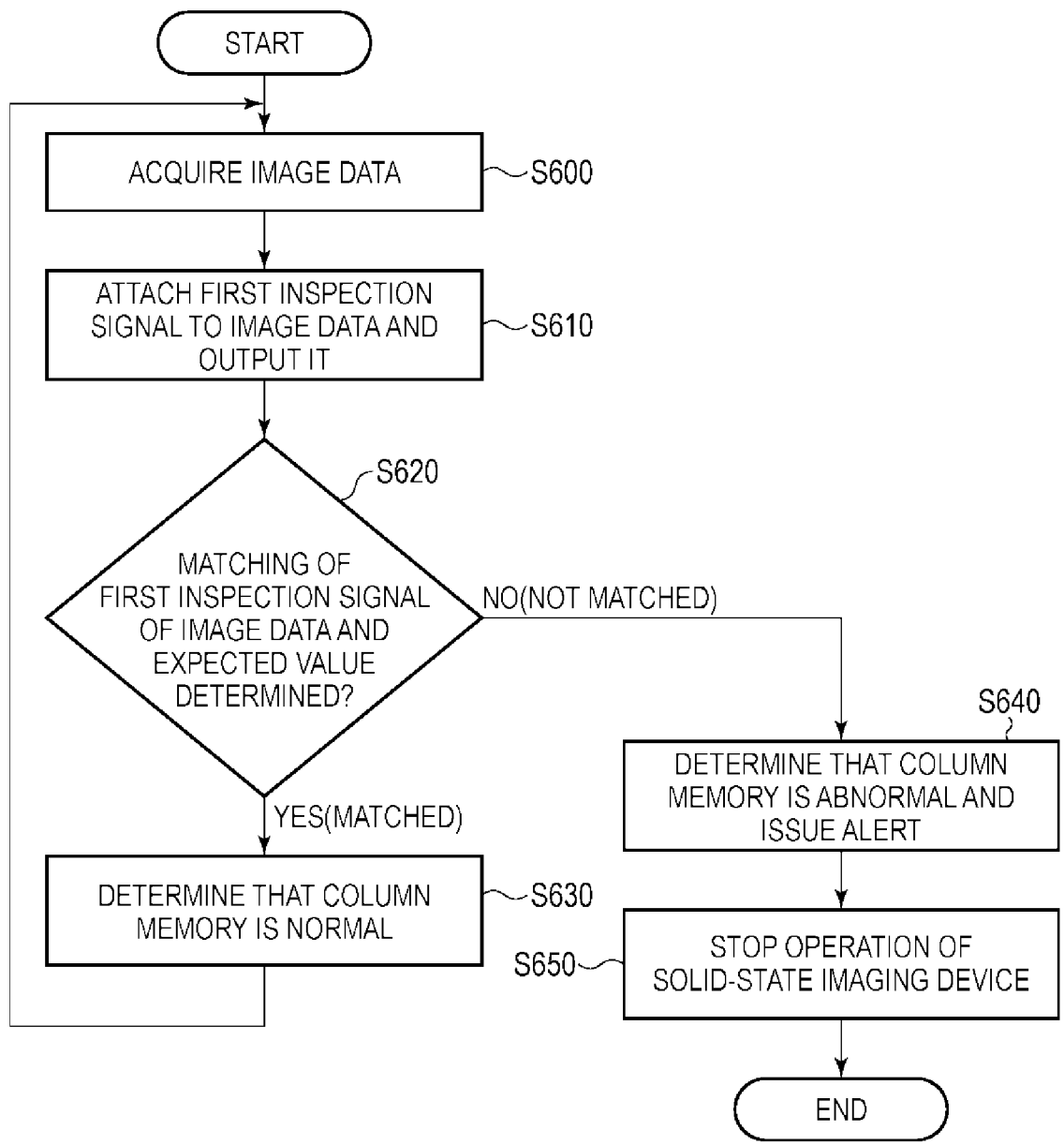
FIG. 6 is a flowchart illustrating an operation of an imaging system on which the solid-state imaging device according to the first embodiment is mounted.

FIG. 6 is a flowchart illustrating the operation of an imaging system including the solid-state imaging device 100 according to the first embodiment. Examples of the imaging system on which the solid-state imaging device 100 is mounted may include a digital still camera, a digital camcorder, a surveillance camera, an on-vehicle camera, and the like. Further, the imaging system on which the solid-state imaging device 100 is mounted may be a system included in a movable object such as a vehicle discussed in an embodiment described later. The operation illustrated in FIG. 6 is an operation performed mainly by the solid-state imaging device 100 and a signal processing unit provided inside the imaging system.

At step S600, the solid-state imaging device 100 performs operations described with reference to FIG. 3, FIG. 4, or the like to acquire image data. Next, at step S610, the solid-state imaging device 100 attaches a first inspection signal including one or more memory inspection patterns to the image data and outputs them to the signal processing unit of the imaging system. This operation is performed within a column memory inspection period.

A value of the first inspection signal which is expected when there is no anomaly in the column memory 106 (hereafter, a value which is expected when there is no anomaly is referred to as an expected value) is held in advance in an image processing unit. At step S620, the image processing unit collates the first inspection signal included in image data output from the solid-state imaging device 100 with the expected value to perform matching determination. If the first inspection signal in the image data matches the expected value (step S620, Yes), the imaging system determines that the column memory 106 is normal (step S630) and enters step S600 to continue acquisition of image data. If the first inspection signal in the image data does not match the expected value, (step S620, No), the imaging system determines that the column memory 106 is abnormal, issues an alert indicating the anomaly of the solid-state imaging device 100 (step S640), and enters step S650. The issuance of the alert may include causing a user to recognize occurrence of an anomaly by a scheme such as displaying, on a display device provided in the imaging system, that there is an abnormal state, for example. Then, at step S650, the imaging system stops the operation of the solid-state imaging device 100.

As discussed above, according to the present embodiment, a solid-state imaging device which can output a more accurate anomaly detection signal is provided. Anomaly detection of a solid-state imaging device can be performed at a higher accuracy by performing anomaly detection by using such a signal.

Second Embodiment

Figure 7:
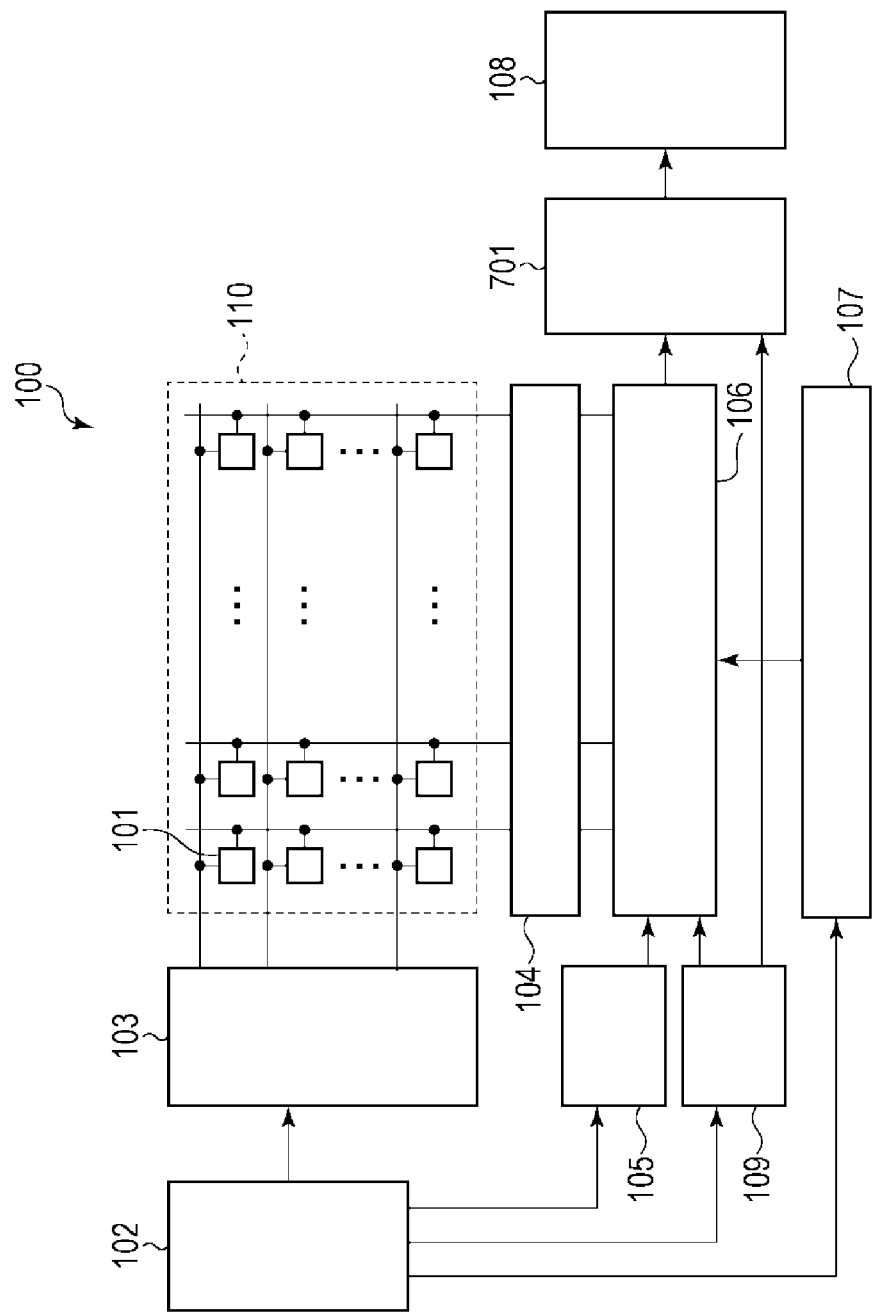
FIG. 7 is a block diagram of a solid-state imaging device according to a second embodiment.

FIG. 7 is a block diagram illustrating a general configuration of the solid-state imaging device 100 according to the second embodiment of the present invention. In the solid-state imaging device 100 of the present embodiment, a first determination unit 701 is further provided in addition to the configuration of the first embodiment. The first determination unit 701 is a circuit that has a function of performing matching determination corresponding to step S620 in the first embodiment and outputting a first determination result that is the matching determination result. In order to perform such matching determination, the first inspection signal output from the voltage supply unit 109 is input to the first determination unit 701. This first inspection signal is used as the expected value to be compared in the matching determination. Further, the first inspection signal stored in the column memory 106 and then output from the column memory 106 is also input to the first determination unit 701. This allows the first determination unit 701 to perform matching determination of the first inspection signal output from the column memory 106 with the expected value.

Figure 8:
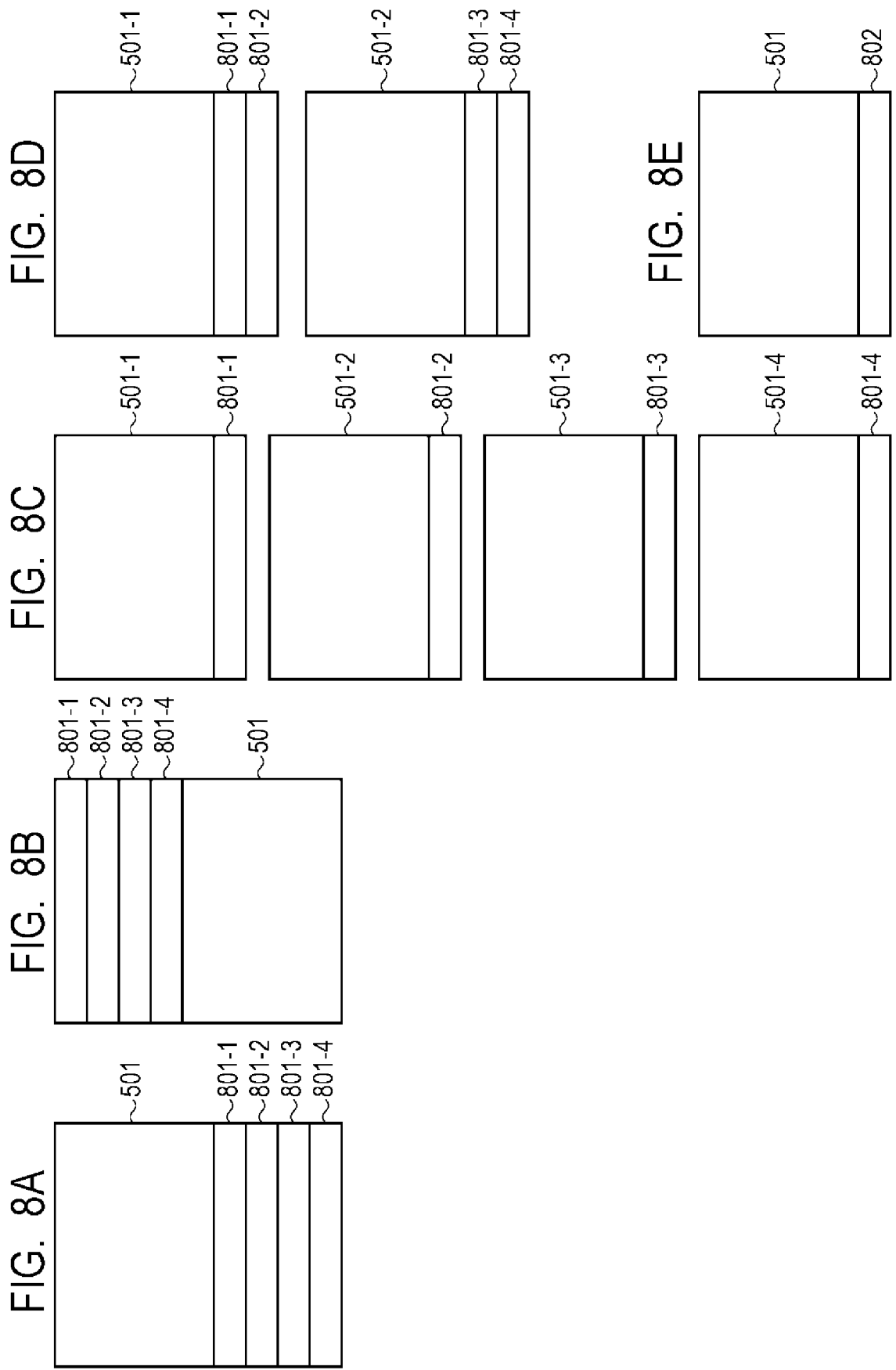
FIG. 8A, FIG. 8B, FIG. 8C, FIG. 8D and FIG. 8E are schematic diagrams of image data output from the solid-state imaging device according to the second embodiment.

FIG. 8A to FIG. 8E are schematic diagrams illustrating configurations of one frame of image data output from the image output circuit 108 of the solid-state imaging device 100 according the second embodiment. Regions 801-1 to 801-4 represent data of the first determination results indicating determination results in the first determination unit 701 for respective memory inspection patterns. As illustrated in FIG. 8A, the data of the first determination results may be attached to one frame of image data and then output. Further, in the example of FIG. 8A, the data of the first determination results are attached under the image data, that is, output after the image data is output. However, this order may be opposite, and the data of the first determination results may be attached above the image data, as illustrated in FIG. 8B. In other words, the data of the first determination results may be output before the image data is output.

Further, in a similar manner to the case of the first embodiment, when the column memory inspection period is shorter than the required time, inspection of the column memory 106 can be performed by dividing and attaching the first determination results from respective memory inspection patterns with respect to a plurality of image data as illustrated in FIG. 8C and FIG. 8D. Note that data indicating whether or not all the determination results from respective memory inspection patterns are normal or whether or not at least one of the determination results is abnormal may be defined as the first determination result to reduce the number of determination result data. FIG. 8E depicts an example illustrating the first determination result reduced to one in such a way as a region 802.

Figure 9:
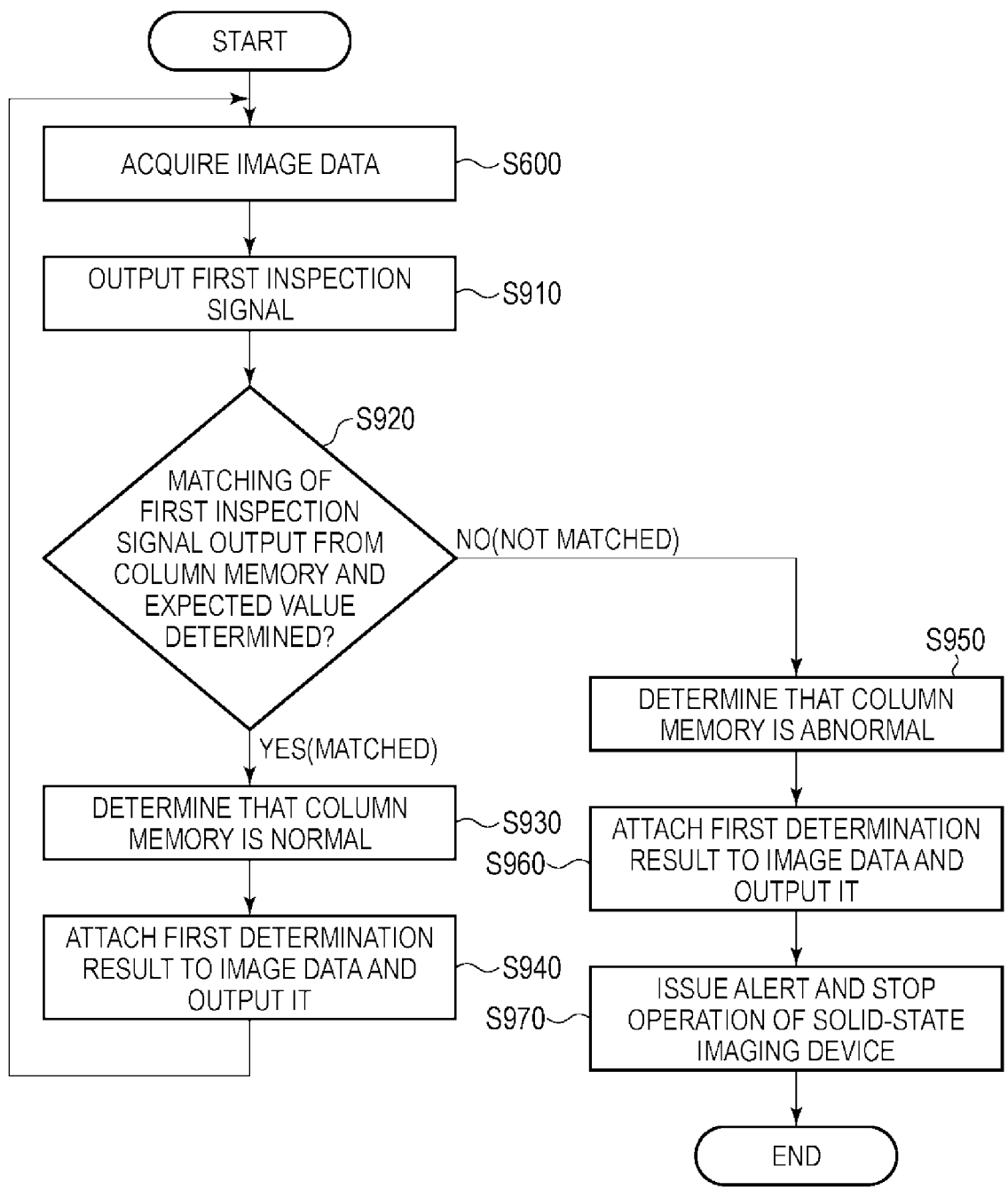
FIG. 9 is a flowchart illustrating an operation of an imaging system on which the solid-state imaging device according to the second embodiment is mounted.

FIG. 9 is a flowchart illustrating the operation of the imaging system including the solid-state imaging device 100 according to the second embodiment. The description of the steps in which the same operation as that in FIG. 6 is performed may be omitted or simplified.

At step S910, the voltage supply unit 109 outputs the first inspection signal to the column memory 106 and the first determination unit 701. The column memory 106 stores the first inspection signal and then outputs the stored first inspection signal to the first determination unit 701. The first inspection signal output from the voltage supply unit 109 directly to the first determination unit 701 is used as the expected value to be compared in the matching determination.

At step S920, the first determination unit 701 collates the first inspection signal output from the column memory 106 with the expected value to perform matching determination. If the first inspection signal output from the column memory 106 matches the expected value (step S920, Yes), the imaging system determines that the column memory 106 is normal (step S930). Then, at step S940, the first determination unit 701 attaches data of the first determination result indicating that the column memory 106 is normal to image data, and the image output circuit 108 outputs the image data to which the data of the first determination result is attached. The process then enters step S600 to continue acquisition of image data.

If the first inspection signal output from the column memory 106 does not match the expected value (step S920, No), the imaging system determines that the column memory 106 is abnormal (step S950). Then, at step S960, the first determination unit 701 attaches data of the first determination result indicating that the column memory 106 is abnormal to image data, and the image output circuit 108 outputs the image data to which the data of the first determination result is attached. In response to this image data, the imaging system issues an alert indicating an anomaly of the solid-state imaging device 100 and stops the operation of the solid-state imaging device 100 (step S970). Note that attachment of data of the first determination result to image data may be performed by the image output circuit 108.

As discussed above, according to the present embodiment, anomaly detection of a solid-state imaging device can be performed at a higher accuracy by performing anomaly detection by using a more accurate anomaly detection signal.

Third Embodiment

Figure 10:
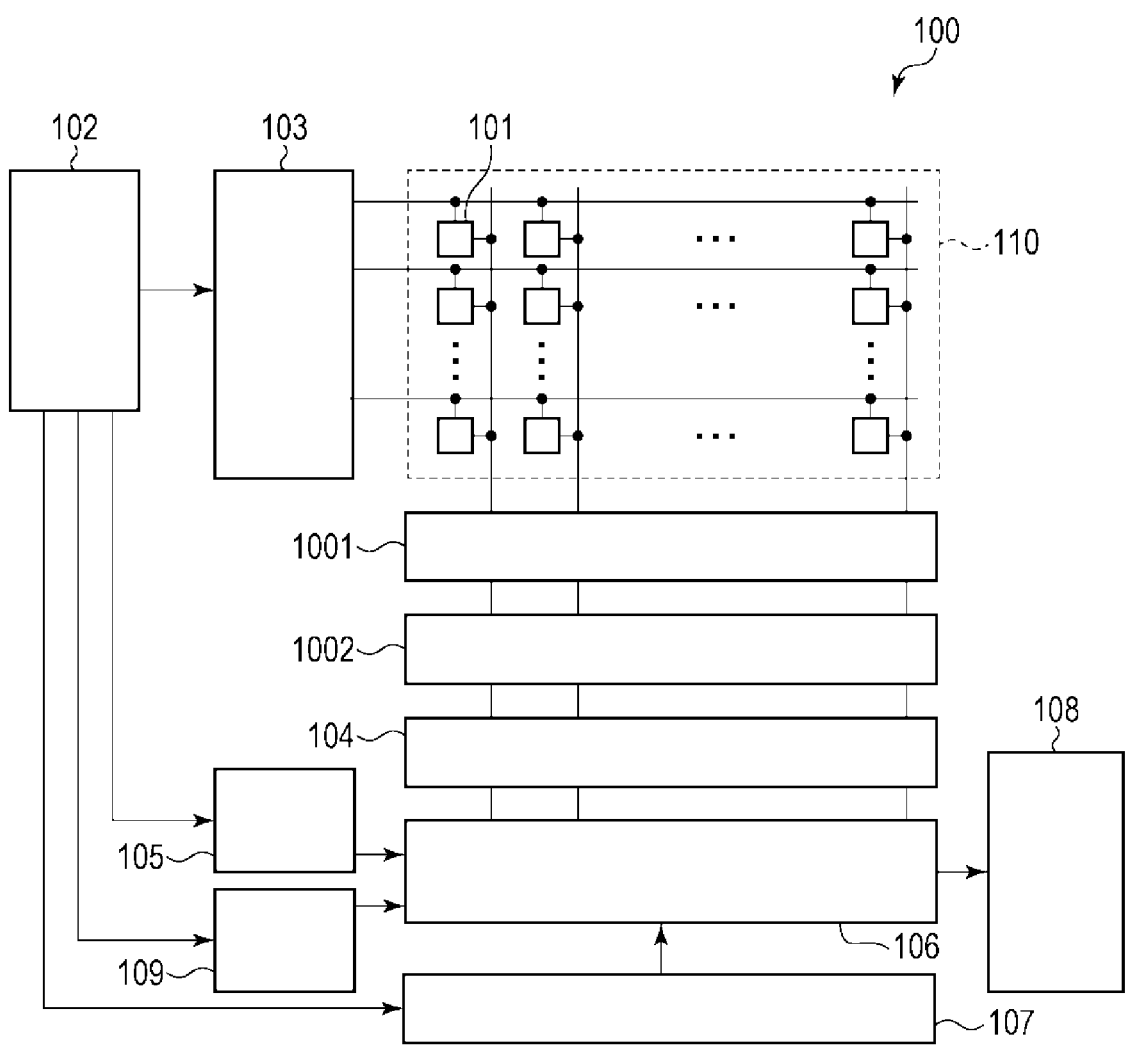
FIG. 10 is a block diagram of a solid-state imaging device according to a third embodiment.

FIG. 10 is a block diagram illustrating a general configuration of the solid-state imaging device 100 according to a third embodiment of the present invention. The solid-state imaging device 100 of the present embodiment further has an input selection circuit 1001 that selects a signal to be read out and a column amplifier circuit 1002 (an amplifier unit) that amplifies an input image signal as an analog signal without conversion for each column, in addition to the imaging device of the first embodiment.

Figure 11:
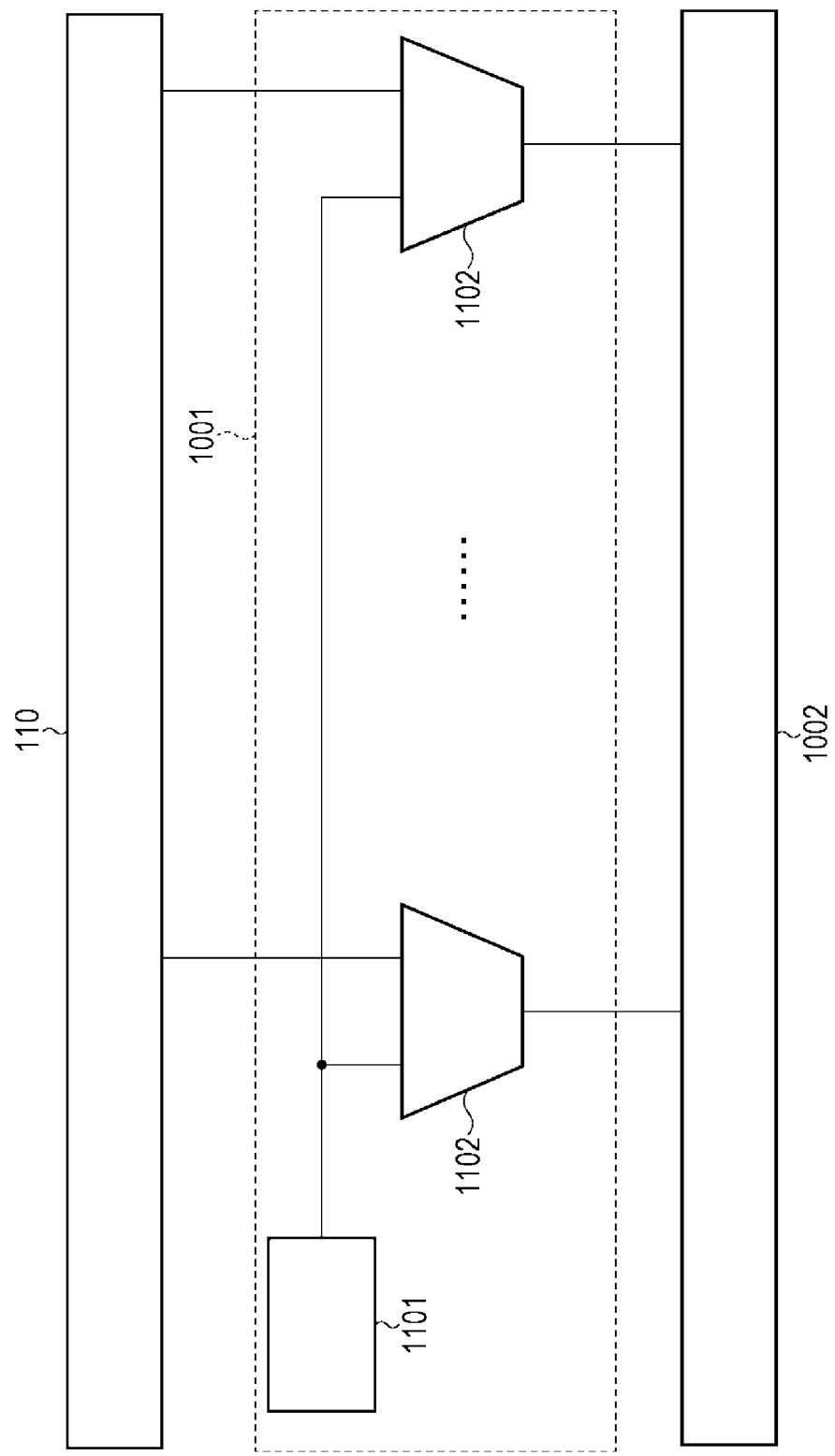
FIG. 11 is a block diagram of an input selection circuit according to the third embodiment.

FIG. 11 is a block diagram of the input selection circuit 1001 according to the third embodiment. Inside a clip circuit, the input selection circuit 1001 includes a voltage source 1101 and selectors 1102 provided on the corresponding columns. The voltage source 1101 outputs a predetermined fixed voltage as a second inspection signal to each selector 1102. That is, the voltage source 1101 functions as a second inspection signal output unit that supplies a second inspection signal that is an analog signal. A pixel signal is input to one of the input terminals of each of the selectors 1102 via the vertical output line. The second inspection signal is input from the voltage source 1101 to the other input terminal of each of the selectors 1102. Each of the selectors 1102 selectively outputs the second inspection signal or the pixel signal to the column amplifier circuit 1002. The second inspection signal is an inspection pattern for performing inspection of the column amplifier circuit 1002 (a column amplifier circuit inspection pattern). Each of the selectors 1102 selects and outputs the second inspection signal at a timing for performing inspection of the column amplifier circuit 1002 or the like.

The second inspection signal selected and output by the selector 1102 is input to the comparator circuit unit 104, and AD conversion is performed in the same manner as that for the pixel signal. The second inspection signal that is converted into a digital signal by AD conversion is stored in the column memory 106, attached to image data, and output to the outside of the solid-state imaging device 100. In the present embodiment, while inspection of the column memory 106 described in the first embodiment may also be performed, it is the same as that in the first embodiment and thus the description thereof will be omitted.

Figure 12:
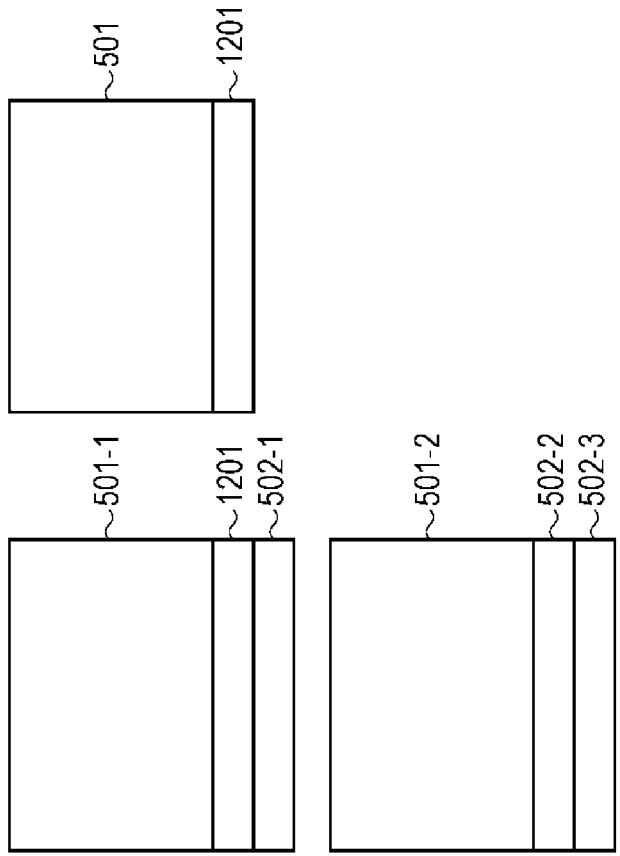
FIG. 12A, FIG. 12B, FIG. 12C, FIG. 12D and FIG. 12E are schematic diagrams of image data output from the solid-state imaging device according to the third embodiment.

FIG. 12A to FIG. 12E are schematic diagrams illustrating the configuration of one frame of image data output from the image output circuit 108 of the solid-state imaging device 100 according to the third embodiment. A region 1201 represents data of the second inspection signal obtained after AD conversion. That is, in the present embodiment, in addition to the image data and the memory inspection pattern illustrated in FIG. 5A to FIG. 5D, a column amplifier circuit inspection pattern is further attached and output. As illustrated in FIG. 12A, data of the column amplifier circuit inspection pattern is attached to one frame of image data and then output. Further, in the example illustrated in FIG. 12A, the data of the column amplifier circuit inspection pattern is attached under the image data, that is, output after the image data is output. However, this order may be opposite, and the data of the column amplifier circuit inspection pattern may be attached above the image data, as illustrated in FIG. 12B. In other words, the data of the column amplifier circuit inspection patterns may be output before the image data is output. Furthermore, as illustrated in FIG. 12C, the order of the memory inspection pattern and the column amplifier circuit inspection pattern may be opposite to that in FIG. 12A, and this order is not limited.

Further, when a plurality of memory inspection pattern is divided and attached with respect to a plurality of image data as described in the first embodiment, the column amplifier circuit inspection pattern may be attached to one of the plurality of image data, as illustrated in FIG. 12D. Further, as illustrated in FIG. 12E, the column amplifier circuit inspection pattern may be attached to the image data to which no memory inspection pattern is attached.

Figure 13:
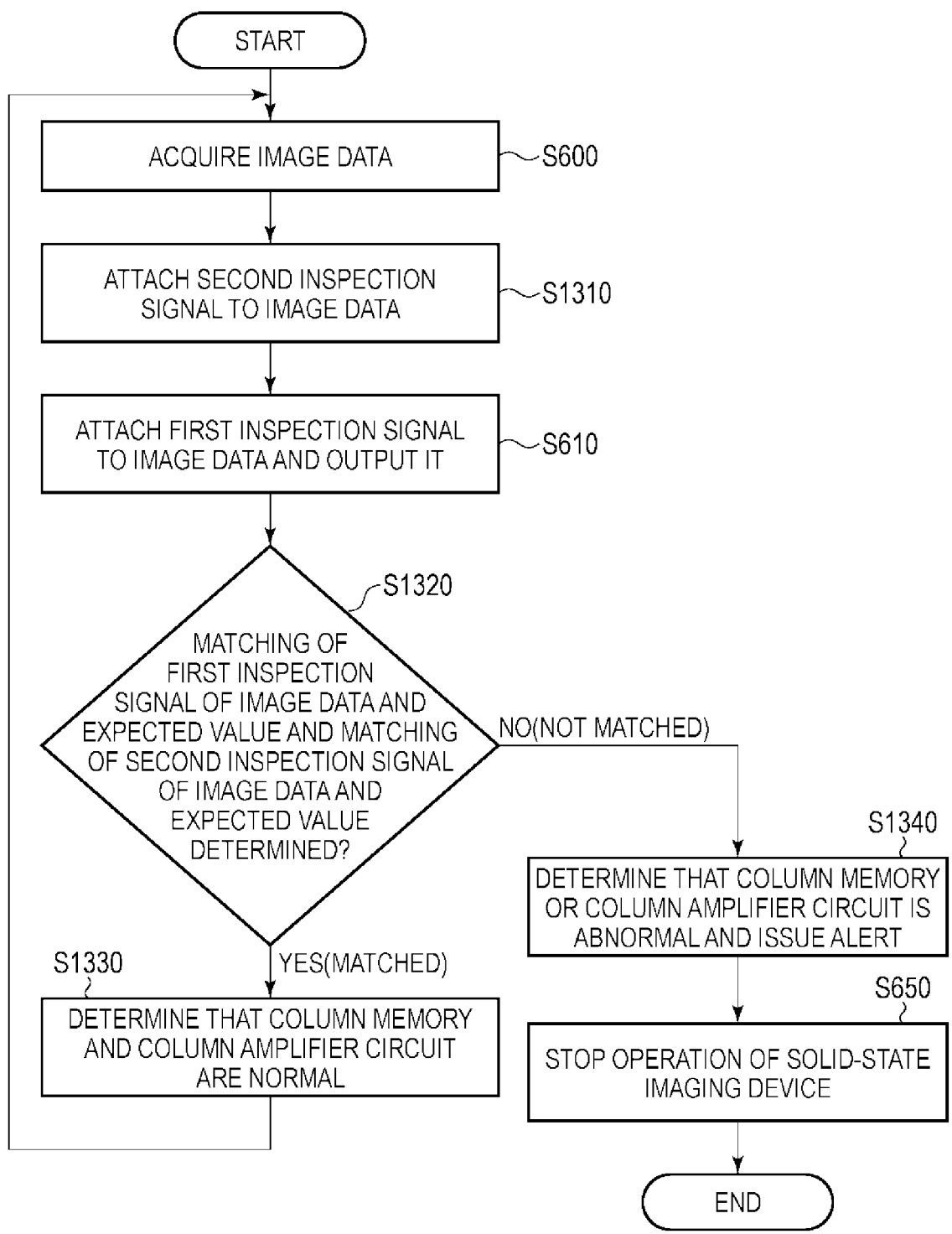
FIG. 13 is a flowchart illustrating an operation of an imaging system on which the solid-state imaging device according to the third embodiment is mounted.

FIG. 13 is a flowchart illustrating the operation of the imaging system including the solid-state imaging device 100 according to the third embodiment. The description of the steps in which the same operation as that in FIG. 6 or FIG. 9 is performed may be omitted or simplified.

At step S1310, the solid-state imaging device 100 attaches, to image data, the second inspection signal that has been AD-converted by the readout unit. Then, at step S610, in the same manner as the first embodiment, the solid-state imaging device 100 attaches the first inspection signal to image data and outputs them to the signal processing unit of the imaging system. Note that the order of step S1310 and step S610 may be opposite.

An expected value of the first inspection signal and an expected value of the second inspection signal are held in advance in the image processing unit. At step S1320, the image processing unit performs matching determination for collating the first inspection signal included in the image data with the expected value of the first inspection signal and, further, matching determination for collating the second inspection signal included in the image data with the expected value of the second inspection signal.

If matching is resulted in both of the above matching determination operations (step S1320, Yes), the imaging system determines that the column memory 106 and the column amplifier circuit 1002 are normal (step S1330) and enters step S600 to continue acquisition of image data.

If no matching is resulted in at least one of the above matching determination operations (step S1320, No), the imaging system determines that the column memory 106 or the column amplifier circuit 1002 is abnormal and issues an alert indicating an anomaly of the solid-state imaging device 100 (step S1340). The process then enters step S650. At step S650, the imaging system stops the operation of solid-state imaging device 100.

As discussed above, according to the present embodiment, it is possible to perform inspection of the column amplifier circuit 1002 in addition to obtaining the advantages of the inspection of the column memory 106 described in the first embodiment. This allows anomaly detection of a solid-state imaging device to be performed at a higher accuracy.

Note that, since the second inspection signal is output via the readout unit formed of the comparator circuit unit 104 or the like, the second inspection signal may include a noise due to the readout unit. It is therefore desirable to perform determination taking an error due to such a noise into consideration in matching determination using the second inspection signal. For example, such a determination criterion may be used that an anomaly is determined when there is a mismatch to the expected value and the mismatch is greater than an error due to an expected noise.

Further, an object to be inspected by the second inspection signal is not limited to the column amplifier circuit 1002, and an element provided within a path, such as the vertical signal line, the input selection circuit 1001, or the like, on which a pixel signal is transmitted may be an object to be inspected.

Fourth Embodiment

Figure 14:
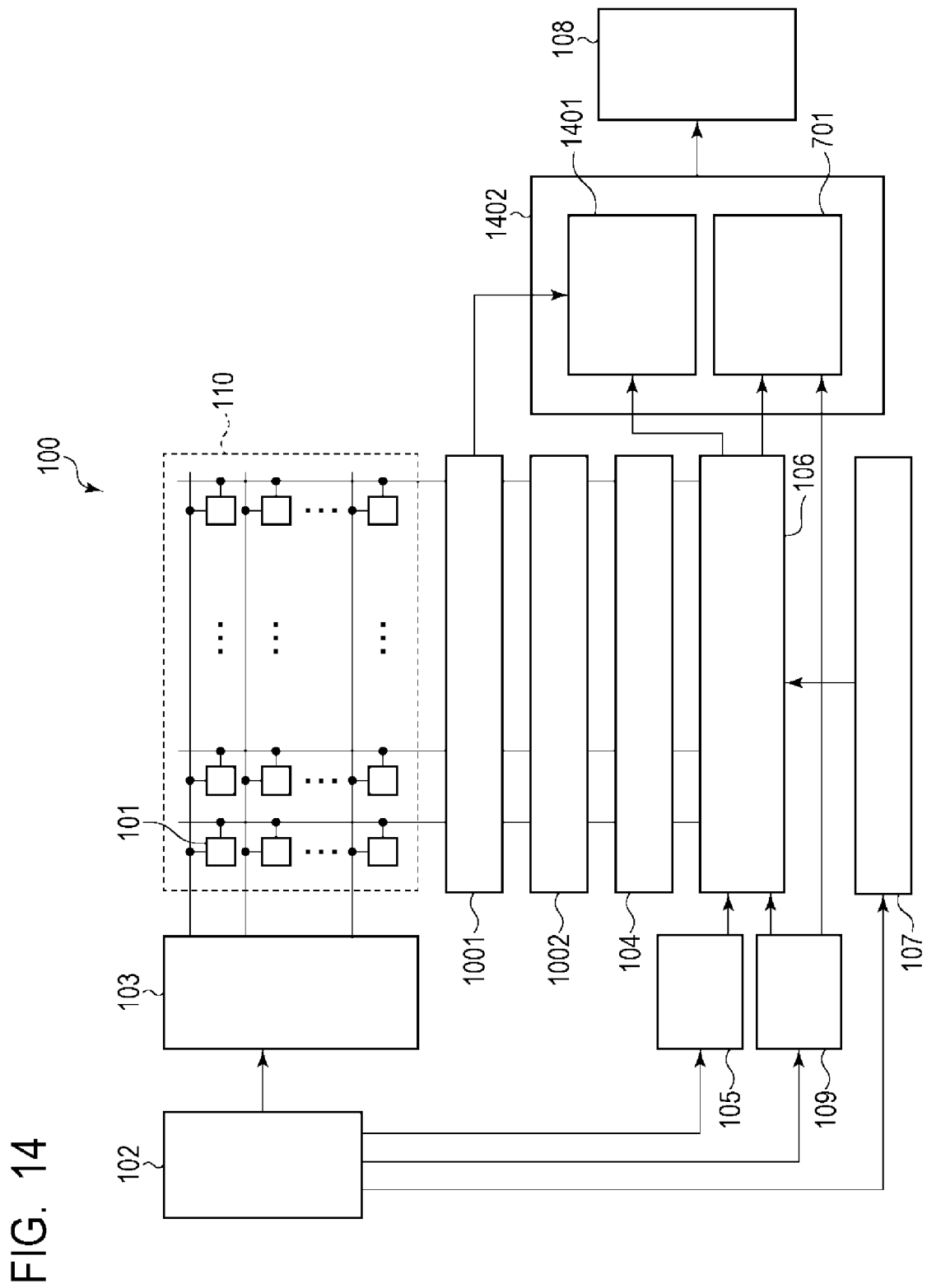
FIG. 14 is a block diagram of a solid-state imaging device according to a fourth embodiment.

FIG. 14 is a block diagram illustrating a general configuration of the solid-state imaging device 100 according to a fourth embodiment of the present invention. In the solid-state imaging device 100 of the present embodiment, a determination circuit 1402 is further provided in addition to the configuration of the third embodiment. The determination circuit 1402 includes the first determination unit 701, which has the same function as the first determination unit 701 of the second embodiment, and a second determination unit 1401.

The determination circuit 1402 is a circuit that has a function of performing matching determination corresponding to step S1320 in the third embodiment and outputting the first determination result and the second determination result that are the matching determination results. In order to perform such matching determination, the first inspection signal output from the voltage supply unit 109 is input to the first determination unit 701. Further, the second inspection signal output from the voltage source 1101 of the input selection circuit 1001 is input to the second determination unit 1401. The first inspection signal and the second inspection signal are used as the expected values to be compared in the matching determination. The first inspection signal stored in the column memory 106 and then output from the column memory 106 is also input to the first determination unit 701. This allows the first determination unit 701 to perform matching determination of the first inspection signal output from the column memory 106 with the expected value. The second inspection signal stored in the column memory 106 after AD conversion and then output from the column memory 106 is also input to the second determination unit 1401. This allows the second determination unit 1401 to perform matching determination of the second inspection signal output from the column memory 106 with the expected value.

FIG. 15A to FIG. 15F are schematic diagrams illustrating configurations of one frame of image data output from the image output circuit 108 of the solid-state imaging device 100 according to the fourth embodiment. A region 1501 represents data of the second determination result indicating the result of determination in the second determination unit 1401. A region 1502 represents data in which the first determination result and the second determination result collectively form one determination result. In the present embodiment, in addition to the image data and the first determination result illustrated in FIG. 8A to FIG. 8E, the second determination result is further attached and output. As illustrated in FIG. 15A, data of the second determination result is attached to one frame of image data and then output. Further, in the example illustrated in FIG. 15A, data of the second determination result is attached under the image data, that is, output after the image data is output. However, the order thereof may be opposite, the data of the column amplifier circuit inspection patterns may be attached above the image data, as illustrated in FIG. 15B. In other words, the data of the column amplifier circuit inspection patterns may be output before the image data is output. Further, as illustrated in FIG. 15C, the order of the first determination result and the second determination result may be opposite to that in FIG. 15A, and the order thereof is not limited.

Further, when the first determination result is divided and attached with respect to a plurality of image data, the second determination result may be attached to one of the plurality of image data, as illustrated in FIG. 15D. Further, as illustrated in FIG. 15E, the second determination result may be attached to the image data to which the first determination result is not attached. As yet another example, as illustrated as a region 1502 in FIG. 15F, the first determination result and the second determination result may be collectively attached to the image data as one determination result.

Figure 16:
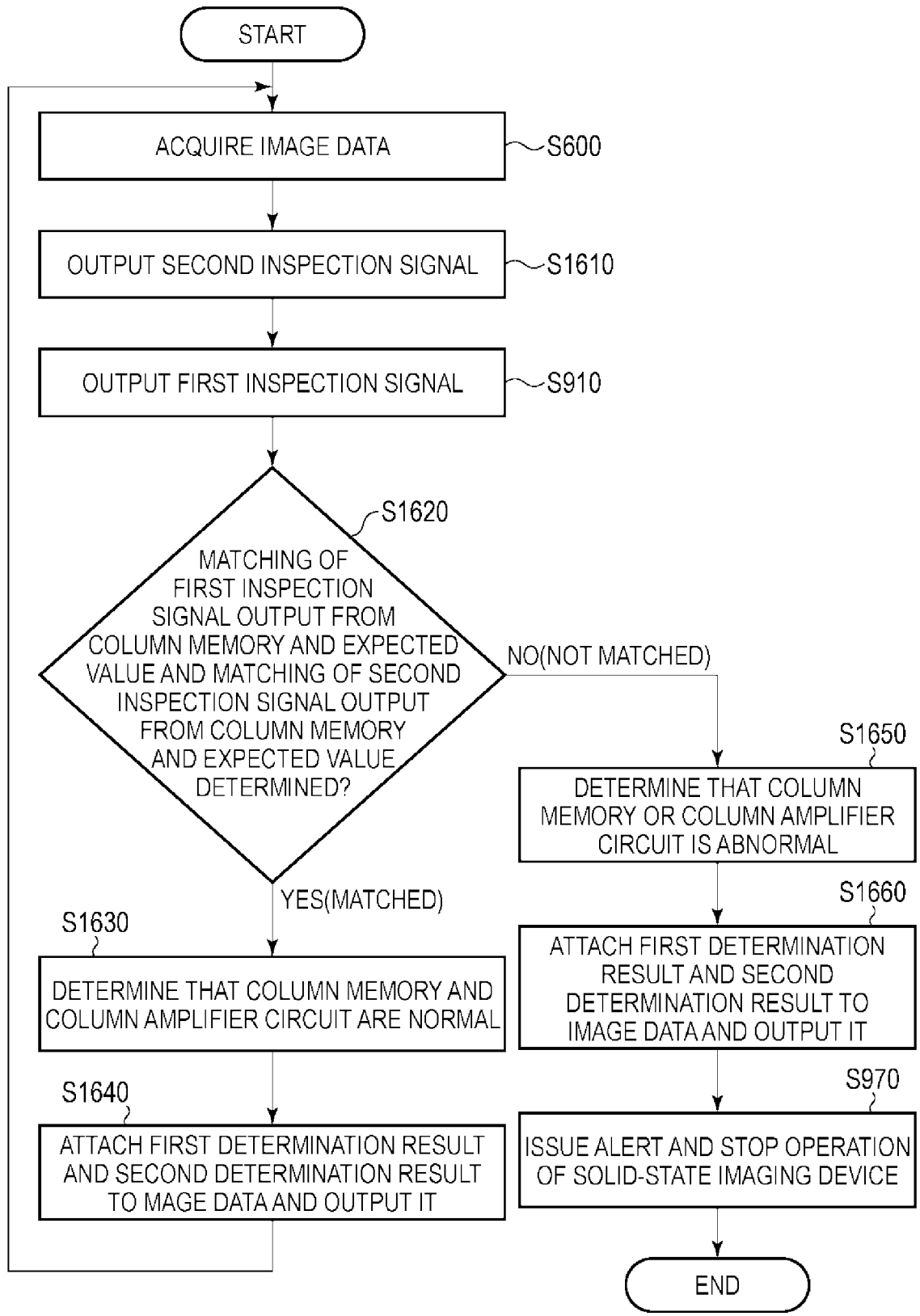
FIG. 16 is a flowchart illustrating an operation of an imaging system on which the solid-state imaging device according to the fourth embodiment is mounted.

FIG. 16 is a flowchart illustrating the operation of an imaging system including the solid-state imaging device 100 according to the fourth embodiment. The description of the steps in which the same operation as that in FIG. 6, FIG. 9, or FIG. 13 is performed may be omitted or simplified.

At step S1610, the voltage source 1101 of the input selection circuit 1001 outputs the second inspection signal to the column amplifier circuit 1002 and the second determination unit 1401. The column memory 106 stores the digitally converted second inspection signal therein and then outputs the stored second inspection signal to the second determination unit 1401. The second inspection signal output from the voltage source 1101 directly to the second determination unit 1401 is used as the expected value to be compared in matching determination. Note that the second inspection signal used as this expected value may be a digitally converted signal so as to be suitable to the matching determination process in the second determination unit 1401, for example.

At step S1620, the first determination unit 701 collates the first inspection signal output from the column memory 106 with the expected value to perform matching determination. Further, the second determination unit 1401 collates the second inspection signal output from the column memory 106 with the expected value to perform matching determination.

If matching is resulted in both of the above matching determination operations (step S1620, Yes), the imaging system determines that the column memory 106 and the column amplifier circuit 1002 are normal (step S1630). Then, at step S1640, the first determination unit 701 attaches data of the first determination result indicating that the column memory 106 is normal to image data, and the second determination unit 1401 attaches the data of the second determination result indicating that the column amplifier circuit 1002 is normal to the image data. The image output circuit 108 then outputs the image data to which the data of the first determination result and the second determination result are attached. The process then enters step S600 to continue acquisition of image data.

If no matching is resulted in at least one of the above matching determination operations (step S1620, No), the imaging system determines that the column memory 106 or the column amplifier circuit 1002 is abnormal (step S1650). Then, at step S1660, the first determination unit 701 and the second determination unit 1401 attach data of the first determination result and the second determination result to image data, respectively. The image output circuit 108 outputs the image data to which the data of the first determination result and the second determination result are attached. In response to this image data, the imaging system issues an alert indicating an anomaly of the solid-state imaging device 100 and stops the operation of solid-state imaging device 100 (step S970).

As discussed above, according to the present embodiment, it is possible to perform inspection of the column amplifier circuit 1002 in addition to obtaining the advantages of the inspection of the column memory 106 described in the first embodiment. This allows anomaly detection of a solid-state imaging device to be performed at a higher accuracy.

Fifth Embodiment

A solid-state imaging device and a failure detection method of the solid-state imaging device according to a fifth embodiment of the present invention will be described with reference to FIG. 17 to FIG. 25.

An output circuit that supports the number of bits forming a column memory is required to inspect all the column memories at the same time, and thus some configuration or the like of the column memory requires to increase the circuit size of the output circuit. The present embodiment illustrates a solid-state imaging device that can realize failure inspection of the column memory or the readout unit in real time without increasing the circuit size of the output circuit.

Figure 17:
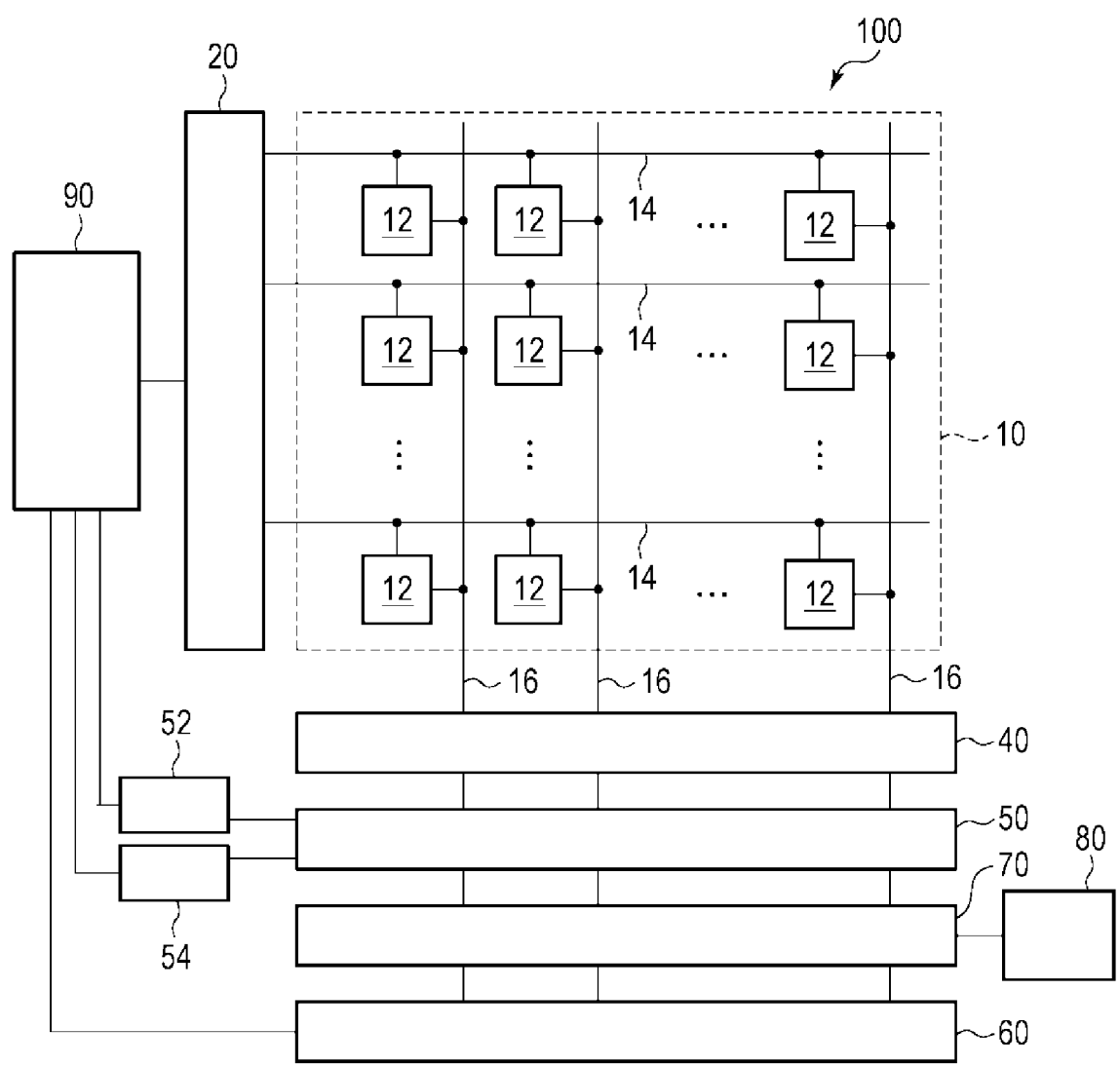
FIG. 17 is a block diagram illustrating a general configuration of a solid-state imaging device according to a fifth embodiment.
Figure 18:
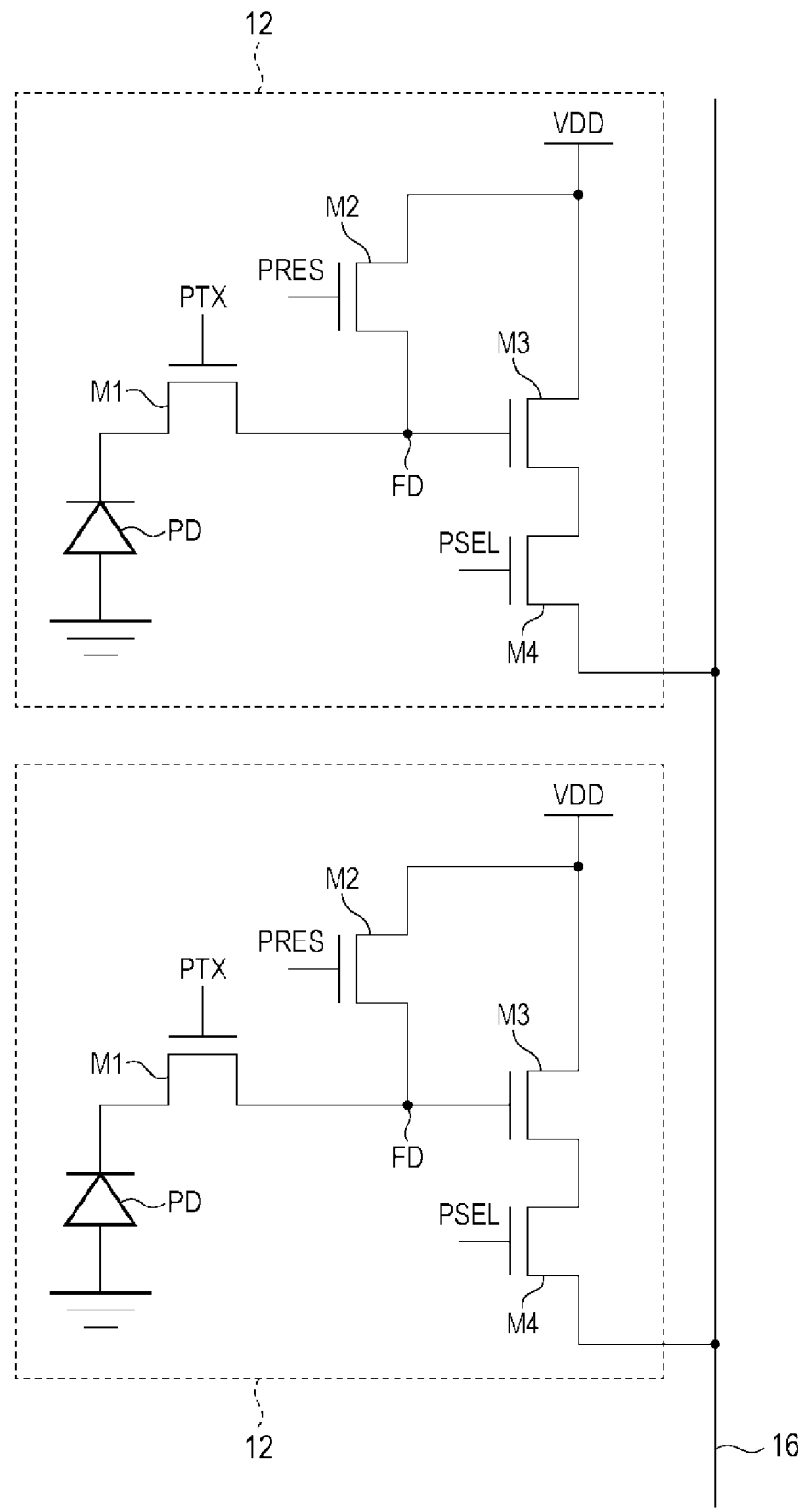
FIG. 18 is a circuit diagram illustrating an example configuration of pixels in the solid-state imaging device according to the fifth embodiment.
Figure 19:
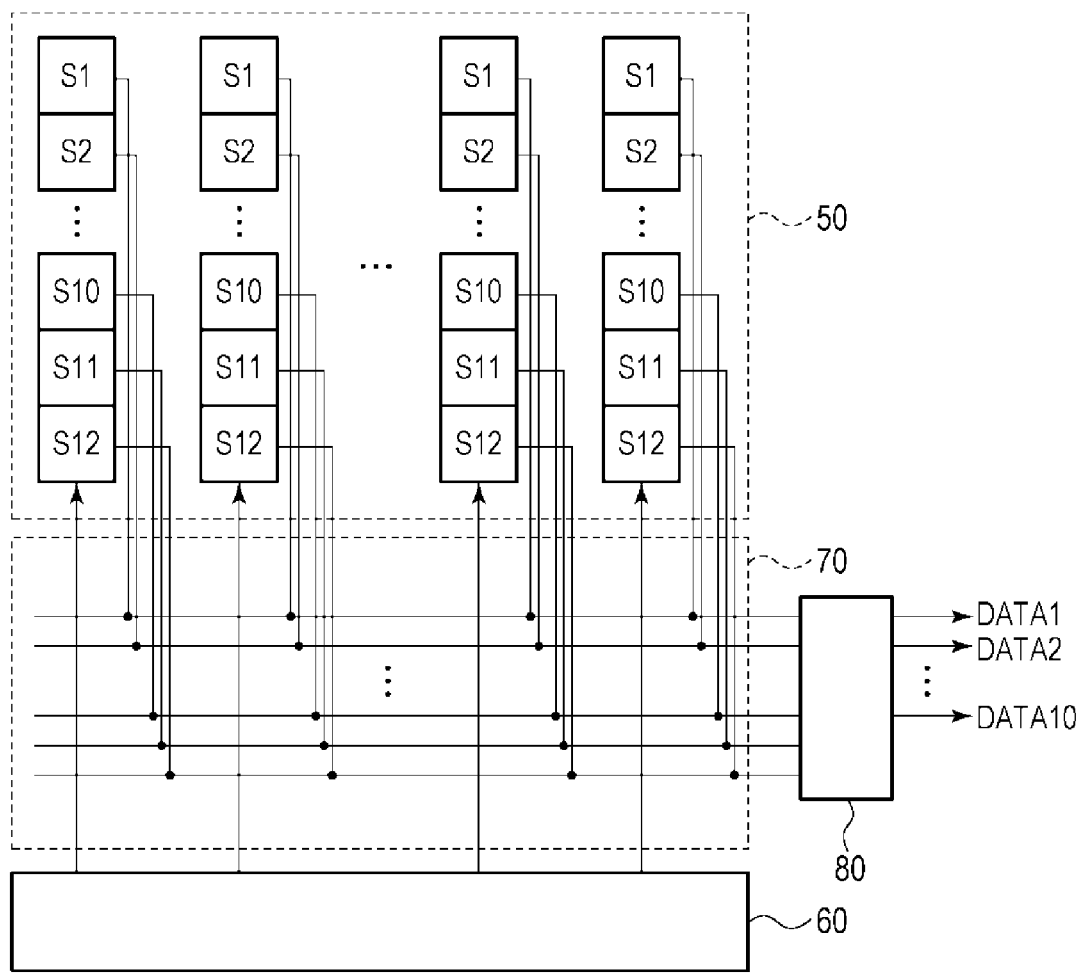
FIG. 19, FIG. 20 and FIG. 21 are block diagrams illustrating example configurations of a memory unit, a horizontal scanning circuit, and a horizontal transfer circuit in the solid-state imaging device according to the fifth embodiment.
Figure 20:
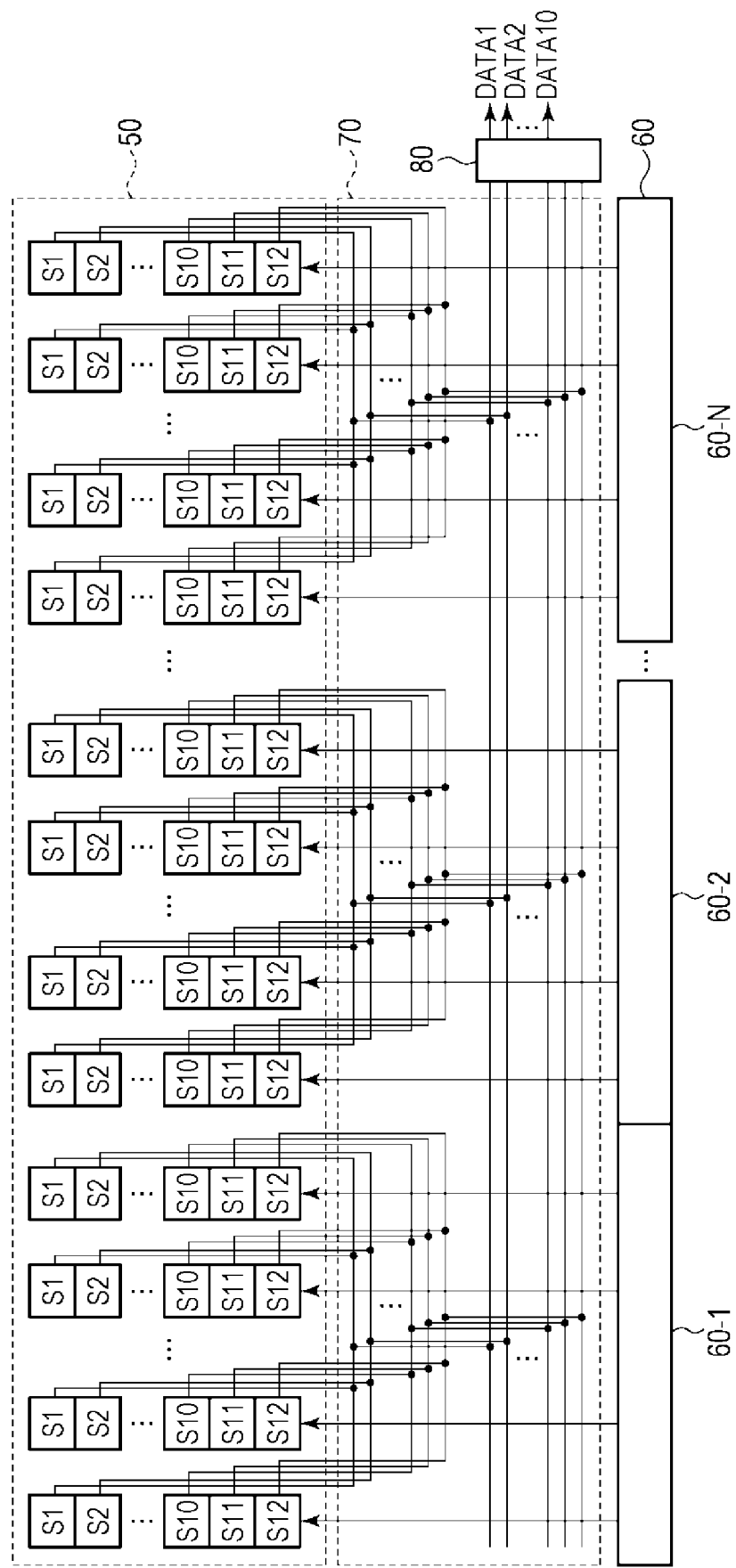
Figure 21:
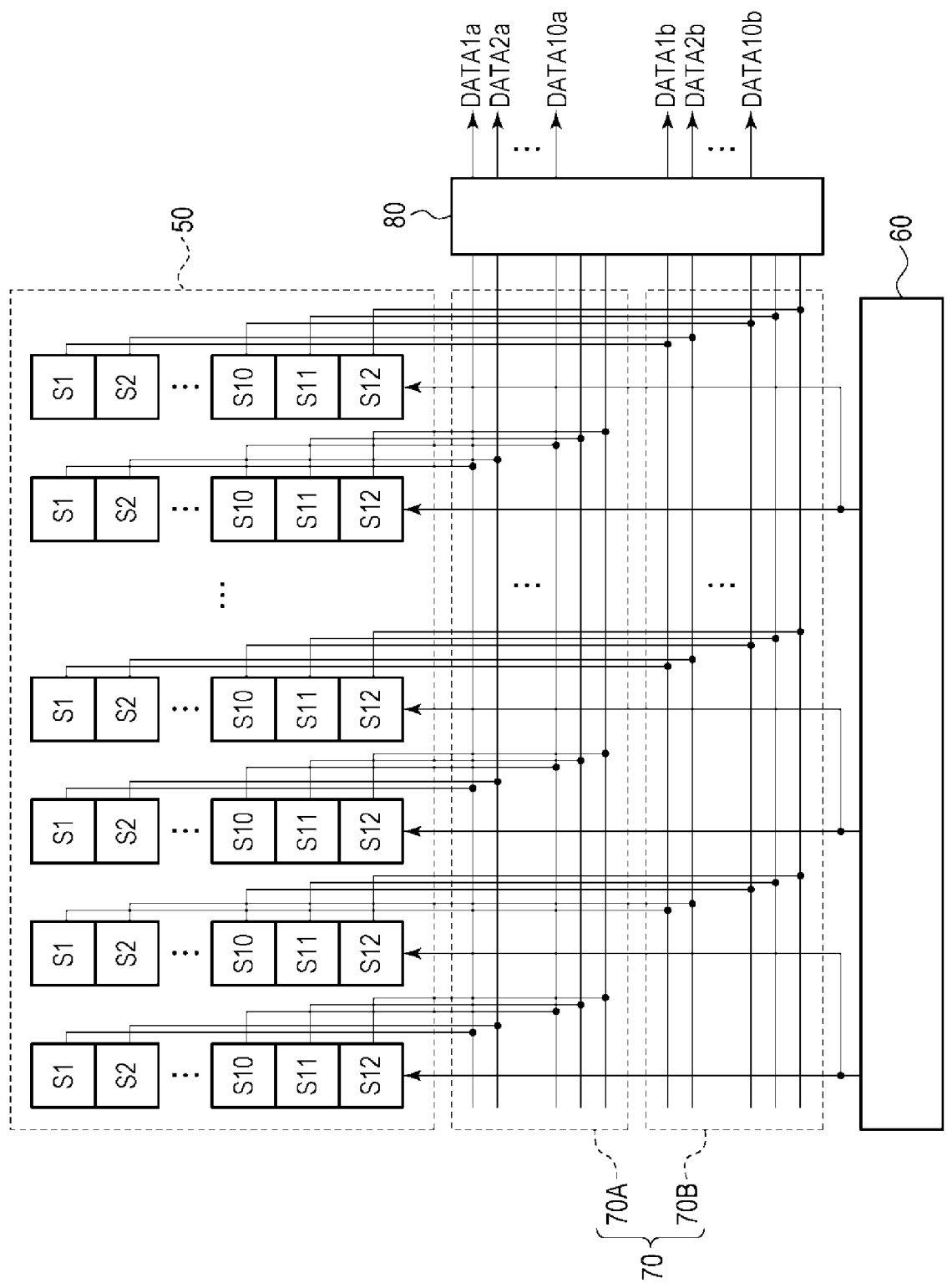
Figure 22:
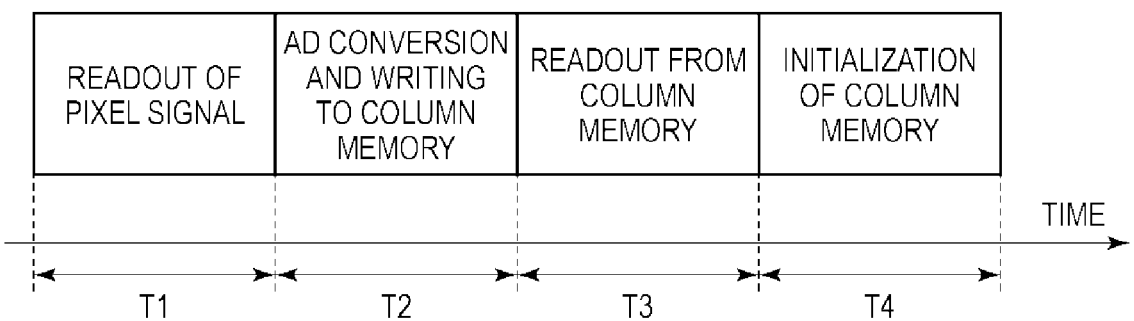
FIG. 22 is a schematic diagram illustrating a readout operation for one row in the solid-state imaging device according to the fifth embodiment.
Figure 24A:
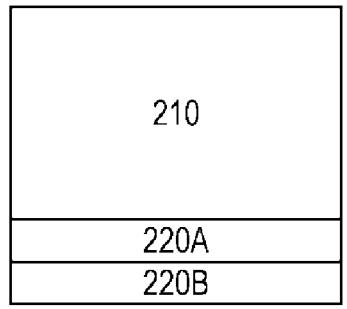
FIG. 24A and FIG. 24B are schematic diagrams illustrating an example configuration of data in a signal processing device outside the solid-state imaging device.
Figure 24B:
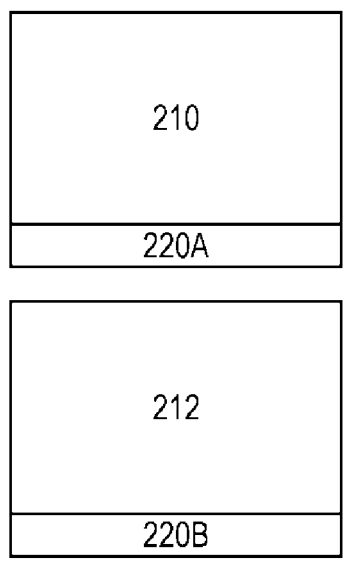
Figure 25:
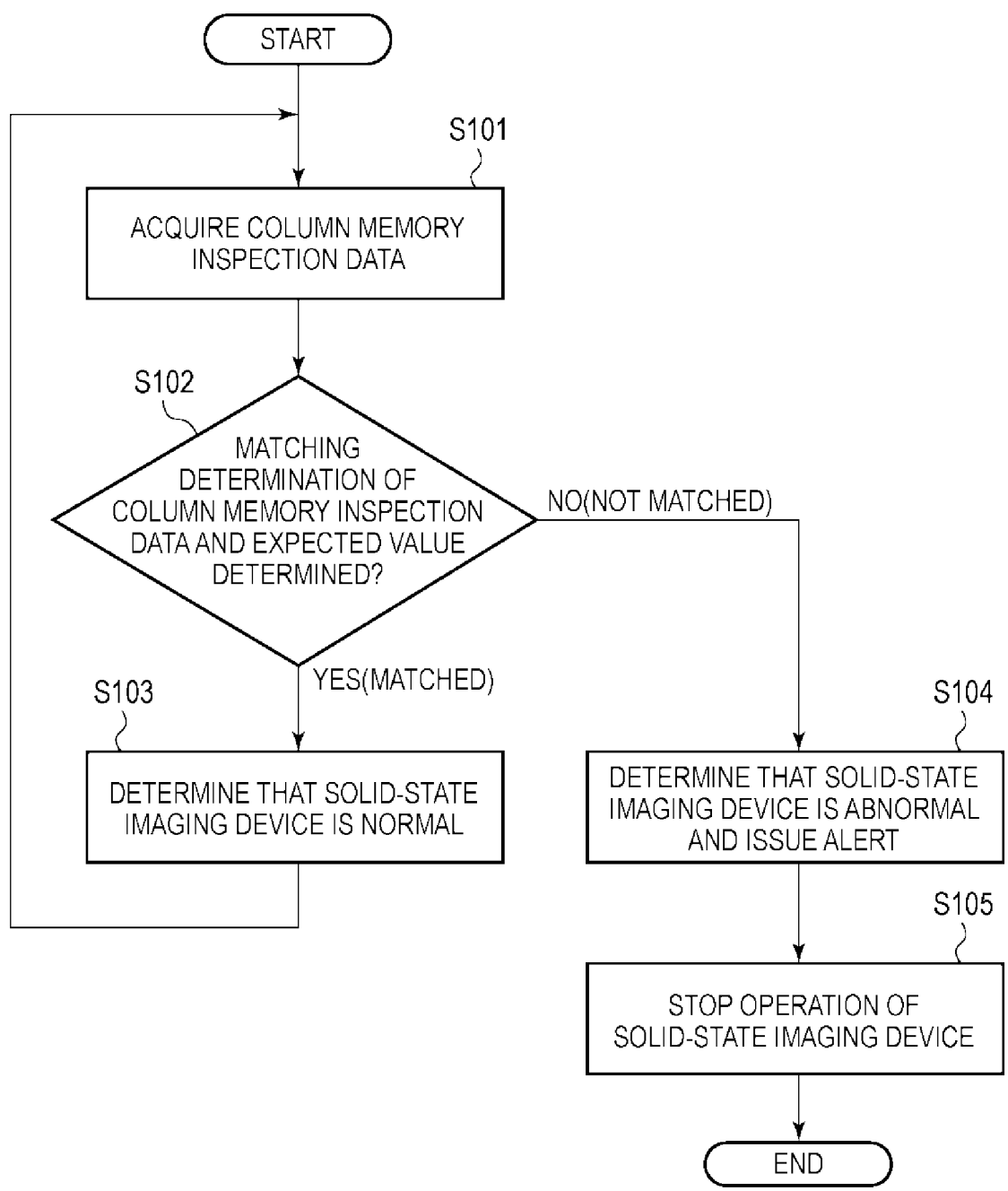
FIG. 25 is a flowchart illustrating a failure detection method of the solid-state imaging device according to the fifth embodiment.

FIG. 17 is a block diagram illustrating a general configuration of the solid-state imaging device according to the present embodiment. FIG. 18 is a circuit diagram illustrating an example configuration of pixels in the solid-state imaging device according to the present embodiment. FIG. 19 to FIG. 21 are block diagrams illustrating example configurations of a memory unit, a horizontal scanning circuit, and a horizontal transfer circuit in the solid-state imaging device according to the present embodiment. FIG. 22 is a schematic diagram illustrating a readout operation for one row in the solid-state imaging device according to the present embodiment. FIG. 23 is a schematic diagram illustrating a method of driving the solid-state imaging device according to the present embodiment. FIG. 24A and FIG. 24B are schematic diagrams illustrating an example configuration of data in a signal processing device outside the solid-state imaging device. FIG. 25 is a flowchart illustrating a failure detection method of the solid-state imaging device according to the present embodiment.

As illustrated in FIG. 17, the solid-state imaging device 100 according to the present embodiment includes a pixel array unit 10, a vertical scanning circuit 20, a comparator circuit unit 40, a memory unit 50, a counter 52, a voltage supply unit 54, a horizontal scanning circuit 60, a horizontal transfer circuit 70, an output circuit 80, and a timing generator 90.

A plurality of pixels 12 arranged to form a matrix including a plurality of rows and a plurality of columns are provided in the pixel array unit 10. Control lines 14 are arranged on the rows of the pixel array unit 10, respectively, so as to extend in a first direction (the horizontal direction in FIG. 17). Each of the control lines 14 is connected to the pixels 12 aligned in the first direction and is a signal line common to these pixels 12. In the present specification, the first direction in which the control liens 14 extend may be denoted as a row direction. Further, output lines 16 are arranged on respective columns of the pixel array unit 10 so as to extend in a second direction (the vertical direction in FIG. 17) intersecting the first direction. Each of the output lines 16 is connected to the pixels 12 aligned in the second direction and is a signal line common to these pixels 12. In the present specification, the second direction in which the output liens 16 extend may be denoted as a column direction.

The control lines 14 on respective rows are connected to the vertical scanning circuit 20. The output lines 16 on respective columns are connected to the comparator circuit unit 40. The comparator circuit unit 40 is connected to the memory unit 50. The counter 52, the voltage supply unit 54, and the horizontal scanning circuit 60 are connected to the memory unit 50. The memory unit 50 is also connected to the output circuit 80 via the horizontal transfer circuit 70. The timing generator 90 is connected to the vertical scanning circuit 20, the counter 52, the voltage supply unit 54, and the horizontal scanning circuit 60.

The vertical scanning circuit 20 is a circuit unit that supplies, to the pixel 12 via the control line 14, control signals for driving readout circuits in the pixels 12 in reading out pixel signals from the pixels 12.

The comparator circuit unit 40 includes sample-and-hold circuits each of which samples and holds a pixel signal, a reference signal generation unit that generates a reference signal, and comparators each of which compares the reference signal with the pixel signal. The sample-and-hold circuit and the comparator are provided to each corresponding column of the pixel array unit 10. The comparator circuit unit 40 outputs, to the memory unit 50, latch signals in accordance with the comparison results of pixel signals and the reference signal obtained by the comparators. The comparator circuit unit 40, together with the counter 52, forms an AD convertor circuit unit.

The counter 52 performs a counting operation and outputs a count value to the memory unit 50. The memory unit 50 stores, in each column memory provided to the corresponding column of the pixel array unit 10, a count value obtained at a timing when a latch signal is output from the comparator on each column of the comparator circuit unit 40. The voltage supply unit 54 supplies, to each memory area corresponding to each bit of a column memory on each column of the memory unit 50, a voltage for setting a digital value stored in the column memory to a desired value.

The horizontal scanning circuit 60 is a circuit unit that supplies, to the memory unit 50, control signals for outputting pixel signals stored in the column memories on respective columns of the memory unit 50. The horizontal transfer circuit 70 is a circuit unit that transfers, to the output circuit 80, digital values of pixel signals output from the memory unit 50 in accordance with the control signals from the horizontal scanning circuit 60. The output circuit 80 includes a signal processing unit that performs a process such as correlated double sampling (CDS) on the digital value of the pixel signal received from the memory unit 50 or an external interface such as low voltage differential signaling (LVDS).

The timing generator 90 supplies a timing signal to the vertical scanning circuit 20, the counter 52, the voltage supply unit 54, the horizontal scanning circuit 60, and the like and controls the operating timing of each unit. At least a part of the timing signal may be supplied from the external of the solid-state imaging device 100.

FIG. 18 is a circuit diagram illustrating an example configuration of the pixels 12. In FIG. 18, two pixels 12 connected to the output line 16 on the same column are picked out and depicted. Each of the pixels 12 includes a photoelectric converter PD, a transfer transistor M1, a reset transistor M2, an amplifier transistor M3, and a select transistor M4.

The photoelectric converter PD is a photoelectric conversion element, such as a photodiode, for example, the anode thereof is connected to the ground voltage terminal, and the cathode thereof is connected to the source of the transfer transistor M1. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 is a so-called floating diffusion FD and forms a charge-to-voltage conversion unit comprising a capacitance component coupled to the node. The drain of the reset transistor M2 and the drain of the amplifier transistor M3 are connected to a power source voltage terminal (VDD). The source of the amplifier transistor M3 is connected to the drain of the select transistor M4. The source of the select transistor M4 is connected to the output line 16. Note that the names of the source and the drain of a transistor may be different in accordance with the conductivity type or a function in interest of a transistor and thus the source and the drain described above may be referred by the opposite names.

In the case of the circuit configuration illustrated in FIG. 18, the control line 14 on each row includes a transfer gate signal line, a reset signal line, and a select signal line (all of which are not illustrated). The transfer gate signal line is connected to the gates of the transfer transistors M1 of the pixels 12 belonging to the corresponding row and supplies a control signal PTX output from the vertical scanning circuit 20 to the gates of the transfer transistors M1. The reset signal line is connected to the gates of the reset transistors M2 of the pixels 12 belonging to the corresponding row and supplies a control signal PRES output from the vertical scanning circuit 20 to the gates of the reset transistors M2. The select signal line is connected to the gates of the select transistors M4 of the pixel 12 belonging to the corresponding row and supplies a control signal PSEL output from the vertical scanning circuit 20 to the gates of the select transistors M4. When each transistor of the pixel 12 is formed of an n-channel transistor, the corresponding transistor is turned on when a high level control signal is supplied from the vertical scanning circuit 20, and the corresponding transistor is turned off when a low level control signal is supplied from the vertical scanning circuit 20.

FIG. 19 illustrates an example configuration of the memory unit 50, the horizontal scanning circuit 60, the horizontal transfer circuit 70, and the output circuit 80. It is here assumed that the column memory on each column of the memory unit 50 is formed of 12 bits of memory areas S1 to S12 and image data output from the output circuit 80 is formed of 10 bits of DATA1 to DATA10.

A pixel signal read out from the pixel array unit 10 includes a noise component of a dark current or the like within the pixel array unit 10 as an offset, in addition to an optical signal based on charges generated by the photoelectric converter PD. Thus, the column memory on each column of the memory unit 50 is formed of the memory, for example, 12-bit memory, which can store a digital value having the number of digits greater than 10 bits for image data output from the output circuit 80. Such a configuration can prevent an optical signal from being saturated due to a noise component and ensure a sufficient dynamic range.

The digital value stored in the memory areas S1 to S12 of the column memory on each column of the memory unit 50 is transferred to the output circuit 80 via the horizontal scanning circuit 70 according to a control signal from the horizontal scanning circuit 60. The output circuit 80 performs an operating process such as noise removal on the transferred digital value and outputs 10-bit image data of DATA1 to DATA10.

FIG. 20 illustrates another example configuration of the memory unit 50, the horizontal scanning circuit 60, the horizontal transfer circuit 70, and the output circuit 80. The example configuration of FIG. 20 is basically the same as the example configuration of FIG. 19 except that the horizontal scanning circuit 60 is divided into a plurality of (N) blocks 60-1, 60-2, . . . , 60-N. The horizontal scanning circuit 60 may be divided into a plurality of blocks 60-1, 60-2, . . . , 60-N as illustrated in FIG. 20 and operate a column to be scanned and the block in interest.

FIG. 21 illustrates another example configuration of the memory unit 50, the horizontal scanning circuit 60, the horizontal transfer circuit 70, and the output circuit 80. While the number of channels of the horizontal transfer circuit 70 is one in the example configurations illustrated in FIG. 19 and FIG. 20, a plurality of channels may be employed in the horizontal transfer circuit 70. FIG. 21 illustrates the example configuration of the memory unit 50, the horizontal scanning circuit 60, the horizontal transfer circuit 70, and the output circuit 80 where the number of channels of the horizontal transfer circuit 70 is two. Note that the number of channels of the horizontal transfer circuit 70 may be three or more.

The horizontal transfer circuit 70 includes a horizontal transfer circuit 70A associated with a channel-a and a horizontal transfer circuit 70B associated with a channel-b. The channel-a is connected to the column memories on the odd-numbered columns of the memory unit 50 and associated with image data (DATA1$a$ to DATA10$a$) output from the output circuit 80. The channel-b is connected to the column memories on the even-numbered columns of the memory unit 50 and associated with image data (DATA1$b$ to DATA10$b$) output from the output circuit 80. The image data of the channel-a and the image data of the channel-b can be read out in parallel by using a common control signal supplied from the horizontal scanning circuit 60.

Next, a method of driving the solid-state imaging device according to the present embodiment will be described.

Once an optical image of an object enters the pixel array unit 10, the photoelectric converter PD of each pixel 12 converts (photoelectrically converts) the incident light into an amount of charges in accordance with the light amount and accumulates the generated charges. When turned on, the transfer transistor M1 transfers charges of the photoelectric converter PD to the floating diffusion FD. The floating diffusion FD has a voltage in accordance with the amount of charges transferred from the photoelectric converter PD by charge-to-voltage conversion caused by the capacitance component of the floating diffusion FD. The amplifier transistor M3 is configured such that the power source voltage is supplied to the drain and a bias current is supplied to the source from a current source (not illustrated) via the select transistor M4, which forms an amplifier unit (a source follower circuit) whose gate is the input node. This causes the amplifier transistor M3 to output a signal based on the voltage of the floating diffusion FD to the output line 16 via the select transistor M4. When turned on, the reset transistor M2 resets the floating diffusion FD to a voltage in accordance with the voltage VD supplied from the power source voltage terminal.

The transfer transistor M1, the reset transistor M2, and the select transistor M4 of the pixel 12 are controlled on a row-by-row basis by control signals PTX, PRES, and PSEL supplied from the vertical scanning circuit 20 under the control of the timing generator 90. The pixel signals of the pixels 12 belonging to a row selected by the control signal PSEL are output to the corresponding output lines 16 of respective pixels 12 at the same time.

The pixel signals on respective columns output to the output lines 16 are input to the comparator circuit unit and held in the sample-and-hold circuits on the corresponding columns. The reference signal generation unit generates a reference signal whose voltage varies in accordance with time elapsing. For example, a ramp signal is used for the waveform of the reference signal. The comparator on each column compares the level of an image signal held in the sample-and-hold circuit with the level of the reference signal and, when the relationship of these levels is inverted, outputs a latch signal to the memory unit 50.

The counter 52 counts the number of clocks of a clock signal generated by the timing generator 90 and outputs the count value to the memory unit 50. The memory unit 50 stores the count value corresponding to the time from the start of a change of the reference signal to the output of the latch signal in the column memory (memory areas S1 to S12) as a digital value of an image signal. That is, the comparator circuit unit 40, the memory unit 50, and the counter 52 have a function as a readout unit and a memory unit that perform analog-to-digital conversion (hereafter, referred to as AD conversion) on a pixel signal and store the converted signal. In the present specification, a digitally converted pixel signal (a digital pixel signal) is referred to as image data. A plurality of image data form one image.

The horizontal scanning circuit 60 outputs control signals sequentially on a column basis to the column memories on respective columns of the memory unit 50 under the control of the timing generator 90. The memory unit 50, which has received the control signals from the horizontal scanning circuit 60, outputs image data stored in the column memories on the corresponding columns to the output circuit 80 via the horizontal transfer circuit 70.

After performing predetermined signal processing such as digital CDS on the image data received from the memory unit 50, the output circuit 80 outputs the image signals obtained after signal processing to the outside on a row-by-row basis via the external interface. Note that the image signal output from the output circuit 80 is input to a signal processing unit of the imaging system including the solid-state imaging device 100, for example. This signal processing unit performs predetermined signal processing on the signal output by the solid-state imaging device 100.

To briefly describe the readout operation for one row of the pixel array unit 10, FIG. 22 can be referenced. The readout operation for one row includes a period T1 in which readout of a pixel signal is performed, a period T2 in which AD conversion and writing of the pixel signal to the column memory is performed, a period T3 in which readout of image data from the column memory is performed, and a period T4 in which initialization of the column memory is performed, as illustrated in FIG. 22.

First, in the period T1, readout of pixel signals from the pixels 12 on a selected row is performed. The pixels 12 on the row output the pixel signals to the output lines 16. The pixel signals read out from the pixels 12 are input to the comparator circuit unit 40 and held in the sample-and-hold circuits.

Subsequently, in the period T2, AD conversion is performed according to the above-described procedure in the comparator circuit unit 40, the memory unit 50, and the counter 52, and each image data of the obtained digital signal is stored in the column memory on each column of the memory unit 50.

Subsequently, in the period T3, in response to a column scan by the horizontal scanning circuit 60, readout of image data from the memory unit 50 to the output circuit 80 is performed.

Subsequently, in the period T4, initialization of the column memory on each column of the memory unit 50 is performed. That is, a voltage which causes the value of each bit to be "0" (for example, a fixed voltage such as 0 V) is supplied to the memory areas S1 to S12 of the column memory on each column of the memory unit 50 from the voltage supply unit 54, initializes the memory unit 50, and stands by for readout of pixel signals of the pixels 12 on the next row.

Such a readout operation for one row is sequentially performed on the pixels 12 on respective rows of the pixel array unit 10 to acquire a plurality of image data forming one image. The above operation is the vertical scan.

FIG. 23 is a schematic diagram illustrating the operation (vertical scan) in acquiring a plurality of image data forming one image. FIG. 23 provides the general description of the scan for image acquisition when a motion image is captured by picking out two frames. In FIG. 23, it is assumed that a light enters the pixels 12 over the entire periods, and light-shielding by a mechanical shutter is not considered.

In the upper part of FIG. 23, the horizontal axis denotes time, and the vertical axis denotes row. Each of the blocks hatched upward to the right represents an electronic shutter operation performed on a plurality of pixels 12 belonging to one row. The electronic shutter operation is an operation of resetting the photoelectric converter PD. More specifically, in a period illustrated with a block hatched upward to the right, the transfer transistors M1 and the reset transistors M2 of the pixels 12 on the corresponding row are both in an on-state. Thereby, charges accumulated in the photoelectric converters PD are drained from the power source voltage terminal (VDD), and the photoelectric converters PD are reset. After the electronic shutter operation, the photoelectric converters PD start accumulation of charges generated by photoelectrically converting the incident light.

The electronic shutter operations for a plurality of rows are performed sequentially on a row basis. FIG. 23 depicts these blocks aligned diagonally in order to visually illustrate that the electronic shutter operations of the pixels 12 on respective rows are performed sequentially on a row basis. A series of operations in which electronic shutter operations on a plurality of rows are performed sequentially on a row basis correspond to a shutter scan.

In FIG. 23, each of the white blocks represents a readout operation of pixel signals from a plurality of pixels 12 belonging to one row. More specifically, in a period illustrated with a white block, image signals of the pixels belonging to the corresponding row are read out sequentially on a column basis. This operation is a horizontal scan. A period for performing readout from a plurality of pixels 12 belonging to one row is one horizontal period (1H).

The readout operations of a plurality of rows are performed sequentially on a row basis. FIG. 23 depicts these blocks aligned diagonally in order to visually illustrate that the readout operations of the pixels 12 on respective rows are performed sequentially on a row basis. A series of operations in which readout operations on a plurality of rows are performed sequentially on a row basis correspond to a readout scan. For each row, a period from the end of an electronic shutter operation to the start of a readout operation is an accumulation period. The timings of scans are set so as to have the same length of accumulation periods for all the rows.

In a period after a readout scan of one frame ends and before a readout scan of the next frame starts, no writing of image data to the column memory of the memory unit 50 is performed. Thus, in the method of driving the solid-state imaging device according to the present embodiment, real-time failure inspection is realized by utilizing this period as a column memory inspection period in which whether or not the memory unit 50 normally operates is inspected.

Failure inspection of the memory unit 50 is not required to be performed all the time and may be performed when necessary. For example, a normal readout mode and a memory failure inspection mode may be prepared as the operation modes of the solid-state imaging device, and failure inspection of the memory unit 50 may be performed only when the memory failure inspection mode is selected. Further, even when the memory failure inspection mode is selected, failure inspection is not necessarily required to be performed on a frame basis but may be performed at a predetermined frame interval.

In a column memory inspection period, as illustrated in the lower part of FIG. 23, a memory inspection pattern used for failure inspection is written to the column memory on each column of the memory unit 50, and data is read out from the column memory on each column of the memory unit 50. Writing of a memory inspection pattern is performed by supplying, to the memory areas S1 to S12 of the column memory on each column of the memory unit 50 from the voltage supply unit 54, a voltage in accordance with information to be written. Readout from the column memory on each column of the memory unit 50 is performed by performing the same horizontal scan as the readout operation of each row in a readout scan. The period required for readout from the column memory on each column of the memory unit 50 is one horizontal period (1H), which is the same as in the case of readout of the pixel signal.

In initialization of the memory unit 50, a voltage which provides "0" to each of the memory areas S1 to S12 is supplied from the voltage supply unit 54. In the column memory inspection period, however, a voltage which provides "1" (for example, the same voltage as the power source voltage of the memory unit 50) to at least a part of the memory areas S1 to S12 may also be input from the voltage supply unit 54. That is, the bit sequence of a predetermined memory inspection pattern can be stored in the memory unit 50 by using the voltage supply unit 54. In this sense, the voltage supply unit 54 also serves as an inspection information supply unit for the memory unit 50.

The memory inspection pattern written to the column memory on each column of the memory unit 50 is not limited in particular. For example, there is an example in which "0" is written to each of the memory areas S1 to S12 of the column memories on all the columns of the memory unit 50. Alternatively, there is an example in which "1" is written to each of the memory areas S1 to S12 of the column memories on all the columns of the memory unit 50. Alternatively, there is an example in which "0101 . . . " is written from a higher bit of the column memory. Alternatively, there is an example in which "1010 . . . " is input from a higher bit of the column memory.

Any memory inspection pattern may be determined for respective columns, for example, which may be the same for a plurality of columns or may be different for respective columns. Further, the memory inspection patterns for the same column may be different in different column memory inspection periods. The voltage supply unit 54 can supply a voltage in accordance with any memory inspection pattern to the column memory on each column of the memory unit 50.

In such a way, the voltage supply unit 54 of the solid-state imaging device according to the present embodiment can write a predetermined memory inspection pattern to the column memory on each column of the memory unit 50. Since the signal to be written to the memory unit 50 is supplied as a digital signal via no readout unit, it is stored in the memory unit 50 without being affected by an external noise with respect to the bit of any digit. Therefore, more accurate inspection signal can be written to the memory unit 50. Thereby, anomaly detection by collating a memory inspection pattern written in the memory unit 50 with a memory inspection pattern read out from the memory unit 50 can be performed at a higher accuracy.

In the example configurations illustrated in FIG. 19 to FIG. 21, while the number of bits of a signal output from one pixel 12 is 10, the number of bits of the column memory on each column of the memory unit 50 is 12. It is therefore necessary to configure the output circuit 80 so as to be able to perform a mode for outputting 12-bit information in order to output whole the 12-bit information stored in the column memory on each column of the memory unit 50 in the inspection of the memory unit 50. In order to output image data as 10-bit information and further output column memory inspection data as 12-bit information, however, it is necessary to provide at least extra two bits of output systems, which may lead to a larger configuration of the solid-state imaging device.

In view of the above, the solid-state imaging device according to the present embodiment is configured to divide column memory inspection data into two or more data for output so as to be able to output the column memory inspection data with bits less than or equal to the output bits of image data (10 bits or less). That is, information stored in each column memory is divided and output in a unit of bit so that the number of bits of information output at the same time by the output circuit 80 is less than or equal to the number of bits of a signal output from one pixel 12.

For example, as illustrated in FIG. 23, after a predetermined memory inspection pattern is written to the column memory on each column of the memory unit 50, transfer of the 12-bit column memory inspection data to the output circuit 80 from the memory unit 50 is performed by two times of horizontal scans. Then, in the first horizontal scan, information of 10 bits from the highest bit of the column memory on each column of the memory unit 50 is output from the output circuit 80. In the subsequent second horizontal scan, information of two lower bits of the column memory on each column of the memory unit 50 is output from the output circuit 80. That is, readout of column memory inspection data is performed during a period corresponding to readout periods for two rows. A period for performing the first horizontal scan is a period (a first period) corresponding to an output period for one row of inspection information held in a part of the column memory on each column. Similarly, a period for performing the second horizontal scan is a period (a second period) corresponding to an output period for one row of inspection information held in another part of the column memory on each column. Each of the first period and the second period is a period between an output operation of pixel information of one row performed by the output circuit 80 and an output operation of pixel information of another row by the output circuit 80.

With the above configuration, whole the information read out from the memory areas S1 to S12 of the column memory on each column of the memory unit 50 can be output to the outside of the solid-state imaging device by using the output circuit 80 in which the number of signal bits that can be output is 10.

The example driving illustrated in FIG. 23 is an example in which writing of a memory inspection pattern and readout of all the column memory inspection data are performed after the completion of output of image data of one frame and before the start of output of image data of the next frame. This example driving can be applied to a case where the column memory inspection period is longer than the time required for writing of a column memory inspection pattern and readout from the column memory with two times of horizontal scans.

When the column memory inspection period is shorter than the time required for writing of a column memory inspection pattern and readout from the column memory with two times of horizontal scans, divided two column memory inspection data may be read out in another column memory inspection period. For example, first, after the completion of output of image data of one frame and before the start of output of image data of the next frame, writing of a column memory inspection pattern and readout of one of the divided column memory inspection data are performed. Subsequently, after the completion of output of image data of the above next-frame, writing of a column memory inspection pattern and readout of the other of the divided column memory inspection data are performed. This allows all the column memory inspection data to be output without reducing the frame rate.

The column memory inspection data output from the solid-state imaging device is compared to an expected value that is data corresponding to a column memory inspection pattern which has to be written in the memory unit 50 in an external signal processing device. Various failures can be estimated in the solid-state imaging device according to the memory inspection pattern to be written to the memory unit 50.

For example, when "0" or "1" is written as column memory inspection data to each of the memory areas S1 to S12 of the column memories of all the columns of the memory unit 50 and if there is a memory area from which a value different from the written value is read out, it can be estimated that there is a failure in that memory area.

Further, in the example configurations illustrated in FIG. 19 and FIG. 20, the column memories of the memory unit 50 are selected sequentially on a column basis by the horizontal scanning circuit 60, and information stored in the column memories on the selected columns is sequentially transferred to the output circuit 80 via the horizontal transfer circuit 70. In such a case, by differing the expected values to be written to the column memories on the columns selected at different times by the horizontal scanning circuit 60, it is possible to inspect whether the selection by the horizontal scanning circuit 60 is performed in a correct order, that is, to inspect the horizontal scanning circuit 60. In this case, all the expected values to be written to the column memories on the columns selected at different times by the horizontal scanning circuit 60 may not be set to values different from each other, which allows for simple inspection of the horizontal scanning circuit 60 by setting the expected values to different values for a part of columns. A part of the columns where different values are set may be neighboring columns or, the example configuration of FIG. 20, may be a unit of block of the horizontal scanning circuit 60.

In the channel-a of the example configuration illustrated in FIG. 21, the column memories selected by the horizontal scanning circuit 60 at different times are the column memories on the columns 1, 3, 5, . . . . By setting the expected values written to the column memories on these columns to different values, it is possible to inspect the horizontal scanning circuit. Similarly, in the channel-b, the column memories selected by the horizontal scanning circuit 60 at different times are the column memories on the columns 2, 4, 6, . . . . By setting the expected values written to the column memories on these columns to different values, it is possible to inspect the horizontal scanning circuit.

Column memory inspection data output from the solid-state imaging device can be attached to one frame of image data, as illustrated in FIG. 24A and FIG. 24B, for example. FIG. 24A illustrates an example in which divided two column memory inspection data 220A and 220B are appended to one frame of image data 210. For example, it can be applied as a data configuration when all the column memory inspection data are output after image data of a frame is output and before image data of the next frame is output. FIG. 24B illustrates an example in which divided two column memory inspection data 220A and 220B are appended to image data 210 and 212 of another frame, respectively. For example, it can be applied as an example of data configuration in a case where, after image data of a frame is output and before image data of the next frame is output, one of the divided column memory inspection data is output and, after the image data of the above next-frame is output, the other of the divided column memory inspection data is output. Column memory inspection data may be attached to the head of image data.

FIG. 25 is a flowchart illustrating a failure detection method of the solid-state imaging device in an imaging system on which the solid-state imaging device according to the present embodiment is mounted. Examples of the imaging system on which the solid-state imaging device is mounted may include a digital still camera, a digital camcorder, a surveillance camera, an on-vehicle camera, and the like. Further, the imaging system on which the solid-state imaging device is mounted may be a system included in a movable object such as a vehicle discussed in an embodiment described later. The operation illustrated in FIG. 25 is an operation performed mainly by the solid-state imaging device and a signal processing unit provided inside the imaging system.

The failure detection of the solid-state imaging device in the imaging system is performed according to the flowchart illustrated in FIG. 25, for example.

First, the signal processing unit of the imaging system acquires column memory inspection data output from the solid-state imaging device (step S101). Acquisition of the column memory inspection data is performed according to the procedure described by using FIG. 22 and FIG. 23.

Subsequently, the signal processing unit collates the acquired column memory inspection data with the expected value thereof to determine whether or not the column memory inspection data matches the expected value thereof (step S102). The expected value of the column memory inspection data is a value of column memory inspection data expected when there is no anomaly in the solid-state imaging device and corresponds to information of a memory inspection pattern written by the voltage supply unit 54 to the column memory on each column of the memory unit 50. Note that the expected value of column memory inspection data is held in advance in the signal processing unit.

If the column memory inspection data acquired from the solid-state imaging device matches the expected value (Yes), the solid-state imaging device is determined to be normal (step S103), and image capturing is continued.

If the column memory inspection data acquired from the solid-state imaging device does not match the expected value (No), it is determined that there is an anomaly in the solid-state imaging device, and an alert indicating the anomaly of the solid-state imaging device is issued (step S104). The issuance of the alert may include causing a user to recognize occurrence of the anomaly by a scheme such as displaying, on a display device provided in the imaging system, that there is an abnormal state. The imaging system then stops the operation of the solid-state imaging device (step S105).

Since column memory inspection data can be acquired in a period between frames, a failure of a column memory can be detected in real-time during motion image capturing.

As discussed above, according to the present embodiment, failure inspection of a readout unit such as the memory unit 50 or the horizontal scanning circuit 60 can be performed in real-time without increasing the circuit size of the output circuit 80.

Sixth Embodiment

A solid-state imaging device and a failure detection method of the solid-state imaging device according to a sixth embodiment of the present invention will be described with reference to FIG. 26 to FIG. 29C. The same components as those in the solid-state imaging device according to the fifth embodiment are labeled with the same reference symbol, and the description thereof will be omitted or simplified.

Figure 26:
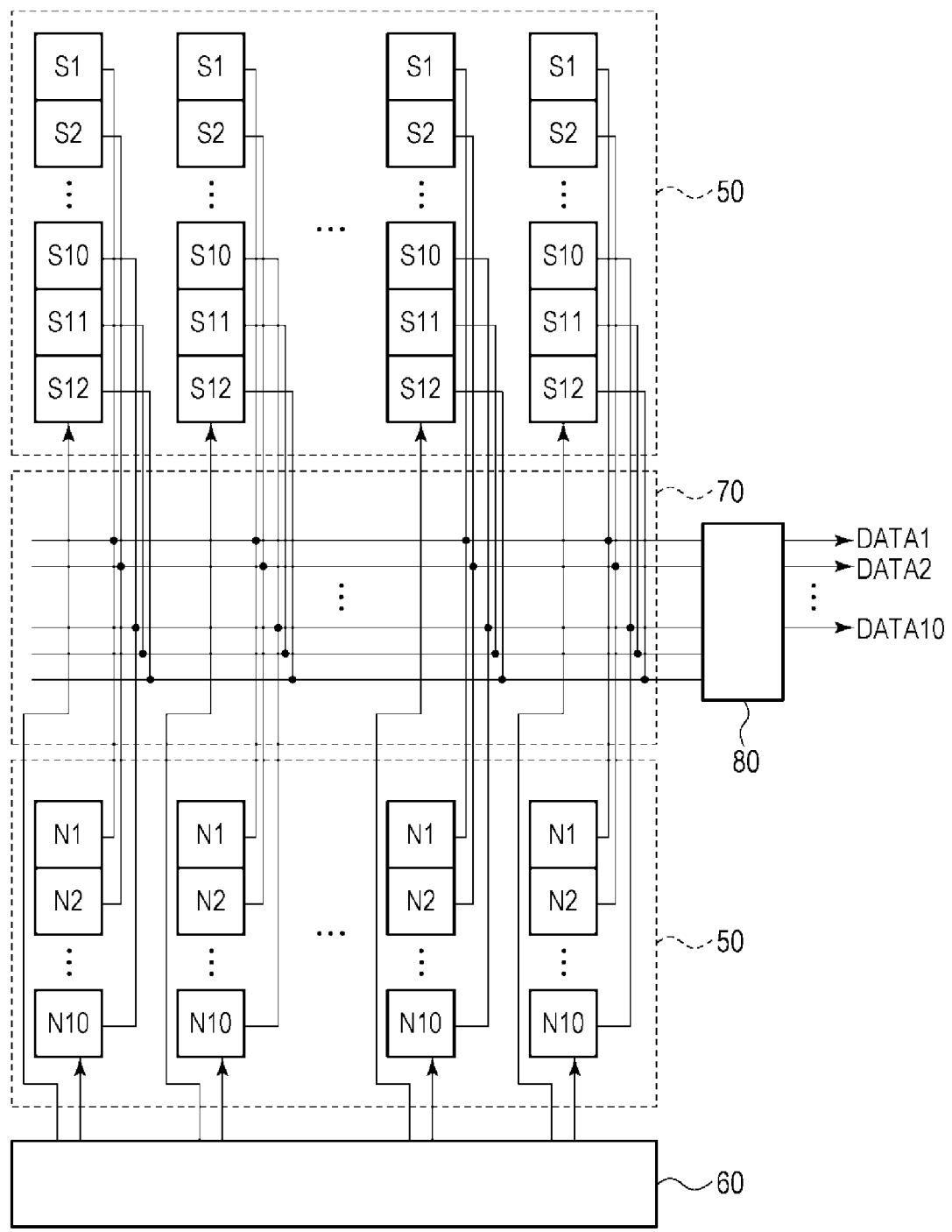
FIG. 26 and FIG. 27 are block diagrams illustrating example configurations of a memory unit, a horizontal scanning circuit, and a horizontal transfer circuit in a solid-state imaging device according to a sixth embodiment.
Figure 27:
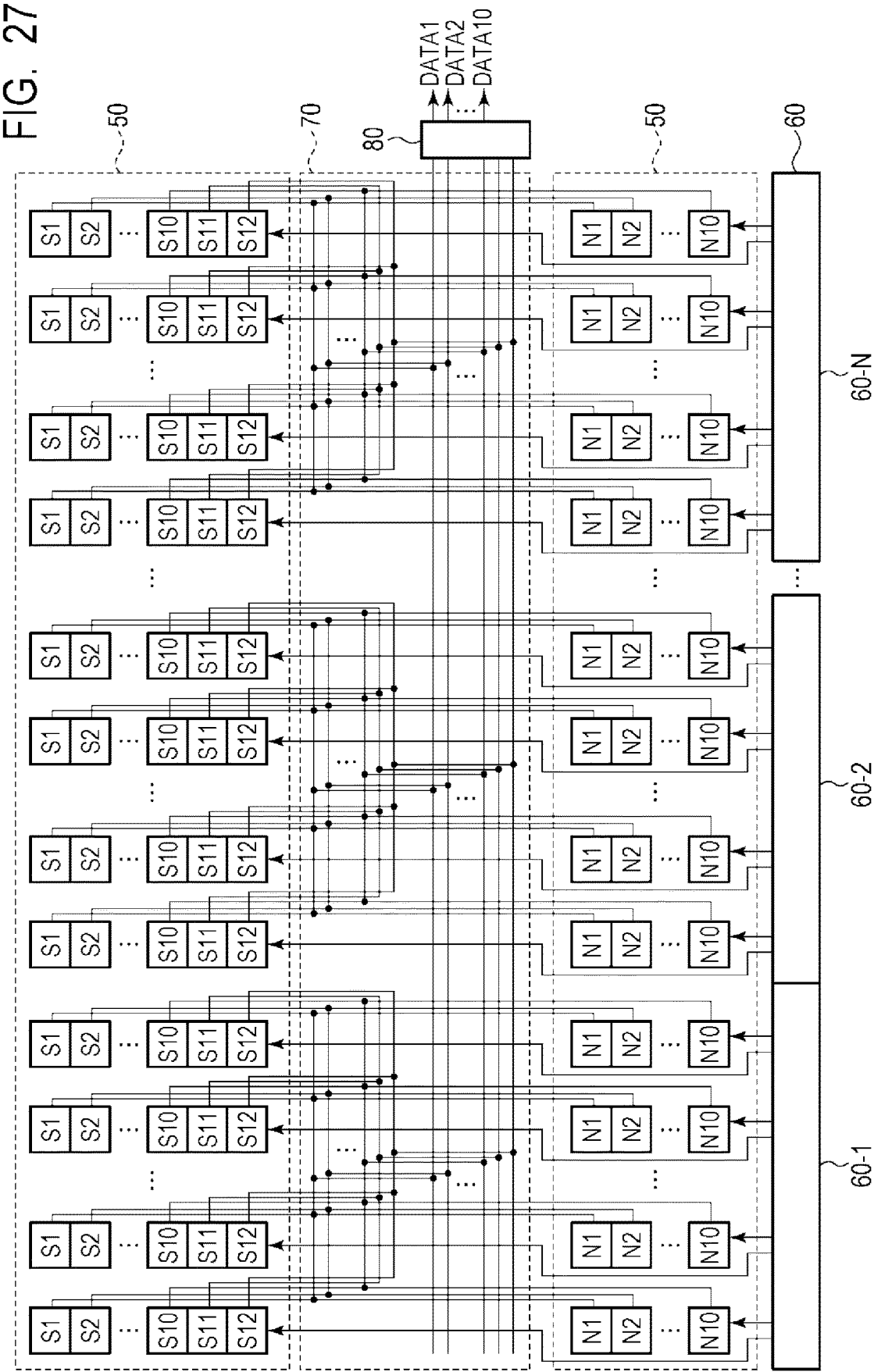
Figure 28:
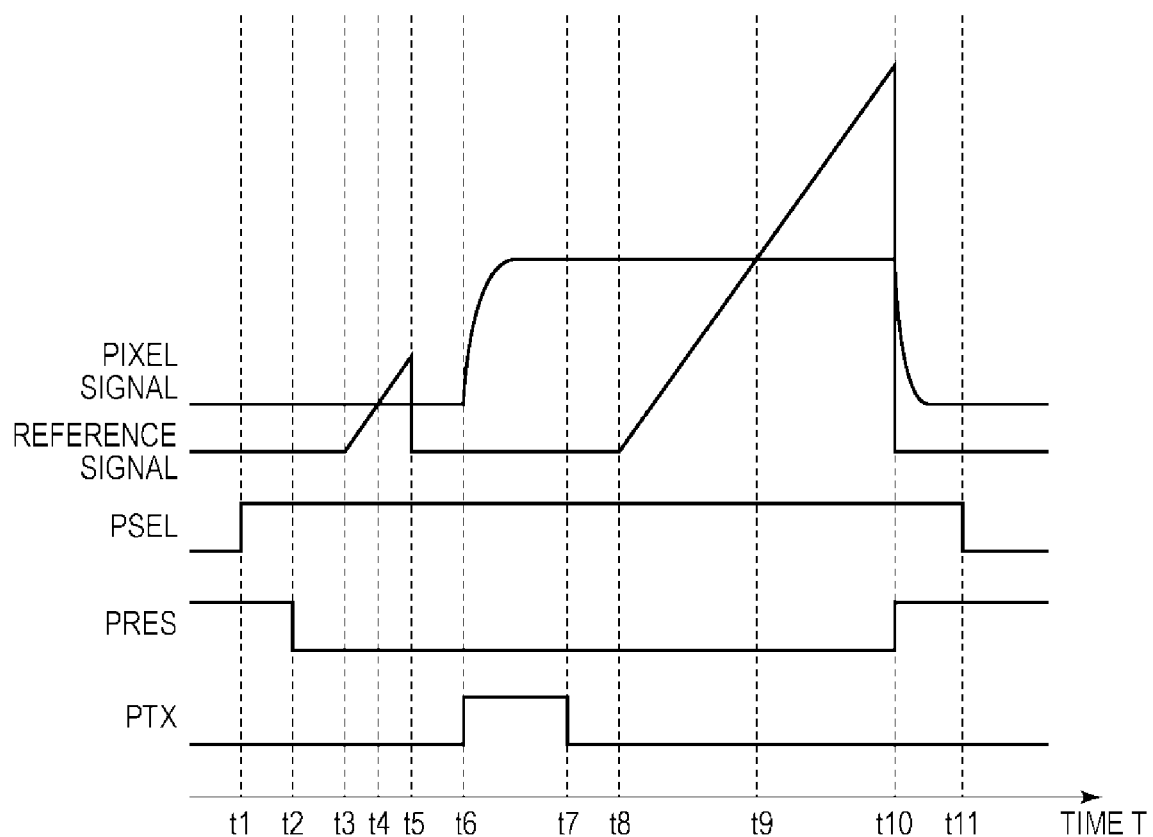
FIG. 28 is a timing chart illustrating a method of driving the solid-state imaging device according to the sixth embodiment.

FIG. 26 and FIG. 27 are block diagrams illustrating example configurations of a memory unit, a horizontal scanning circuit, and a horizontal transfer circuit in the solid-state imaging device according to the present embodiment. FIG. 28 is a timing chart illustrating a method of driving the solid-state imaging device according to the present embodiment. FIG. 29A to FIG. 29C are schematic diagrams of example configurations of data in a signal processing device outside the solid-state imaging device.

The solid-state imaging device according to the present embodiment is the same as the solid-state imaging device according to the first embodiment except that the memory unit 50 and the horizontal transfer circuit 70 are different from those in the first embodiment. That is, in the solid-state imaging device according to the present embodiment, the memory unit 50 has memory areas N1 to N10 in addition to the memory areas S1 to S12 as the column memory on each column, as illustrated in FIG. 26. The memory areas S1 to S12 correspond to a memory (S-memory) that stores a 12-bit optical signal (S-signal). The memory areas N1 to N10 correspond to a memory (N-memory) that stores a 10-bit noise signal (N-signal). Further, the horizontal transfer circuit 70 is configured to transfer information stored in the memory areas S1 to S12 and information stored in the memory areas N1 to N10 to the output circuit 80 in response to control signals from the horizontal scanning circuit 60. FIG. 27 illustrates an example configuration in which the horizontal scanning circuit 60 is divided into a plurality of (N) blocks 60-1, 60-2, . . . , 60-N in a similar manner to the case of FIG. 20 described in the fifth embodiment.

FIG. 28 is a timing chart illustrating the method of driving the solid-state imaging device according to the present embodiment. FIG. 28 illustrates control signals PSEL, PRES, and PTX supplied from the vertical scanning circuit 20 to the control line 14 of a row on which readout is performed, a pixel signal input to the comparator circuit unit 40, and a reference signal supplied from the reference signal generation unit of the comparator circuit unit 40.

At the time t1, the vertical scanning circuit 20 controls the control signal PSEL of a row on which readout of a pixel signal is performed from a low level to a high level to turn on the select transistor M4 of the pixel 12 belonging to the corresponding row. Thereby, the pixel 12 belonging to the row is selected. Note that, at the time t1, the control signal PRES is a high level, and the floating diffusion FD of the pixel 12 belonging to the row is reset to a voltage in accordance with the voltage VDD. The control signal PTX is a low level.

Subsequently, at the time t2, the vertical scanning circuit 20 controls the control signal PRES of a row on which readout of a pixel signal is performed from a high level to a low level to release the reset of the floating diffusion FD. A noise signal (N-signal) in accordance with a reset voltage of the floating diffusion FD is output via the select transistor M4 and the output line 16 and held in the sample-and-hold circuit of the comparator circuit unit 40.

Subsequently, at the time t3 after the voltage of the output line 16 is set, the reference signal generation unit of the comparator circuit unit 40 starts ramp-up of the reference signal. In response to the start of ramp-up of the reference signal, the counter 52 starts counting the number of clocks of the clock signal generated by the timing generator 90 and outputs a count value to the memory unit 50. The comparator of the comparator circuit unit 40 starts comparison operation of the level of the N-signal held in the sample-and-hold circuit with the level of the reference signal.

At the time t4, when the relationship between the level of the N-signal and the level of the reference signal changes, the output of the comparator is inverted. The memory unit 50 stores a count value corresponding to the time from the start of the ramp-up of the reference signal to the inversion of the output of the comparator in the memory areas N1 to N10 on the corresponding column of the memory unit 50 as a digital value of the N-signal.

Subsequently, at the time t5, the reference signal output by the reference signal generation unit is reset, and AD conversion of the N-signal ends.

Subsequently, in a period from the time t6 to the time t7, the vertical scanning circuit 20 controls the control signal PTX to a high level and transfers charges generated and accumulated in the photoelectric converter PD to the floating diffusion FD. This causes the floating diffusion FD to have a voltage in accordance with the amount of the transferred charges due to charge-to-voltage conversion caused by the capacitance component of the floating diffusion FD. An optical signal (S-signal) in accordance with the amount of charges transferred to the floating diffusion FD is output via the select transistor M4 and the output line 16, and held in the sample-and-hold circuit of the comparator circuit unit 40.

Subsequently, at the time t8 after the voltage of the output line 16 is set, the reference signal generation unit of the comparator circuit unit 40 starts ramp-up of the reference signal. In response to the start of ramp-up of the reference signal, the counter 52 starts counting the number of clocks of the clock signal generated by the timing generator 90 and outputs a count value to the memory unit 50. The comparator of the comparator circuit unit 40 starts comparison operation of the level of the S-signal held in the sample-and-hold circuit with the level of the reference signal.

At the time t9, when the relationship between the level of the S-signal and the level of the reference signal changes, the output of the comparator is inverted. The memory unit 50 stores a count value corresponding to the time from the start of the ramp-up of the reference signal to the inversion of the output of the comparator in the memory areas S1 to S12 on the corresponding column of the memory unit 50 as a digital value of the S-signal.

Subsequently, at the time t10, the reference signal output by the reference signal generation unit is reset, and AD conversion of the S-signal ends.

Subsequently, at the time t11, the vertical scanning circuit 20 controls the control signal PSEL from a high level to a low level to release the selection of the row and completes readout of the image signal from the pixel 12 belonging to the row.

The digital N-signal and the digital S-signal held in the memory areas N1 to N10 and S1 to S12 on each column of the memory unit 50 are transferred to the output circuit 80 via the horizontal transfer circuit 70 in the order of the digital N-signal and then the digital S-signal on a column basis. The output circuit 80 performs a process of subtracting a digital value of the N-signal from a digital value of the S-signal, namely, a so-called digital CDS process to calculate 10-bit image data, in which a noise has been removed, and outputs it to the external device.

On the other hand, column memory inspection requires, as column memory inspection data, 22-bit information of 12-bit information corresponding to the memory areas S1 to S12 and 10-bit information corresponding to the memory areas N1 to N10. Thus, the present embodiment is configured to divide column memory inspection data into three data each having the number of bits less than or equal to the number of output bits of the output circuit 80 (10 bits or less) and output them. That is, readout of column memory inspection data is performed during a period corresponding to a readout period for two or more rows (three rows in this example).

For example, after a predetermined memory inspection pattern is written to the column memory on each column of the memory unit 50, a horizontal scan for transferring 12-bit column memory inspection data used for S-memory inspection is performed twice, and a horizontal scan for transferring 10-bit column memory inspection data used for N-memory inspection is performed once. Then, in the first horizontal scan, information of 10 bits from the highest bit of the S-memory on each column of the memory unit 50 is output from the output circuit 80. In the subsequent second horizontal scan, information of two lower bits of the S-memory on each column of the memory unit 50 is output from the output circuit 80. In the subsequent third horizontal scan, 10-bit information of the N-memory on each column of the memory unit 50 is output from the output circuit 80. Note that the order of outputting the divided column memory inspection data is not limited in particular.

With the above configuration, whole the information read out from the memory areas S1 to S12 and N1 to N10 of the column memory on each column of the memory unit 50 can be output to the outside of the solid-state imaging device by using the output circuit 80 in which the number of signal bits that can be output is 10.

Column memory inspection data output from the solid-state imaging device can be attached to one frame of image data, for example, as illustrated in FIG. 29A to FIG. 29C. The manner of attaching column memory inspection data can be changed in accordance with the length of the column memory inspection period as described in the fifth embodiment. FIG. 29A illustrates an example in which divided three column memory inspection data 220A, 220B, and 220C are appended to one frame of image data 210. FIG. 29B illustrates an example in which divided three column memory inspection data 220A, 220B, and 220C are appended to image data 210, 212, and 214 of another frame, respectively. FIG. 29C illustrates an example in which column memory inspection data 220A and 220B are appended to image data 210 of a frame and column memory inspection data 220C is appended to image data 212 of a frame, respectively. Column memory inspection data may be attached to the head of image data.

As discussed above, according to the present embodiment, failure inspection of a readout unit such as the memory unit 50 or the horizontal scanning circuit 60 can be performed in real-time without increasing the circuit size of the output circuit 80.

Seventh Embodiment

A solid-state imaging device and a failure detection method of the solid-state imaging device according to a seventh embodiment of the present invention will be described with reference to FIG. 30 to FIG. 33. The same components as those in the solid-state imaging device according to the fifth and sixth embodiments are labeled with the same reference symbol, and the description thereof will be omitted or simplified.

Figure 30:
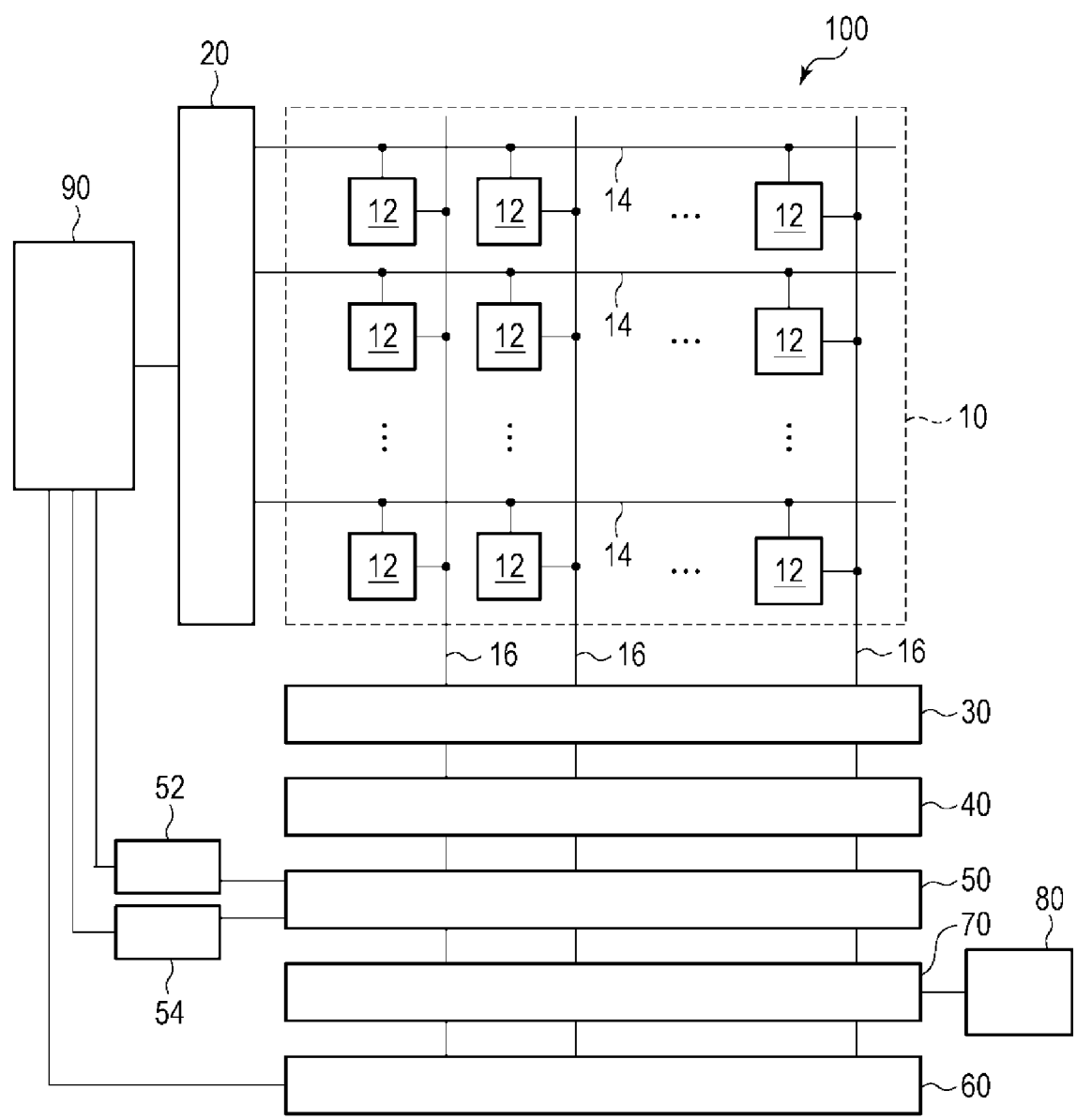
FIG. 30 is a block diagram illustrating a general configuration of a solid-state imaging device according to a seventh embodiment.
Figure 31:
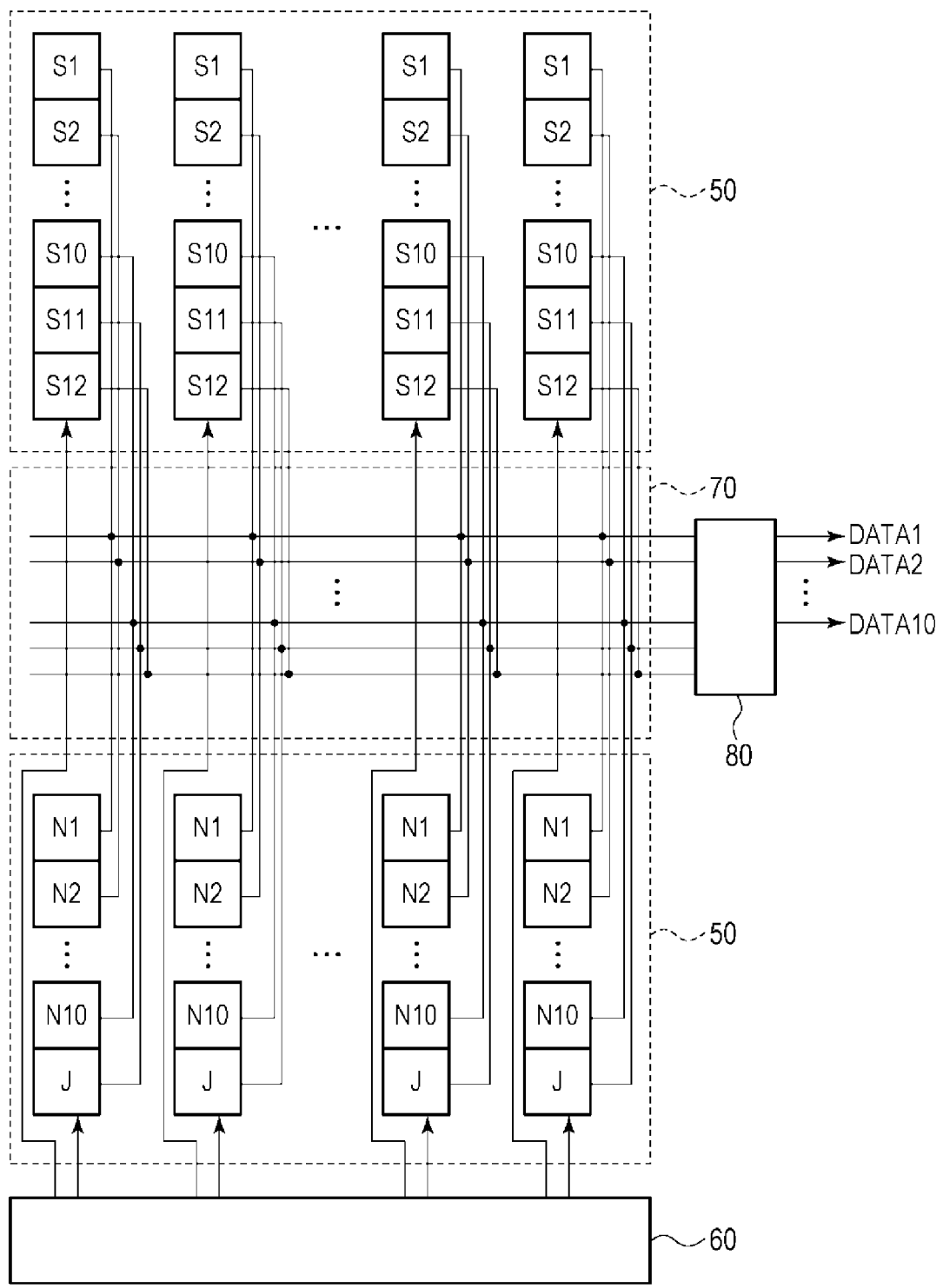
FIG. 31 and FIG. 32 are block diagrams illustrating example configurations of a memory unit, a horizontal scanning circuit, and a horizontal transfer circuit in the solid-state imaging device according to the seventh embodiment.
Figure 32:
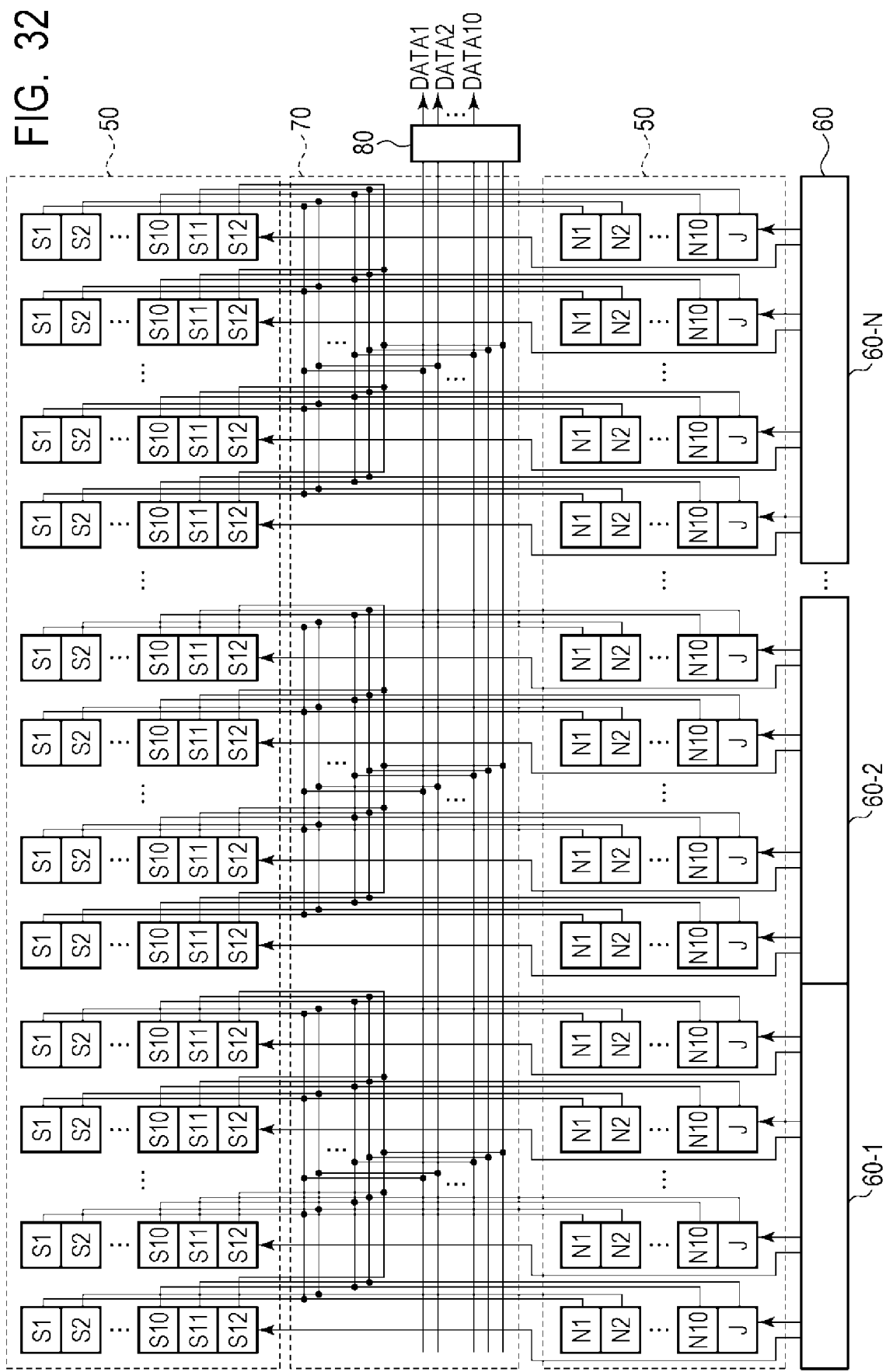
Figure 33:
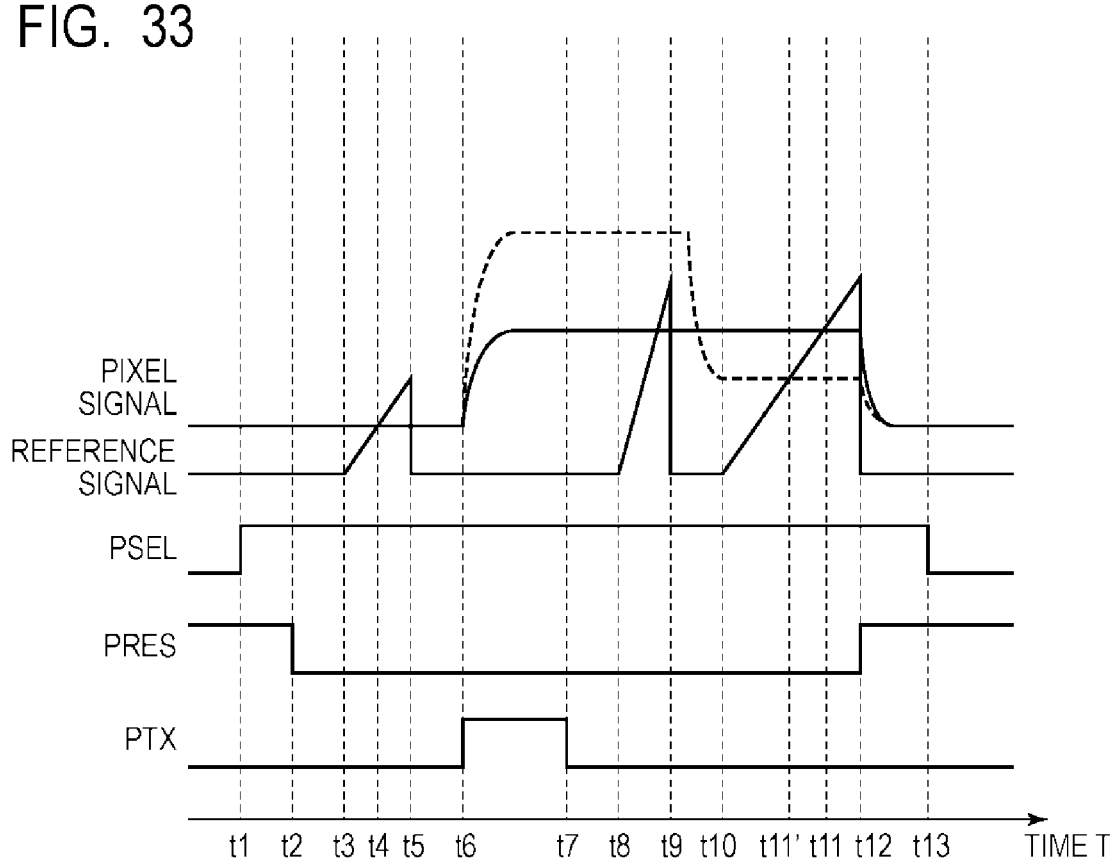
FIG. 33 is a timing chart illustrating a method of driving the solid-state imaging device according to the seventh embodiment.

FIG. 30 is a block diagram illustrating a general configuration of the solid-state imaging device according to the present embodiment. FIG. 31 and FIG. 32 are block diagrams illustrating example configurations of a memory unit, a horizontal scanning circuit, and a horizontal transfer circuit in the solid-state imaging device according to the present embodiment. FIG. 33 is a timing chart illustrating a method of driving the solid-state imaging device according to the present embodiment.

The solid-state imaging device 100 according to the present embodiment is different from the solid-state imaging devices according to the fifth and sixth embodiment in that, as illustrated in FIG. 30, it further includes an amplifier circuit unit 30 provided between the pixel array unit 10 and the comparator circuit unit 40. The output lines 16 on respective columns arranged in the pixel array unit 10 are connected to the amplifier circuit unit 30. The amplifier circuit unit 30 includes a plurality of column amplifier circuits (not illustrated) provided to the corresponding columns of the pixel array unit 10. The column amplifier circuit on each column amplifies an analog pixel signal output from the output line 16 of the pixel array unit 10 at a predetermined amplification factor and outputs the amplified signal to the comparator circuit unit 40. The column amplifier circuit has a variable amplification factor and has a function of changing the amplification factor in accordance with the output level of the pixel signal. The pixel signal amplified by the column amplifier circuit is input to the comparator on the corresponding column of the comparator circuit unit 40.

Further, in the solid-state imaging device according to the present embodiment, as illustrated in FIG. 31, the memory unit 50 further has a memory area J as the column memory on each column for storing a determination signal, in addition to the memory areas S1 to S12 for storing an optical signal and the memory areas N1 to N10 for storing a noise signal. The memory area J stores therein information as to whether or not the amplification factor of the column amplifier circuit on the corresponding column is changed in processing a pixel signal in the amplifier circuit unit 30. For example, "0" is stored when the amplification factor is not changed, and "1" is stored when the amplification factor is changed. Further, the horizontal transfer circuit 70 is configured to transfer information stored in the memory areas S1 to S12, information stored in the memory areas N1 to N10, and information stored in the memory area J to the output circuit 80 in response to a control signal from the horizontal scanning circuit 60. FIG. 32 illustrates an example configuration in which the horizontal scanning circuit 60 is divided into a plurality of (N) blocks 60-1, 60-2, . . . , 60-N in a similar manner to the case of FIG. 20 described in the fifth embodiment.

FIG. 33 is a timing chart illustrating the operation of the solid-state imaging device according to the present embodiment. FIG. 33 illustrates control signals PSEL, PRES, and PTX supplied from the vertical scanning circuit 20 to the control line 14 of a row on which readout is performed, a pixel signal amplified by the amplifier circuit unit 30 and input to the comparator circuit unit 40, and a reference signal supplied from the reference signal generation unit of the comparator circuit unit 40.

The operation from the time t1 to the time t7 is the same as the operation of the solid-state imaging device according to the sixth embodiment described by using FIG. 28. By the operation before the time t7, charges generated in the photoelectric converter PD have been transferred to the floating diffusion FD. A pixel signal obtained by amplifying a signal, which is in accordance with the amount of charges transferred to the floating diffusion FD, at a predetermined amplification factor by the column amplifier circuit is input to the comparator circuit unit 40.

Subsequently, in a period from the time t8 to the time t9, the reference signal for determining the output level of a pixel signal is supplied to the comparator of the comparator circuit unit 40 to perform comparison with the pixel signal. The determination of the output level of a pixel signal is performed for determining whether or not an AD conversion period of the S-signal is required to shorten.

When the level of the reference signal reaches the level of the pixel signal, for example, as illustrated in the solid line in FIG. 33 during the period before the time t9 when the reference signal is reset, it is determined that the AD conversion period of the S-signal is not required to be shortened. Then, the amplification factor of the amplifier circuit unit 30 is not changed, and an AD conversion process of an optical signal is started from the time t10. When the relationship between the level of the S-signal and the level of the reference signal is changed at the time t11, the memory unit 50 stores the count value corresponding to the time from the time t10 to the time t11 in the memory areas S1 to S12 of the memory unit 50 as a digital value of the S-signal. Further, since the amplification factor of the amplifier circuit unit 30 has not changed, information indicating this, for example, "0" is stored in the memory area J of the memory unit 50.

On the other hand, when the level of the reference signal does not reach the level of the pixel signal, for example, as illustrated in the dotted line in FIG. 33 during the period before the time t9 when the reference signal is reset, it is determined that the AD conversion period of the S-signal is required to be shortened, because it is estimated that the AD conversion requires long time. Then, the amplification factor of the amplifier circuit unit 30 is decreased to reduce the level of the pixel signal input to the comparator. In this example, the amplification factor of the amplifier circuit unit 30 is reduced to ¼ times. An AD conversion process of an optical signal is then started from the time t10 to the pixel signal having the reduced signal level. When the relationship between the level of the S-signal and the level of the reference signal is changed at the time t11', the memory unit 50 stores the count value corresponding to the time from the time t10 to the time t11' in the memory areas S1 to S12 of the memory unit 50 as a digital value of the S-signal. Further, since the amplification factor of the amplifier circuit unit 30 has changed, information indicating this, for example, "1" is stored in the memory area J of the memory unit 50.

The digital N-signal and the digital S-signal held in the memory areas N1 to N10 and S1 to S12 on each column of the memory unit 50 are transferred to the output circuit 80 via the horizontal transfer circuit 70 in the order of the digital N-signal and then the digital S-signal on a column basis. The determination signal, together with the digital N-signal, can be transferred to the output circuit 80.

The output circuit 80 performs a process of subtracting a digital value of the N-signal from a digital value of the S-signal, namely, a so-called digital CDS process. In this case, information of the determination signal is examined, and when the amplification factor of the amplifier circuit unit 30 to the S-signal has changed, the multiplying factor of the change of the amplification factor is considered. For example, when the amplification factor of the amplifier circuit unit 30 to the S-signal has changed to ¼ times, the digital value of the N-signal is subtracted from the four-fold value of the digital value of the S-signal. Whether or not the amplification factor of the amplifier circuit unit 30 to the S-signal has changed can be determined based on determination information together with the digital N-signal transferred to the output circuit 80.

In the solid-state imaging device according to the present embodiment, column memory inspection requires, as column memory inspection data, 23-bit information of 12-bit information corresponding to the memory areas S1 to S12, 10-bit information corresponding to the memory areas N1 to N10, and one-bit information corresponding to the memory area J. In order to output column memory inspection data with the number of bits less than or equal to the number of output bits of the output circuit 80 (10 bits or less), column memory inspection data can be divided into three or more data and output in a similar manner to the case of the sixth embodiment.

The manner of dividing column memory inspection data or the order of outputting the divided data from the solid-state imaging device is not limited in particular. For example, column memory inspection data can be output as inspection information for three rows, namely, information of higher 10 bits of the S-memory, information of lower two bits of the S-memory and one bit of the determination signal, and information of 10 bits of the N-memory.

As discussed above, according to the present embodiment, failure inspection of a readout unit such as the memory unit 50 or the horizontal scanning circuit 60 can be performed in real-time without increasing the circuit size of the output circuit 80.

Eighth Embodiment

A method of driving a solid-state imaging device according to an eighth embodiment of the present invention will be described by using FIG. 34. The same components as those in the solid-state imaging device according to the fifth to seventh embodiments are labeled with the same reference symbol, and the description thereof will be omitted or simplified.

In the present embodiment, another method of driving the solid-state imaging device according to the seventh embodiment will be described. The general configuration of the solid-state imaging device according to the present embodiment is the same as the solid-state imaging device according to the seventh embodiment. In the present embodiment, the AD conversion period of the S-signal is optimized by changing an AD conversion gain in the comparator circuit unit 40 instead of changing the amplification factor of the amplifier circuit unit 30. The AD conversion gain can be changed with a slope of the reference signal supplied to the comparator.

Figure 34:
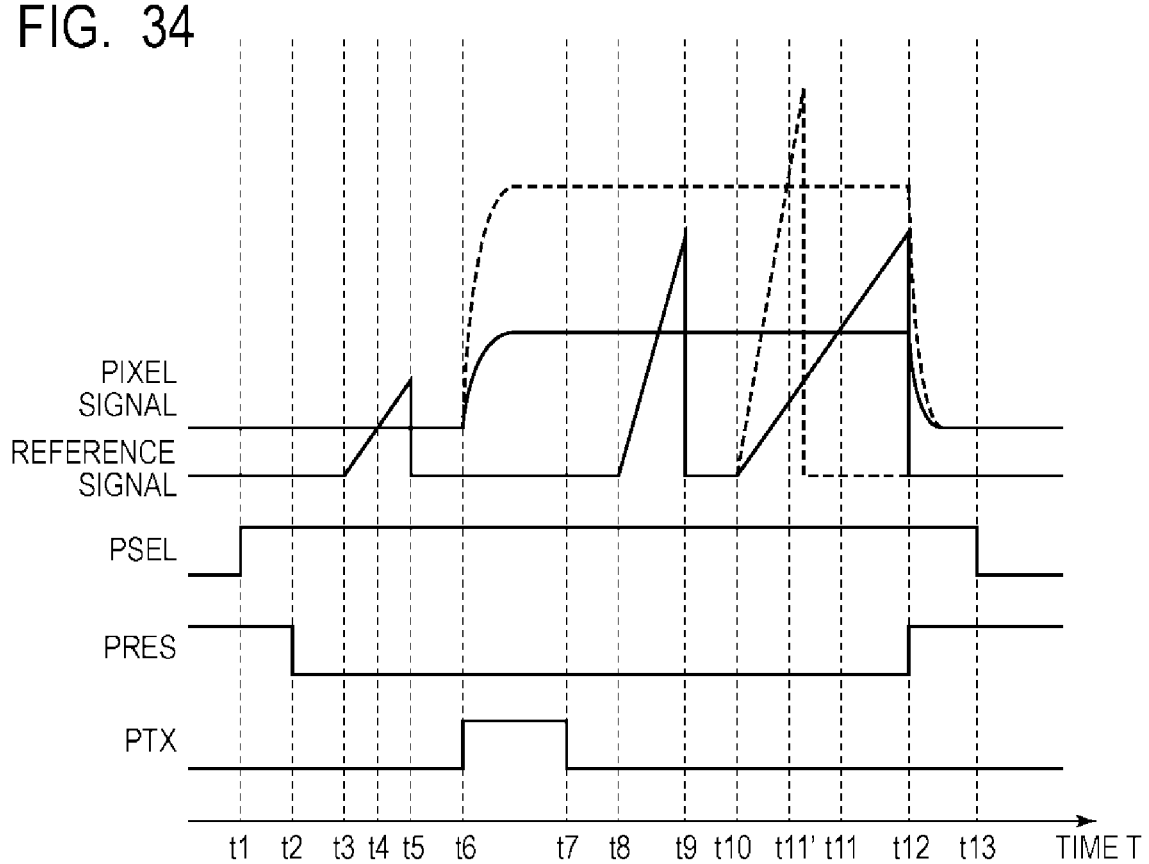
FIG. 34 is a timing chart illustrating a method of driving a solid-state imaging device according to an eighth embodiment of the present invention.

FIG. 34 is a timing chart illustrating the method of driving the solid-state imaging device according to the present embodiment. FIG. 34 illustrates control signals PSEL, PRES, and PTX supplied from the vertical scanning circuit 20 to the control line 14 of a row on which readout is performed, a pixel signal amplified by the amplifier circuit unit 30 and input to the comparator circuit unit 40, and the reference signal supplied from the reference signal generation unit of the comparator circuit unit 40.

The operation from the time t1 to the time t7 is the same as the operation of the solid-state imaging device according to the sixth embodiment described by using FIG. 28. By the operation before the time t7, charges generated in the photoelectric converter PD have been transferred to the floating diffusion FD. A pixel signal obtained by amplifying a signal, which is in accordance with the amount of charges transferred to the floating diffusion FD, at a predetermined amplification factor by the column amplifier circuit is input to the comparator circuit unit 40.

Subsequently, in a period from the time t8 to the time t9, the reference signal for determining the output level of a pixel signal is supplied to the comparator of the comparator circuit unit 40 to perform comparison with the pixel signal. The determination of the output level of a pixel signal is performed for determining whether or not an AD conversion period of the S-signal is required to be shortened.

When the level of the reference signal reaches the level of the pixel signal, for example, as illustrated in the solid line in FIG. 34 during the period before the time t9 when the reference signal is reset, it is determined that the AD conversion period of the S-signal is not required to be shortened. Then, the slope of the reference signal used for AD conversion is not changed, and an AD conversion process of an optical signal is started from the time t10. When the relationship between the level of the S-signal and the level of the reference signal is changed at the time t11, the memory unit 50 stores the count value corresponding to the time from the time t10 to the time t11 in the memory areas S1 to S12 of the memory unit 50 as a digital value of the S-signal. Further, since the slope of the reference signal used for AD conversion has not changed, information indicating this, for example, "0" is stored in the memory area J of the memory unit 50.

On the other hand, when the level of the reference signal does not reach the level of the pixel signal, for example, as illustrated in the dotted line in FIG. 34 during the period before the time t9 when the reference signal is reset, it is estimated that the AD conversion requires long time and therefore the slope of the reference signal is increased to reduce the AD conversion gain. In this example, the slope of the reference signal is increased by four times to reduce the AD conversion gain to ¼. An AD conversion process of an optical signal is then started from the time t10 by using the reference signal having the increased slope. When the relationship between the level of the S-signal and the level of the reference signal is changed at the time t11', the memory unit 50 stores the count value corresponding to the time from the time t10 to the time t11' in the memory areas S1 to S12 of the memory unit 50 as a digital value of the S-signal. Further, since the AD conversion gain of the comparator circuit unit 40 has changed, information indicating this, for example, "1" is stored in the memory area J of the memory unit 50.

The output circuit 80 performs a process of subtracting a digital value of the N-signal from a digital value of the S-signal, namely, a so-called digital CDS process. In this case, information of the determination signal is examined, and when the AD conversion gain to the S-signal has changed, the changing magnification of the AD conversion gain is considered. For example, when the AD conversion gain to the S-signal has changed to ¼ times, the digital value of the N-signal is subtracted from the four-fold value of the digital value of the S-signal. Whether or not the AD conversion gain to the S-signal has changed can be determined based on determination information together with the digital N-signal transferred to the output circuit 80.

The method of outputting column memory inspection data from the solid-state imaging device to the external device is the same as that in the case of the seventh embodiment.

As discussed above, according to the present embodiment, failure inspection of a readout unit such as the memory unit 50 or the horizontal scanning circuit 60 can be performed in real-time without increasing the circuit size of the output circuit 80.

Ninth Embodiment

Figure 35A:
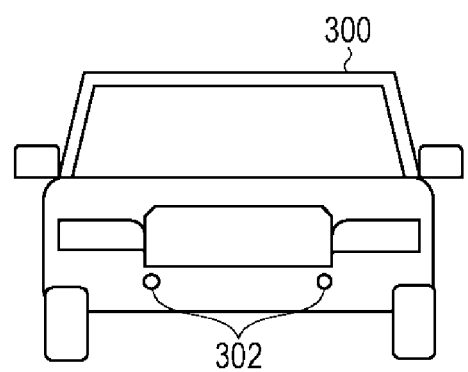
FIG. 35A, FIG. 35B and FIG. 35C are schematic diagrams illustrating a configuration of a movable object according to a ninth embodiment of the present invention.

A movable object according to a ninth embodiment of the present invention will be described with reference to FIG. 35A to FIG. 36. The same components as those in the solid-state imaging device according to the first to eighth embodiments are labeled with the same reference symbol, and the description thereof will be omitted or simplified. FIG. 35A to FIG. 35C are schematic diagrams illustrating a configuration of the movable object according to the present embodiment. FIG. 36 is a block diagram of the movable object according to the present embodiment.

Figure 35B:
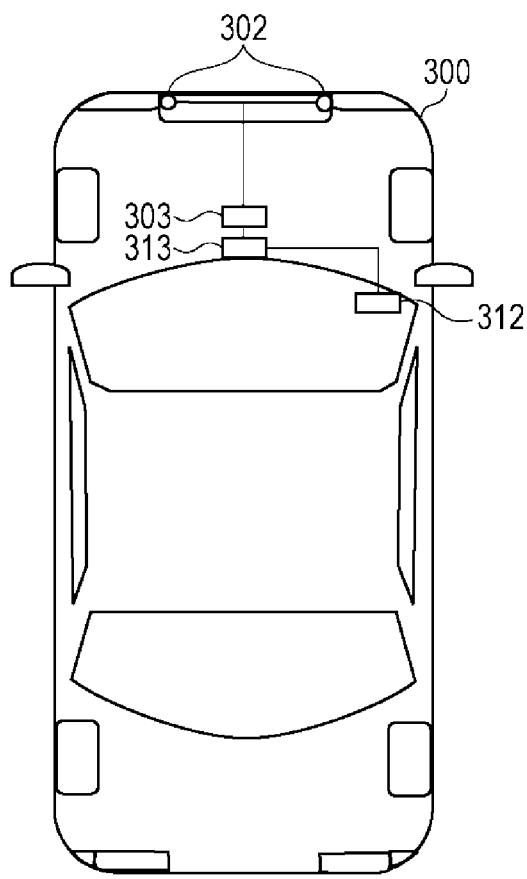
Figure 35C:
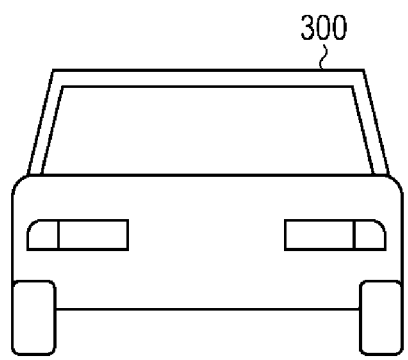
Figure 36:
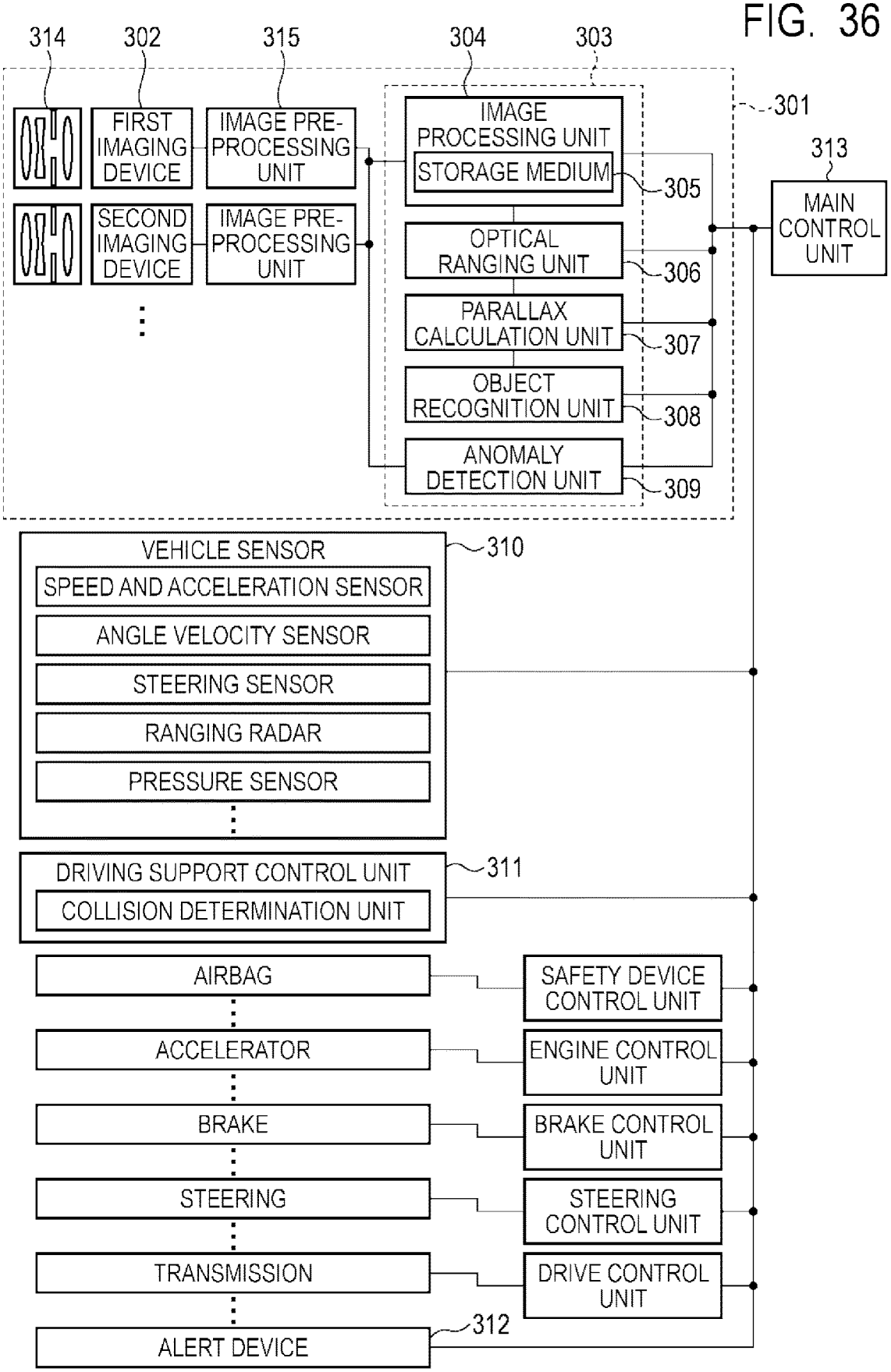
FIG. 36 is a block diagram of the movable object according to the ninth embodiment of the present invention.

FIG. 35A to FIG. 35C are schematic diagrams illustrating the configuration of the movable object according to the present embodiment. FIG. 35A to FIG. 35C illustrate a configuration of a vehicle 300 (an automobile) as an example of the movable object to which the solid-state imaging device according to the first to eighth embodiments are embedded. FIG. 35A is a schematic front view of the vehicle 300, FIG. 35B is a schematic plan view of the vehicle 300, and FIG. 35C is a schematic back view of the vehicle 300. The vehicle 300 has a pair of imaging devices 302 in the front part. The imaging device 302 here is any of the solid-state imaging devices 100 of the first to eighth embodiments. Further, the vehicle 300 has an integrated circuit 303, an alert device 312, and a main control unit 313. The integrated circuit 303 may be an application specific integrated circuit (ASIC), for example.

The alert device 312 alerts a user by means of issuing an alert such as a sound or vibration, displaying alert information on a display unit such as a car navigation system or a meter panel, or the like, when receiving a signal indicating an anomaly from the imaging device 302, a vehicle sensor, a control unit, or the like. The main control unit 313 centrally controls the operation of the imaging device 302, the vehicle sensor, the control unit, or the like. Note that the vehicle 300 may not include the main control unit 313. In this case, the imaging device 302, the vehicle sensor, or the control unit transmits and receives control signals via a communication network. For example, the CAN specification may be applied for transmission and reception of the control signals.

FIG. 36 is a block diagram illustrating a system configuration of the vehicle 300. The imaging system 301 includes the first and second imaging devices 302, image pre-processing units 315, the integrated circuit 303, and optical systems 314. A stereo camera is configured with the first imaging device 302 and the second imaging device 302 being provided to form a pair. Each of the optical systems 314 captures an optical image of an object on the imaging device 302. Each of the imaging devices 302 converts an optical image of an object captured by the optical system 314 into an electric signal. Each of the image pre-processing units 315 performs predetermined signal processing on a signal output from the imaging device 302. The function of the image pre-processing unit 315 may be embedded in the imaging device 302. At least two sets of the optical system 314, the imaging device 302, and the image pre-processing unit 315 are provided in the imaging system 301, and the output from the image pre-processing unit 315 of each set is input to the integrated circuit 303.

The image pre-processing unit 315 performs a process such as calculation for deriving a difference between an optical signal VS and a noise signal VN, addition of a synchronization signal, or the like. When the vehicle 300 includes the imaging device 302 illustrated as the first embodiment or the third embodiment, the image pre-processing unit 315 may have a function of performing a process such as matching determination illustrated in FIG. 6 or FIG. 13. Alternatively, when the vehicle 300 includes the imaging device 302 illustrated as the fifth embodiment to the eighth embodiment, the image pre-processing unit 315 may have a function of inspecting the memory unit 50.

The integrated circuit 303 may have an image processing unit 304, an optical ranging unit 306, a parallax calculation unit 307, an object recognition unit 308, and an anomaly detection unit 309. The image processing unit 304 processes an image signal output from the image pre-processing unit 315. For example, the image processing unit 304 performs a process such as correction of an image signal, defect interpolation, or the like. The image processing unit 304 has a storage medium 305 that temporarily holds an image signal. The storage medium 305 may store the position of a known defect pixel within the imaging devices 302. When the vehicle 300 includes the imaging device 302 illustrated as the first embodiment or the third embodiment, the image processing unit 304 may have a function of performing a process such as matching determination illustrated in FIG. 6 or FIG. 13. Alternatively, when the vehicle 300 includes the imaging device 302 illustrated as the fifth embodiment to the eighth embodiment, the image processing unit 304 may have a function of inspecting the memory unit 50.

The optical ranging unit 306 performs focusing and ranging of an object by using image signals. The parallax calculation unit 307 performs object collation (stereo matching) of parallax images. The object recognition unit 308 analyzes image signals to perform recognition of an object such as an automobile, a person, a traffic sign, a road, or the like.

The anomaly detection unit 309 detects an anomaly such as a failure, a malfunction, or the like of the imaging device 302. When detecting an anomaly, the anomaly detection unit 309 transmits, to the main control unit 313, a signal indicating that an anomaly has been detected. The anomaly detection unit 309 may have a function of performing a process such as matching determination illustrated in FIG. 6 or FIG. 13. Alternatively, the anomaly detection unit 309 may have a function of inspecting the memory unit 50 as illustrated in the fifth to eighth embodiments. The anomaly detection unit 309 may transmit, to the main control unit 313, a signal indicating that an anomaly has been detected, based on the result of matching determination performed by the signal processing unit (for example, the image pre-processing unit 315, the image processing unit 304, or the anomaly detection unit 309) within the imaging devices 302 or the imaging system. The above matching determination corresponds to a process of comparing the first inspection signal stored in the column memory 106 with the expected value as described in the first to fourth embodiments, for example. Alternatively, the above matching determination corresponds to a process of comparing the column memory inspection data written in the memory unit 50 with the expected value as described in the fifth to eighth embodiments, for example. Based on the comparison result, the anomaly detection unit 309 can detect that an anomaly has occurred in the memory unit 50 within the imaging devices 302.

The vehicle 300 includes a vehicle sensor 310 and a driving support control unit 311. The vehicle sensor 310 may include a speed and acceleration sensor, an angle velocity sensor, a steering angle sensor, a ranging radar, a pressure sensor, or the like.

The driving support control unit 311 includes a collision determination unit. The collision determination unit determines whether or not there is a possibility of collision with an object based on information from the optical ranging unit 306, the parallax calculation unit 307, or the object recognition unit 308. The optical ranging unit 306 or the parallax calculation unit 307 is an example of a distance information acquisition unit adapted to acquire distance information on the distance to an object. That is, the distance information is information regarding a parallax, a defocus amount, a distance to an object, or the like. The collision determination unit may use any of the distance information to determine the collision possibility. The distance information acquisition unit may be implemented by dedicatedly designed hardware or may be implemented by a software module.

Although the example in which the driving support control unit 311 functions as a control unit adapted to control the vehicle 300 so as not to collide with another object has been described, the driving support control unit 311 may perform automatic driving control to follow another vehicle or automatic driving control not to go out of a traffic lane.

The vehicle 300 further includes drive units used for traveling, such as an airbag, an accelerator, a brake, a steering, a transmission, or the like. Further, the vehicle 300 includes control units for these drive units. Each of the control units controls the corresponding drive unit based on a control signal from the main control unit 313.

As described above, according to the present embodiment, a movable object that can perform driving support, automatic driving, or the like, on which the solid-state imaging device or the imaging system described in any of the first to eighth embodiments is mounted is provided. Further, since a stereo camera is configured, a plurality of solid-state imaging devices or imaging systems may be used.

The imaging system used in the present embodiment can be applied to a movable object (moving apparatus) such as a ship, an airplane, or an industrial robot, for example, without being limited to a vehicle such as an automobile. In addition, the imaging system can be widely applied to a device which utilizes object recognition, such as an intelligent transportation system (ITS), without being limited to a movable object.

MODIFIED EMBODIMENTS

The present invention is not limited to the above-described embodiments, but various modifications are possible.

For example, the embodiment of the present invention includes an example in which a part of the configuration of any of the embodiments is added to another embodiment or an example in which a part of the configuration of any of the embodiments is replaced with a part of the configuration of another embodiment.

Further, the first to eighth embodiments described above is configured such that, when the number of bits of information stored in the column memory on each column of the memory unit 50 is greater than the number of bits of information that can be output by the output circuit 80, information stored in the column memory on each column of the memory unit 50 is divided in a unit of bit and output. However, information stored in the column memory on each column of the memory unit 50 may be divided in a unit of bit and output even when the number of bits of information stored in the column memory on each column of the memory unit 50 is less than the number of bits of information that can be output by the output circuit 80.

Further, although the case where the number of bits of information that can be output by the output circuit 80 is 10 has been described as an example in the above-described first to eighth embodiments, the number of bits of information that can be output by the output circuit 80 is not limited in particular. Further, the number of bits of information that can be stored in the column memory on each column of the memory unit 50 is also not limited to the number that has been described in the above embodiments. The number of times of division and output of information held in each column memory can be set as appropriate in accordance with the relationship between the number of bits of information that can be output by the output circuit 80 and the number of bits of information that can be stored in the column memory.

Further, although column memory inspection data is output in the period between a period in which an image of a frame is acquired and a period in which an image of the next frame is output in the above-described embodiment, the timing of outputting column memory inspection data is not necessarily required to be included between frames. For example, column memory inspection data may be output after image data of one row is output and before image data of another row to be next read out is output during a period in which an image of a frame is output.

Further, the circuit configuration of the pixels 12, the horizontal transfer circuit 70, or the like illustrated in the above-described embodiments is a mere example and can be changed as appropriate.

Further, while the imaging system and the movable object illustrated in the ninth embodiment are illustrated as an example of imaging systems and movable objects to which the optical detection device of the present invention can be applied, the imaging system and the movable object to which the solid-state imaging device of the present invention can be applied are not limited to the configurations illustrated in FIG. 35A to FIG. 36.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2017-011252, filed Jan. 25, 2017, and Japanese Patent Application No. 2017-202000, filed Oct. 18, 2017 which are hereby incorporated by reference herein in their entirety.

What is claimed is:

1. A photoelectric conversion device comprising:
a pixel that outputs a pixel signal of an analog signal;
a readout unit that converts the pixel signal into a digital signal to generate a digital pixel signal;
a memory unit that stores the digital pixel signal; and
a first inspection signal output unit that outputs a first inspection signal to the memory unit such that the memory unit stores the first inspection signal, and outputs an initializing signal corresponding to an initial value of the memory unit.

2. The photoelectric conversion device according to claim 1, wherein the first inspection signal output unit outputs, to the memory unit, the first inspection signal that is a digital signal without routing the readout unit.

3. The photoelectric conversion device according to claim 1, wherein the first inspection signal is formed of a plurality of inspection patterns having values different from each other.

4. The photoelectric conversion device according to claim 3, wherein the first inspection signal output unit sequentially outputs and stores the plurality of inspection patterns in the memory unit.

5. The photoelectric conversion device according to claim 3, wherein the plurality of inspection patterns are output from the memory unit in a period after output of the digital pixel signal of a frame ends and before output of the digital pixel signal of a next frame starts.

6. The photoelectric conversion device according to claim 3,
wherein one inspection pattern of the plurality of inspection patterns is output from the memory unit in a period after output of the digital pixel signal of a first frame ends and before output of the digital pixel signal of a second frame that is next to the first frame starts, and
wherein another inspection pattern of the plurality of inspection patterns is output from the memory unit in a period after output of the digital pixel signal of the second frame ends and before output of the digital pixel signal of a third frame that is next to the second frame starts.

7. The photoelectric conversion device according to claim 1 further comprising:
a first determination unit that determines an anomaly of the memory unit by comparing the first inspection signal which is output from the first inspection signal output unit with the first inspection signal which is stored in the memory unit.

8. The photoelectric conversion device according to claim 7, wherein a first determination result in the first determination unit is output from the first determination unit in a period after output of the digital pixel signal of a frame ends and before output of the digital pixel signal of a next frame starts.

9. The photoelectric conversion device according to claim 1 further comprising:
a second inspection signal output unit that outputs a second inspection signal of an analog signal; and
an amplifier unit to which the second inspection signal or the pixel signal is selectively input and which amplifies the input signal as an analog signal,
wherein the second inspection signal output from the amplifier unit is converted into a digital signal by the readout unit and stored in the memory unit.

10. The photoelectric conversion device according to claim 9, wherein the second inspection signal stored in the memory unit is output from the memory unit in a period after output of the digital pixel signal of a frame ends and before output of the digital pixel signal of a next frame starts.

11. The photoelectric conversion device according to claim 9 further comprising:
a second determination unit that determines an anomaly of the amplifier unit by comparing the second inspection signal which is output from the second inspection signal output unit with the second inspection signal which is stored in the memory unit.

12. The photoelectric conversion device according to claim 11, wherein a second determination result in the second determination unit is output from the second determination unit in a period after output of the digital pixel signal of a frame ends and before output of the digital pixel signal of a next frame starts.

13. An imaging system comprising:
the photoelectric conversion device according to claim 1; and
a signal processing unit that processes a signal output from the photoelectric conversion device.

14. The imaging system according to claim 13 further comprising:
an anomaly detection unit that detects an anomaly of the photoelectric conversion device based on a comparison result of the first inspection signal stored in the memory unit and an expected value.

15. A movable object comprising:
the photoelectric conversion device according to claim 1;
a distance information acquisition unit adapted to acquire distance information on a distance to an object, from a parallax image based on the pixel signal output from the pixel of the photoelectric conversion device; and
a control unit adapted to control the movable object based on the distance information.

16. The movable object according to claim 15 further comprising:
an anomaly detection unit that detects an anomaly of the photoelectric conversion device based on a comparison result of the first inspection signal stored in the memory unit and an expected value.

17. A photoelectric conversion device comprising:
a plurality of pixels arranged to form a matrix including a plurality of columns and a plurality of rows;
a plurality of memories provided correspondingly to the plurality of columns, wherein each of the plurality of memories holds, as a digital value, information based on a signal output from the pixel arranged on a corresponding column;
an inspection information supply unit that supplies inspection information for failure inspection to the plurality of memories; and
an output circuit that outputs information held by the plurality of memories,
wherein the output circuit outputs information that is based on signals output from the plurality of pixels on a row-by-row basis,
wherein the output circuit outputs the inspection information held in a part of the plurality of memories in a first period corresponding to an output period for one row and outputs the inspection information held in another part of the plurality of memories in a second period, which is different from the first period, corresponding to an output period for one row, and
wherein each of the first period and the second period is a period between an output operation of pixel information for one row performed by the output circuit in a frame and an output operation of pixel information for another row performed by the output circuit in the frame.

18. The photoelectric conversion device according to claim 17,
wherein the number of bits of information which can be stored by each of the plurality of memories is greater than the number of bits of information which is based on a signal output by each of the plurality of pixels, and
wherein the output circuit divides and outputs information stored in each of the plurality of memories in a unit of bit such that the number of bits of information which is output at once is less than or equal to the number of bits of information which is based on a signal output by each of the plurality of pixels.

19. The photoelectric conversion device according to claim 17, wherein, between output of first image data that is based on signals output by the plurality of pixels and output of second image data that is based on signals output by the plurality of pixels, the output circuit outputs information held in the plurality of memories from the plurality of memories to which the inspection information is supplied.

20. The photoelectric conversion device according to claim 19, wherein the second image data are image data output next to the first image data.

21. The photoelectric conversion device according to claim 19, wherein the first image data are image data of a first frame, and the second image data are image data of a second frame that is next to the first frame.

22. The photoelectric conversion device according to claim 19, wherein the first image data and the second image data are data of different rows of a frame.

23. The photoelectric conversion device according to claim 19, wherein the output circuit outputs whole the inspection information held in the plurality of memories between output of the first image data and output of the second image data.

24. The photoelectric conversion device according to claim 19, wherein the output circuit outputs a part of the inspection information held in the plurality of memories between output of the first image data and output of the second image data.

25. The photoelectric conversion device according to claim 17,
wherein each of the plurality of memories includes a first memory that holds first information based on an optical signal output from each of the plurality of pixels and a second memory that holds second information based on a noise signal output from each of the plurality of pixels, and
wherein the output circuit outputs a third digital value obtained by subtracting a second digital value that is based on information held in the second memory from a first digital value that is based on information held in the first memory.

26. The photoelectric conversion device according to claim 25 further comprising:
an AD conversion circuit unit that converts an analog signal output from each of the plurality of pixels into a digital signal at a variable AD conversion gain,
wherein the first information is information of a digital value obtained by conversion of the optical signal at a first AD conversion gain,
wherein the second information is information of a digital value obtained by conversion of the noise signal at a second AD conversion gain, and
wherein the output circuit calculates the third digital value taking the first AD conversion gain and the second AD conversion gain into consideration.

27. The photoelectric conversion device according to claim 26, wherein each of the plurality of memories further includes a third memory that holds information indicating a relationship between the first AD conversion gain and the second AD conversion gain.

28. The photoelectric conversion device according to claim 25 further comprising:
an amplifier circuit unit that amplifies a signal output from each of the plurality of pixels at a variable amplification factor,
wherein the first information is information of a digital value obtained by conversion of the optical signal at a first amplification factor,
wherein the second information is information of a digital value obtained by conversion of the noise signal at a second amplification factor, and
wherein the output circuit calculates the third digital value taking the first amplification factor and the second amplification factor into consideration.

29. The photoelectric conversion device according to claim 28, wherein each of the plurality of memories further includes a third memory that holds information indicating a relationship between the first amplification factor and the second amplification factor.

30. The photoelectric conversion device according to claim 17, wherein the inspection information supply unit supplies pieces of the inspection information that are different from each other to at least two of the memories to which pieces of information are output from the output circuit at different timings.

31. An imaging system comprising:
the photoelectric conversion device according to claim 17; and
a signal processing unit that processes a signal output from the photoelectric conversion device.

32. The imaging system according to claim 31 further comprising:
an anomaly detection unit that detects an anomaly of the photoelectric conversion device based on a comparison result of inspection data and an expected value, the inspection data being output from the plurality of memories to which the inspection information has been supplied.

33. A movable object comprising:
the photoelectric conversion device according to claim 17;
a distance information acquisition unit adapted to acquire distance information on a distance to an object, from a parallax image based on a signal output from the pixel of the photoelectric conversion; and
a control unit adapted to control the movable object based on the distance information.

34. The movable object according to claim 33 further comprising:
an anomaly detection unit that detects an anomaly of the photoelectric conversion device based on a comparison result of inspection data and an expected value, the inspection data being output from the plurality of memories to which the inspection information has been supplied.

35. The photoelectric conversion device according to claim 1,
wherein the photoelectric conversion device includes a plurality of the pixels arranged to form a plurality of columns, and
wherein the memory unit includes a plurality of memories provided correspondingly to the plurality of columns, wherein each of the plurality of memories stores the digital signal of a pixel signal of a pixel arranged on a corresponding column of the plurality of columns.

36. The photoelectric conversion device according to claim 35 further comprising a scanning circuit that outputs to the memory unit a control signal for transferring the digital pixel signal or the first inspection signal stored in each of the plurality of memories to an output circuit sequentially on a column basis.

37. The photoelectric conversion device according to claim 1, wherein the first inspection signal stored in the memory unit is output from the memory unit in a period after output of the digital pixel signal of a frame ends and before output of the digital pixel signal of a next frame starts.

* * * * *